United States Patent [19]

Rutherford et al.

[11] Patent Number: 5,068,909

[45] Date of Patent: Nov. 26, 1991

[54] METHOD AND APPARATUS FOR GENERATING QUANTIFIABLE VIDEO DISPLAYS

[75] Inventors: Hal Rutherford, San Jose, Calif.; Floyd Taub, Silver Spring, Md.

[73] Assignee: Applied Imaging Corporation, Santa Clara, Calif.

[21] Appl. No.: 354,255

[22] Filed: May 18, 1989

[51] Int. Cl.$^5$ .......................... G06K 9/40; G06K 9/54; G06K 9/47

[52] U.S. Cl. ....................................... 382/49; 382/54; 382/53

[58] Field of Search .................. 382/54, 53, 49, 41; 358/463, 464, 447

[56] References Cited

U.S. PATENT DOCUMENTS

| | | | |
|---|---|---|---|
| 4,389,677 | 6/1983 | Rushby | 358/463 |
| 4,541,116 | 9/1985 | Lougheed | 382/54 |
| 4,675,908 | 6/1987 | Saito et al. | 382/41 |
| 4,790,025 | 12/1988 | Inove et al. | 382/41 |
| 4,823,194 | 3/1989 | Mishima et al. | 358/464 |

OTHER PUBLICATIONS

Stanley R. Sternberg, "Biomedical Image Processing", 1983, pp. 22–34, IEEE Computer.

"Object Identification and Measurement from Images with Access to the Database to Select Specific Subpopulations of Special Interest"; H. G. Rutherford, F. Taub and B. Williams, May 1986.

Primary Examiner—Leo H. Boudreau
Assistant Examiner—Michael R. Cammarata
Attorney, Agent, or Firm—Skjerven, Morrill, MacPherson, Franklin & Friel

[57] ABSTRACT

An apparatus and method for removing background noise and high frequency noise from an image by comparing each pixel in the image with neighboring pixels defining a variably shaped and sized kernel. The size and shape of the kernel are optimized for the particular characteristics of the data to be analyzed.

21 Claims, 9 Drawing Sheets

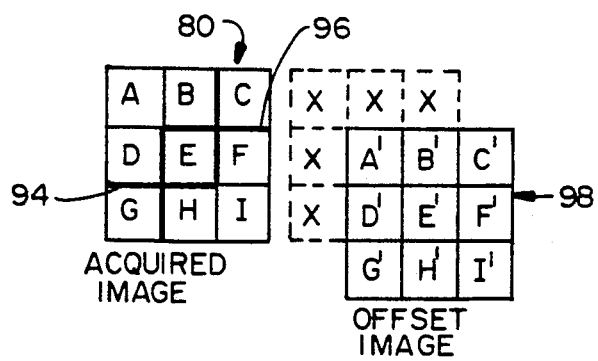
FIG. 7
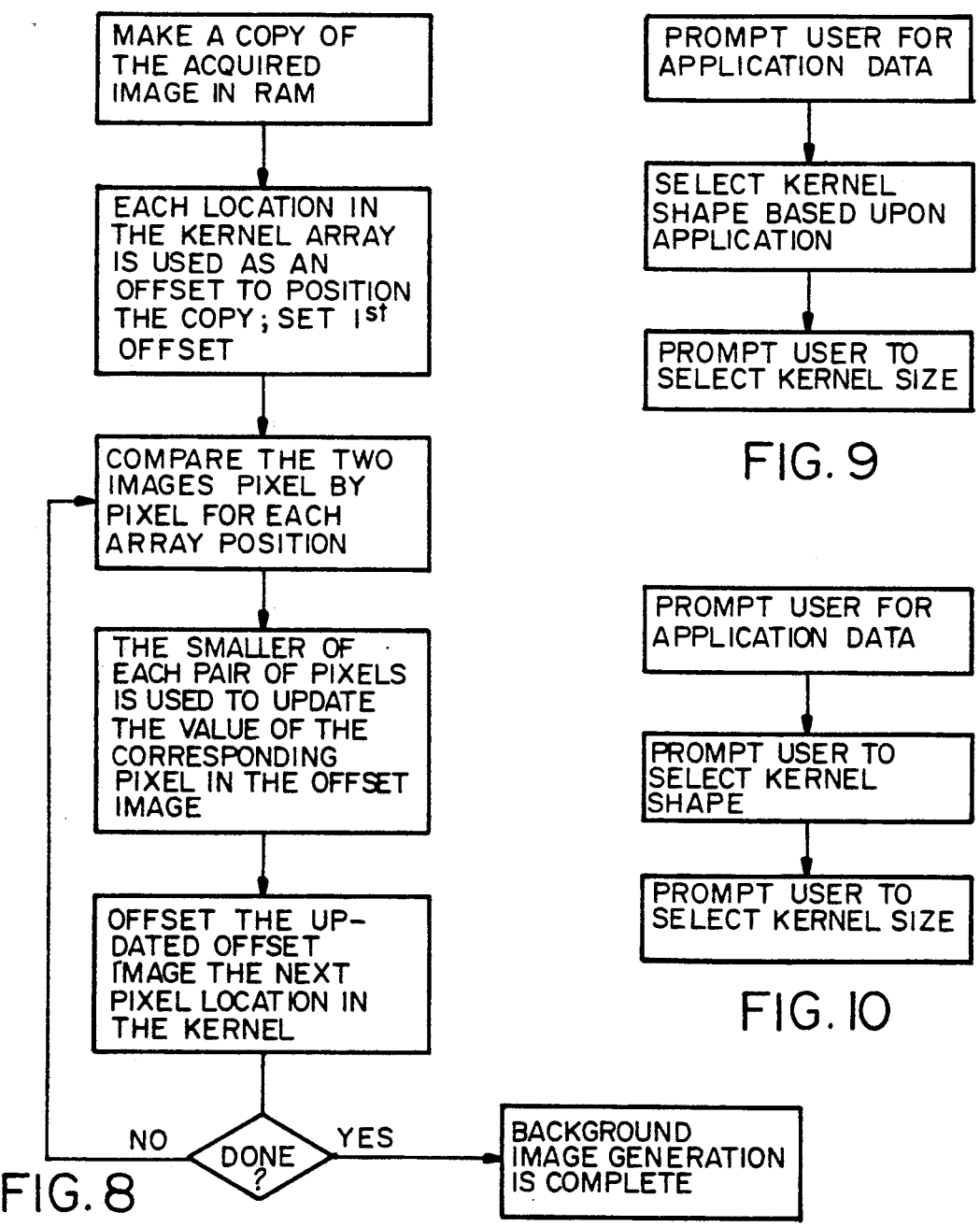
FIG. 8
FIG. 9
FIG. 10

GENERATE MAXIMUM IMAGE FROM BACKGROUND IMAGE

SMOOTH BACKGROUND IMAGE BY AVERAGING $$A'' = A/2 - A'/2 + 127$$

(d)

METHOD AND APPARATUS FOR GENERATING QUANTIFIABLE VIDEO DISPLAYS

BACKGROUND OF THE INVENTION

The invention pertains generally to the field of image processing, and, more particularly, to the field of generating quantifiable images from digital images representing data spatially as pixel patterns of greater and lesser intensity.

The preferred embodiment of the invention is adapted for analysis of biological data generated in recombinant DNA research and other biological research. Such data includes 2D gels, DNA sequencing gels, gel blots, RFLP, DNA blots, microtiter color, microtiter fluorescence and other types of data presented spatially in an image. Typically, such images consist of a plurality of pixels with areas of pixels of varying intensity representing some amount of a particular DNA or protein with the intensity attributable to the protein being superimposed upon intensity representing background noise and high frequency noise caused by such things as pinholes in the film, penetration of the film by gamma rays etc.

Although the invention will be described in terms of its application to biological data, it will be appreciated that the teachings of the invention have utility in other fields of analysis of images.

A problem in analyzing such data in the past so as to be able to quantify the amount of a protein represented by a particular area of pixels in the image has been how to separate the intensity representing the data from the intensity caused by background noise. Although pixel intensity is the concept used herein to convey the teachings of the invention, pixel value is the general concept contemplated by the teachings of the invention. That is, the pixel values being analyzed may represent something other than light intensity. For example, each pixel in an image may represent the strength of radio transmissions from a small sector of the sky such that the invention could be used in radio astronomy applications.

In the past, such techniques as rolling ball filters have been used for background noise removal from images. Such a teaching is found in a conference paper by Rutherford et al. entitled "Object Identification and Measurement from Images with Access to the Database to Select Specific Subpopulations of Special Interest" published at the E-O Lase and E-O Imaging Conference sponsored by S.P.I.E., January 1987 with the proceedings published in May of 1987. There, the authors describe a method of background correction, i.e., noise removal, by use of a rolling ball filter which effectively takes the minimum pixel value in the ball filter region as the pixel value for the background image. The resultant image is then subtracted from the digitized image. A pipeline image array processor is used to perform this process. Such a technique however is not optimized for removal of background noise and high frequency noise in all situations because it does not take into account the varying geometric shapes of the data of interest in many varied application and because it does not take into account other application specific phenomenon such as vertical noise strips, dead spaces etc.

Accordingly, a need has arisen for apparatus and a method to optimize the noise removal process for data presented in many varied spatial formats.

SUMMARY OF THE INVENTION

According to the teachings of the invention, there is disclosed herein a method and apparatus for background noise removal which uses a variable shape and a variable size kernel or neighborhood of adjacent pixels surrounding or next to the pixel being processed. The value of the pixel being processed is compared to all, or some selected subset, of the pixels in the neighborhood to find the minimum value. This minimum value is then substituted for the value of the pixel being processed. When all pixels have been so processed by comparing them to the values of the surrounding pixels in the corresponding neighborhood (each pixel has its own neighborhood), the resulting image is a "background image". A background image is an image where each pixel has the value of the smallest valued pixel in the neighborhood to which it was compared. Of course, those skilled in the art will appreciate that the background removal process can also be performed on a reverse video image by finding the maximum pixel value in each neighborhood and substituting that value for the value of the pixel of interest corresponding to that neighborhood.

The background image may then be further processed in some embodiments to remove high frequency noise. In one embodiment, high frequency noise is removed by processing the background image to generate a "maximum image", i.e., an image generated from the background image showing the maximum pixel values for each neighborhood in the background image. This maximum image is generated by using a smaller neighborhood than used in generating the background image and then using this smaller neighborhood to process the background image as follows. Each pixel has its value compared to the values of the pixels in a corresponding neighborhood of surrounding pixels. The maximum value in each neighborhood is then substituted for the value of the corresponding pixel. When this has been done for all pixels, the maximum image is complete. This maximum image is substantially devoid of high frequency, large amplitude noise which dips below the surrounding neighborhood such as is characteristic of pinhole defects in film etc. This maximum image is subtracted from the starting image to generate a "background removed image".

In another embodiment according to the teachings of the invention, the maximum image is used as a starting image in an apparatus to perform a process to remove high frequency, low amplitude noise. In this process, a neighborhood is used which is smaller than the neighborhood used to generate the background image. Each pixel value for a pixel of interest is added to the pixel values for all the other pixels in the corresponding neighborhood. The sum is then divided by the number of pixels in the neighborhood to derive an average pixel value, and the value of the pixel of interest is set equal to this average value. After this is done for all pixels, the resultant image is subtracted from the original image used to generate the background image to arrive at a background removed image.

In another alternative embodiment, the average image may be generated directly from the background image and the resulting image subtracted from the original image to derive the background removed image.

In another alternative embodiment, the image generated by the averaging process may be generated directly from the background image, and the resulting image is used as the input image for the process of generating the "maximum" image. The resulting image is subtracted from the original image to derive the background removed image.

BRIEF DESCRIPTION OF THE DRAWINGS

FIGS. 5 through 7 illustrate the process of background noise removal by comparison to neighborhood pixel values.

FIG. 8 is a more detailed flow chart of the background noise removal process.

FIGS. 9 and 10 are alternative processes for selection of kernel size and shape.

DETAILED DESCRIPTION OF THE PREFERRED EMBODIMENT

Figure 1:
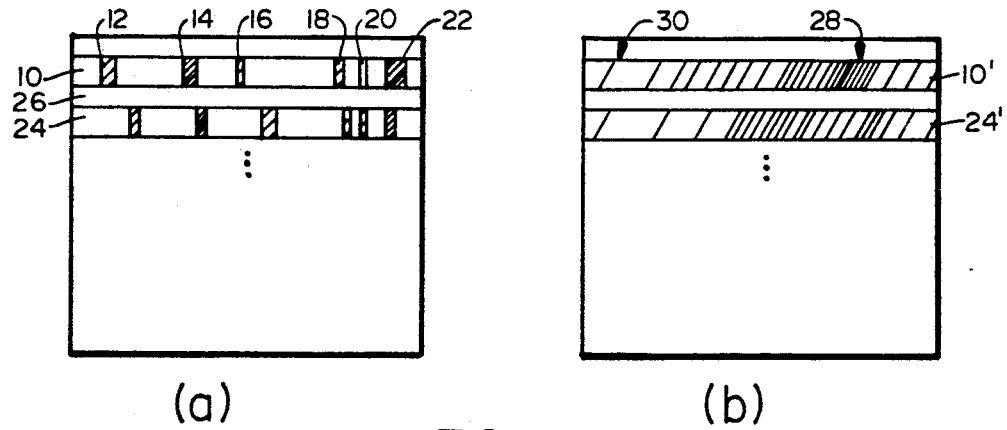
FIGS. 1(a) and 1(b) show, respectively, a typical autoradiograph of a 1-D gel separation and the same image with the data removed leaving only the background intensity showing.

Referring to FIG. 1(a), there is shown an image of a typical autoradiograph of a 1-D protein separation. Each of lanes 10 and 24 contains separated bands of radioactively labeled proteins from different samples. For example, lane 10 contains bands 12 and 14 with the difference in pitch of the crosshatching of band 14 indicating that this band is of greater brightness or intensity than the intensity of band 12. Likewise, bands 16, 18, 20 and 22 in FIG. 1(a) all have varying degrees of brightness or intensity. A similar situation exists for lane 24, which is separated from lane 10 by a dead space 26. The varying intensity of each band is indicative of the amount of the particular protein or proteins represented by that band which was present on the gel at that particular position.

It is useful to be able to quantify an image such as shown in FIG. 1(a) such that the intensity of the various bands can be measured as an indication of the amount of protein represented thereby. The difficulty with this approach, however, is that the various bands have their intensities superimposed upon background noise which, because of its varying intensity across a lane, causes errors. That is, the background noise can be thought of as forming an image of varying intensity which would still be present even if there were no data represented in FIG. 1(a). FIG. 1(b) is a drawing showing this background image. The background image has a lane 10' which corresponds to lane 10 in FIG. 1(a) and a lane 24' which corresponds to the lane 24 in FIG. 1(a). The differences in pitch in the crosshatching of lanes 10' and 24' conveys in pictorial form the variation in the intensity or brightness of the background noise in the lane at various locations. For example, the area 28 in lane 10' has a brighter background intensity than the area 30. By superimposing the image of FIG. 1(a) on the image of FIG. 1(b), it can be seen that the relatively brighter intensity of band 14, which overlies an area of lesser intensity in the background image, as compared to a less-bright band 18, which overlies an area of brighter background intensity in FIG. 1(b). For this reason, the relative intensities of the bands 14 and 18 cannot be used directly to quantify the amount of protein at those respective positions in the gel without creating errors caused by the varying intensity of the background image along lane 10'. Thus, according to the teachings of the invention, the background image of FIG. 1(b) is derived by image processing of the image represented by FIG. 1(a), and the resulting image is then subtracted from the image of FIG. 1(a) to leave a quantifiable data image.

Figure 2:
FIG. 2 a drawing showing how the data bearing image pixel value profile compared to the background pixel value profile.

Referring to FIG. 2, there are shown comparative intensity profiles through the image of FIG. 1(a) to show the effect of background removal. The intensity trace labeled 32 represents the intensity of the original image which includes both intensity attributable to data as well as intensity attributable to background noise. The trace labeled 34 represent the intensity of the original image after background removal and, therefore, represents the intensity attributable to the quantity of a particular protein located at the corresponding location on the gel.

According to the teachings of the invention, a manually manipulated cursor having a variable size and a variable shape may be placed over any band of interest in the background-removed image to determine the intensity of that band attributable to the presence of a protein of interest. The process of determining the intensity caused by the data essentially involves the process of integrating the trace 34 to determine the area under any particular peak. Typically, the result of this integration will be reported at the touch of a key on a computer keyboard.

Figure 3:
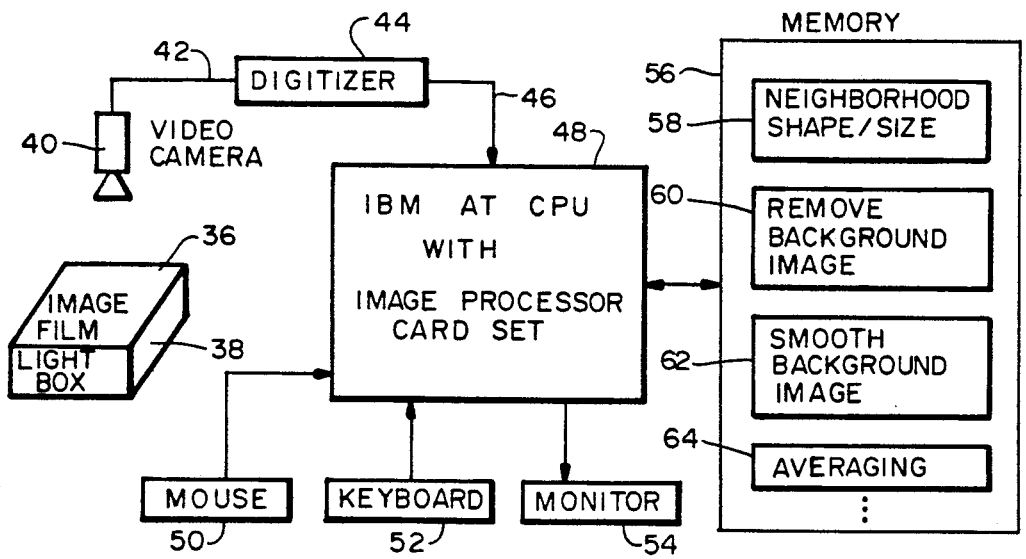
FIG. 3 is a block diagram of the hardware which can be used according to the teachings of the invention.

Referring to FIG. 3, there is shown a block diagram of a computer apparatus according to the teachings of the invention. Image film 36, which contains a spatial depiction of the data to be analyzed, is placed on a light box 38. The light box shines light through the image film to create a pattern of light which has varying spatial intensity in accordance with the data and the background noise. Also, the image may be acquired by shining light on a nontranslucent film such as a polaroid shot. The resulting light pattern contains the data to be analyzed. This light pattern is converted by a video camera 40 into a video signal on line 42 representing an analog form of a raster-scanned version of the image on film 36. This analog signal is digitized in a data converter interface 44 and results in a stream of digital data on bus 46. This stream of digital data is read by a computer 48 and is stored in memory for further image-processing operations. The computer 48 is typically an IBM AT ™ personal computer with an image processor card set plugged into the card slots. The image processor card set is an off-the-shelf, image-processing circuit manufactured by Matrox under the trademark MVP-AT ™ Image-Processing Card Set. The computer 48 interfaces with the user through a mouse 50, a keyboard 52 and a monitor 54. An external memory 56 stores data and programs. Several software modules according to the teachings of the invention are shown as stored in memory 56. They are: a neighborhood shape/size interfacing module 58; a background removal module 60; a smoothing module 62; and an averaging module 64. The neighborhood shape/size interface module 58 serves to determine the shape and size of a neighborhood or kernel of pixels the values of which will be compared to the value of a pixel of interest in the kernel to determine the spatial intensity patterns of the background image. Typically, the shape of the neighborhood is determined by the computer for the particular application involved and relates to the typical shape of the data patterns to be analyzed. However, in alternative embodiments, the shape of the neighborhood may be set by the user in any of several different ways. For example, at start-up time, or upon switching applications, the computer can prompt the user through monitor 54 to determine what type of data is to be analyzed. After the user responds, either through the keyboard 52 or the mouse 50, the computer can put up either a textual, verbal or a pictorial menu of neighborhood shapes to be used. The user can then indicate which shape to use either by selecting it with mouse 50 or by typing in the code for the shape via keyboard 52 or by stating the shape. Alternatively, the user may sketch the neighborhood shape and/or size to be used through use of the mouse 50. In some embodiments, the shape of the neighborhood will be selected by the computer 48 based upon the user response regarding what type of data is to be analyzed. In some embodiments, a first neighborhood shape will be used to get rid of particular noise patterns having specific shapes followed by the use of anther shape for the neighborhood which is keyed to the shape of the particular data or application for which the teachings of the invention will be used.

The size of the neighborhood to be used generally depends upon the typical size of the data spatial patterns to be analyzed. In the preferred embodiment, the size of the neighborhood is chosen which has a largest dimension which is two and one-half times the size of the largest data spatial pattern to be analyzed. In the preferred embodiment, the user may be prompted for the desired size for the neighborhood and may respond either in terms of a number or a code for the desired size. Alternatively, the selected shape for the kernel may be displayed on the screen, and the user may adjust the size of the kernel by having the kernel superimposed upon the image to be analyzed and using a "rubber band"-type cursor to adjust the size of the kernel. The details as to how the shape and size of the kernel to be used are selected by the user or by the computer are not critical to the invention.

The details of the remove background image module 60 will be described in greater detail below. The basic function of this module is to determine the level of background intensity throughout the image to be analyzed and to create a background image reflecting that background intensity at all points in the background image. This background image may then be subtracted from the original image in some embodiments to derive a background removed image.

The smooth background image module 62 removes high-frequency, high-amplitude noise (high-amplitude noise for purposes of this invention means noise which dips below the level the surrounding neighborhood) by finding the maximum pixel in each kernel of the background image and setting the value of the pixel of interest in this kernel to the maximum value found in the kernel. When this is done for all pixels and their corresponding kernels "maximum" background image has been completed. This serves to get rid of high frequency, large amplitude noise characterized by pixels of low intensity in the background image such as might be caused by pinholes in the film, gamma rays, etc.

Finally, the averaging module 64 gets rid of high frequency, small amplitude noise in either the background image or the smoothed background image generated by module 62. This is done by averaging all the pixels in a neighborhood and setting the pixel of interest in each neighborhood to the average value. Both modules 62 and 64 will be described in more detail below.

Figure 4:
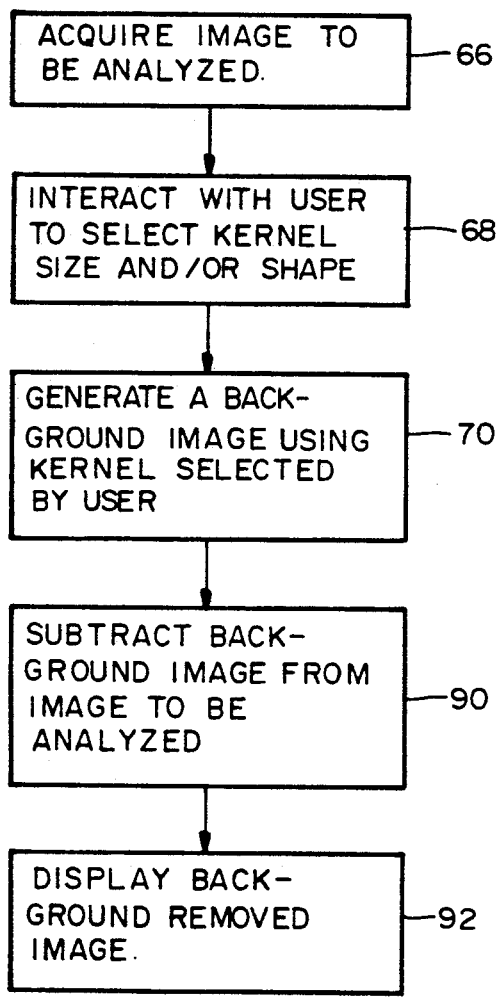
FIG. 4 is a flow chart for the process for removing background noise from the image.

Referring to FIG. 4, there is shown a flow chart for a basic embodiment of a process according to the teachings of the invention for background removal. The first step, symbolized by block 66, is to acquire the image to be analyzed. Specifically, the image to be analyzed is digitized into a plurality of pixels. These pixels define an image which contains data to be analyzed and displays this data in terms of varying spatial patterns of intensity, color, fill pattern or other means of displaying values for the pixels. How the value for each pixel is depicted is not critical to the invention. Typically, pixel values will be displayed in terms of their intensities. For some applications, the data to be analyzed is shown as dark spots on a lighter background such as autoradiography. In those applications, a "negative" or reverse video image is generated from the acquired image before further processing. In other applications, the data to be analyzed is shown as lighter spots on a dark background. In such applications, the acquired image is used as is without doing a reverse video image. In some embodiments, it is useful to average the original acquired image before further processing to remove the background. This averaging process is identical to the process described below with reference to FIG. 15 carried out on the background removed image or the image generated by the process described with reference to FIG. 14.

Next, the computer system interacts with the user to select a particular kernel size and/or shape for use in generating the background image, as symbolized by block 68. As noted earlier, the kernel shape is typically selected by the computer based upon the type of data to be analyzed in the preferred embodiment. That is, if the data takes the form of vertical rectangular blocks, as in the case of one-dimensional separations of DNA or proteins, then the preferred kernel shape is usually rectangular. However, if the data to be analyzed takes the form of circular spots such as in DNA library screens, cells tagged with fluorescing antibodies, or images of 96-well microtiter plates, then the preferred kernel shape is circular.

Generally speaking, the size of the kernel should be substantially larger than the size of the largest data area to be analyzed. That is, if the largest data spot to be analyzed is a circle of 2 mm diameter, then the preferred kernel shape and size is a circular area having a diameter sufficient to cause the total are within the kernel to be approximately 2.5 times the radius of the 2 mm diameter data spot. The reason for this size relationship is to insure that at least some background area outside the area of data of interest are included within the kernel. This is necessary to insure that a proper background image is generated. This is because the process of generating the background image involves comparing the value of each pixel in the image to be analyzed to the values of the surrounding pixels to find a minimum value characteristic of the background. Thus, if no background pixels are included within a kernel which happens to be centered over a data spot, then the minimum intensity value which will be found in that kernel will not in fact be representative of background intensity at that location but will be representative of the intensity of the data as superimposed upon the intensity of the background.

As noted earlier herein, the kernel size may be selected by the user using any one of a number of different methods, none of which are critical to the teachings of the invention. Alternatively, the kernel size may be selected by the computer automatically, based on the type of data being analyzed. In the preferred embodiment, the kernel shape is selected by the computer automatically, based upon the data being analyzed, and the kernel size is selected by the user using a "rubber band" cursor to adjust the size of a default kernel which is superimposed over the image of data to be analyzed. The user then touches an edge of the kernel and "drags" it out to an appropriate dimension in some embodiments. In the case of rectangular kernels, the user may touch each of two opposing sides and drag each one individually out to the appropriate dimension so as to obtain the desired size and aspect ratio. This is done after dragging the kernel to a desired position on the image to be analyzed so as to surround the largest area of data shown on the image.

Figure 5:
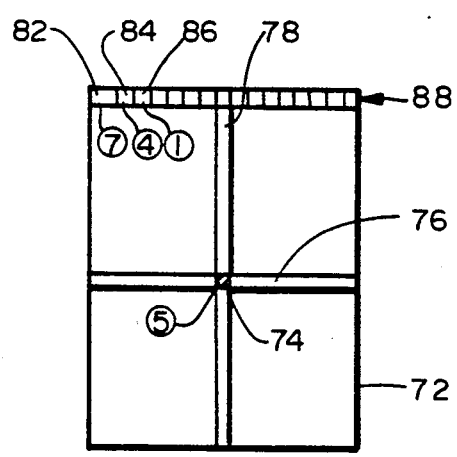
Figure 6:
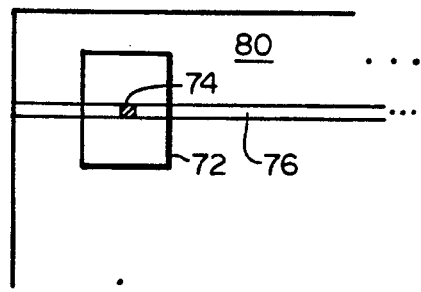

Block 70 represents the process of actually generating the background image using the kernel selected by the user. This process is best understood by reference to FIG. 5, which shows a typical kernel or neighborhood 72 of rectangular shape surrounding a pixel of interest 74. FIG. 6 shows the relationship of the kernel 72 to the overall image being processed. The pixel of interest 74 is any pixel within the area encompassed by the kernel 72. Although typically the pixel of interest is in the center of the kernel in the preferred embodiment, in alternative embodiments the pixel of interest 74 may be located anywhere within the boundaries of the kernel 72. The pixel of interest 74 is shown in the middle of a raster scan line 76 and is in the middle of a column of pixels 78. As is best seen in FIG. 6, the pixel of interest 74 is a single pixel in a line of pixels which together comprise the single raster scan line 76 of the image to be analyzed 80. The image 80 is comprised of 512 raster scan lines like the raster scan line 76 in some embodiments, and there are typically 512 pixels on each raster scan line. The size of the raster is not critical to the invention. The kernel 72 includes several pixels from the raster scan line 76 within its boundaries and includes several other raster scan lines both above and below the raster scan line 76 although these other raster scan lines are not shown in FIG. 6 to avoid unnecessary complexity.

Referring again to FIG. 5, the process of generating the background image is accomplished by comparing the value of the pixel 74 to the values of each of the other pixels in the kernel 72 and finding the minimum value pixel and substituting its value for the current value of the pixel 74. For example, assume that the pixel 74 has a value of 5 on a scale from 1 to 10. Assume also that the pixels 82, 84 and 86 in the raster scan line 88 have values of 7, 4 and 1, respectively. When the value of the pixel 74 is compared to the value of the pixel 82, the value of the pixel 74 will be less, and no substitution is made. When the value of the pixel 74 is compared to the value of the pixel 84, it will be found that the value of the pixel 84 is less than that of pixel 74, and a substitution will be made such that the value of pixel 74 is rewritten to be a 4. When pixel 74 is compared to pixel 86, it will be found that pixel 86 has a still smaller value of 1, and this value of 1 will be written to pixel 74.

This process continues until all the other pixels in the kernel 72 have been examined. Each time a new minimum is found, that value is used to update the value of the pixel 74. When this comparison process is completed for every pixel in the kernel 72, the final value of the pixel 74 will be established for use as one pixel in the background image. This process of comparing each pixel in the image 80 of FIG. 6 to all the pixels in a kernel comprised of a plurality of pixels adjacent to the pixel of interest is repeated for every pixel in the 512 by 512 pixel array of the image 80. When it has been completed, the complete background image has been generated.

The process symbolized by block 70 contemplates simultaneous processing for each pixel in the image 80 such that each pixel in the image is compared simultaneously with one other pixel in a kernel of pixels adjacent to the pixel of interest, and this process is repeated simultaneously for all pixels until all the pixels of interest have been compared to all the pixels and their respective kernels. This substantially increases the speed of processing to generate the background image. In some alternative embodiments, only a selected subset of the other pixels in each kernel will be sampled. In still other alternative embodiments, the process of comparing each pixel with the adjacent pixels in its kernel may be done serially such that each pixel of interest is compared simultaneously with all or some subset of all the pixels in the corresponding kernel such that the entire kernel is searched in a single machine cycle or however many machine cycles are necessary to make the comparison between one pixel and another. After this process is accomplished, another pixel of interest from the image to be analyzed is selected and simultaneous comparison is made of this pixel with all or some subset of the pixels in the kernel corresponding to that pixel.

Note that as the pixel of interest moves along a raster line, a corresponding kernel surrounding that pixel of interest is selected to keep the pixel of interest in the same relative location within the boundaries of the kernel.

Note also that the background image generation process must be performed using a copy of the image such that the updating of the values of each pixel of interest occurs in the copy. This is necessary because each pixel of interest is a neighboring pixel for the kernel corresponding to some other pixel of interest. Therefore, if the value of the pixel of interest in the image to be analyzed is updated prior to having processed all the other pixels in the image, there will be distortions and errors caused in the processing of other pixels whose kernels overlap the pixel which had its value changed.

After the background image is generated, it is subtracted on a pixel-by-pixel basis from the image to be analyzed, as symbolized by block 90 in FIG. 4. That is, the value of pixel 1 in raster scan line 1 of the background image is subtracted from the value of pixel 1 in raster scan line 1 of the image to be analyzed.

After this process is completed, the resultant image is displayed as a background-removed image on the monitor 54 in FIG. 3, as symbolized by block 92 in FIG. 4.

Referring to FIG. 7, there is shown symbolically the process by which whole image processing occurs in the computer apparatus according to the teachings of the invention. Simultaneous comparisons of each pixel in the image to be analyzed 80 to a single one of the adjacent pixels in the corresponding kernel is accomplished by the use of offset and compare commands to the image processing board set in the IBM AT TM. For example, assume that the image to be analyzed 80 is comprised of 9 pixels labeled A through I. Assume also that the heavy line 94 defines the boundaries of a kernel for a pixel of interest E. The phrase "pixel of interest" as the phrase is used herein means the pixel being processed which has its value compared to the other pixel values in the kernel or neighborhood and which has its value replaced if the test of the comparison is satisfied, i.e., in the case of generation of the background image, if the neighboring pixel selected from the other pixels in the kernel has a value which is less than the value of the pixel of interest.

To further the illustration, assume also that the heavy line 96 defines the boundaries for a kernel for the pixel I. Similarly, a kernel comprised of the pixels D, E, G and H can be defined for the pixel H, and a kernel comprised of the pixels B, C, E and F can be defined for the pixel F.

Now assume that the first comparison in the process of generating the background image is to compare the values of the pixels of interest in all these kernels, i.e., the pixels at the lower right-hand corner of each kernel, to the values of the pixels at the upper left-hand corner of each kernel. Thus, in the case of kernel 94, the value of pixel E, the pixel of interest, is compared to the value of the pixel A. If the value of A is less than the value of E, then the value of A will be substituted for the value of E in a copy of the image 80. This copy is shown to the right and is labeled the "offset" image. Simultaneously, the value of pixel I is compared to the value of the pixel E. If the value of E is less than the value of I, then the value of I will be overwritten with the value of E in the offset image.

The offset image 98 is originally a copy of the image to be analyzed 80. To facilitate simultaneous comparison of some or all of the pixels in image 80 to one of the pixels in their corresponding kernels, the offset image 98 is used as follows. Imagine the offset image 98 is a transparency which can be placed over the image 80 and shifted about so as to align any pixel with any other pixel. For the first comparison in the hypothetical example, the pixel E will be compared with the pixel A. To implement this, the memory map of digital data representing the "transparency", i.e., the offset image 98, is electronically placed over the memory map of digital data representing the original or "acquired" image 80 such that the offset image pixel A' lies on top of the pixel E and the offset image pixel B' lies on top of the pixel F in image 80. This aligns the offset image with the image 80 such that each pixel in the image 80 which has a pixel in the offset image 98 overlying it will be aligned with the pixel to which it is to be compared for the first round of comparisons. That is, the pixel E will be aligned with the pixel A' and the pixel F will be aligned with the pixel B'. Likewise, the pixel H will be aligned with the pixel D' and the pixel I will be aligned with the pixel E'. Examination of the kernels of image 80 indicates that for each of the overlapped pixels in image 80, i.e., the pixels of interest, the overlying pixel will be the pixel in the upper left-hand corner of the kernel in image 80 which corresponds to each pixel in image 80 which is overlapped. The offset for this first round of comparisons, then is "1 pixel up, 1 pixel left".

The value of each pixel in image 80 which is overlapped is then compared to the value of the pixel which overlaps it in image 98. If any of the pixel values in image 98 are less than the pixel values in pixel 80 which they overlie, the minimum value is used to update the pixel in the offset image corresponding to the pixel in the image 80. The pixels in the offset image 98 which correspond to the pixels in the image 80 are those with the same "relative address". To aid in understanding the meaning of the phrase "relative address" one can think of the labels A, B, etc. for the pixels in image 80 as their relative addresses or labels in memory. Thus, if the value of the pixel A, is less than the value of the pixel E, then the value of the pixel A' is written into the memory location storing the value of the pixel E'. The same process occurs for all other overlapped pixels.

Pixels in image 80 which are not overlapped, such as the pixels A, B, C, D and G, are compared to "dummy" pixels (constants or locations in the memory map which are loaded with constants) in the offset image 98 which have had their values artificially set to the maximum intensity level. This has the effect of causing the non-overlapped pixels in image 80 to never have their corresponding pixels in image 98 replaced with a minimum. The dummy pixels are labeled with Xs in image 98.

Thus, after one round of comparisons, each pixel in the image 80 will have been compared to one of the pixels in the corresponding kernel or a dummy pixel. To complete the process of generating the background image, a new offset or shift is performed to align the offset image with the image 80 such that the next pixel to be examined in each kernel overlies the pixel of interest in each kernel. Thus, for example, if the pixel E is to be compared next with the pixel D, then the offset image 98 is shifted such that the pixel D' overlaps the pixel E, and the pixel E' overlaps the pixel F. Then a new round of comparisons is made simultaneously to compare all overlapped pixels with the values of their overlapping pixels with appropriate updating where new minimums are found.

This offset/compare/update process occurs as many times as there are pixels in each kernel to be compared with the pixel of interest in each kernel. It is not necessary that all neighboring pixels in every kernel be compared with the pixel of interest to generate the background image. In fact, in some embodiments, only a sampling of the other pixels in each kernel is used to generate the background image.

The above-described process is graphically illustrated in the flow chart of FIG. 8. The process illustrated in FIG. 8 corresponds to the process symbolized by block 70 in FIG. 4. No further discussion of FIG. 8 is deemed necessary since it is self explanatory in light of the discussion above. Of course, those skilled in the art will appreciate that the background removal process can also be performed on a reverse video image by finding the maximum pixel value in each neighborhood and substituting that value for the value of the pixel of interest corresponding to that neighborhood. This technique is deemed sufficiently self-explanatory as to not warrant further discussion.

Referring to FIG. 9, there is shown a flow chart for the preferred embodiment of the process symbolized by block 68 in FIG. 4. Basically, the process represented by the flow chart of FIG. 9 represents an embodiment where the computer prompts the user to indicate what type of data is being analyzed and then selects the appropriate kernel shape based upon the user response. The user is then prompted to select an appropriate size for the kernel given the shape selected by the computer.

Referring to FIG. 10, there is shown an alternative embodiment of the process symbolized by block 68 in FIG. 4. The difference between the embodiment shown in FIG. 9 and FIG. 10 is that in the embodiment of FIG. 9, the computer selects the kernel shape based upon the user-supplied data regarding the type of application data that is to be analyzed. In FIG. 9, the user then selects the kernel size. In the embodiment of FIG. 10, once the user supplies data regarding what type of application the machine is to be used on, the user is then prompted to select the kernel shape as well as to select the kernel size. In yet another alternative embodiment, the computer may select both the shape and the size based on the application data supplied by the user.

Figure 11:
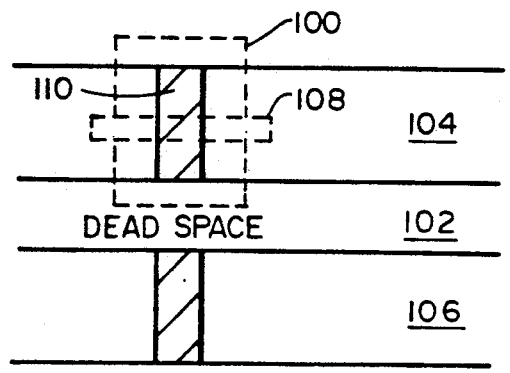
FIGS. 11 and 12 illustrate how different kernel shapes are optimized for various data applications.

FIG. 11 shows an example of two different kernel shapes for use on band type data such as is found in one-dimensional gel protein separations. The kernel shape indicated by the dashed line labeled 100 is not a good shape to use in this situation since it overlaps a portion of the dead space 102 which lies between band 104 and band 106. Since there is no valid background noise in the dead space 102, the kernel shape 100 will distort the background image, thereby creating errors. The kernel shape 108 is a better shape to use for this situation since it includes areas of the band 104 outside the data band of interest 110 but does not include any pixels in the dead space 102.

Figure 12:
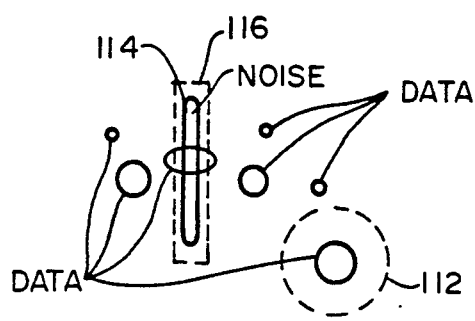

FIG. 12 illustrates a situation where differing kernel shapes are useful. The more or less circular data spots in FIG. 12 would be best quantized by the use of a circular kernel such as that shown in dashed lines at 112. However, certain types of data include vertical strips of noise in the image such as is shown at 114. In these situations, it is useful to do a two-stage background image generation process. The first stage of this process is to use a slender vertical kernel which is thinner than the thinnest noise streaks in the image. Such a kernel is shown at 116 in dashed lines. This kernel shape can effectively remove noise strips such as shown at 114. After a background image is generated using the kernel shape of 116, the second stage of the background image generation process is entered where the kernel shape changes to that shown at 112. Background image generation then proceeds operating upon the image generated using the kernel 112 on the acquired image.

Figure 13:
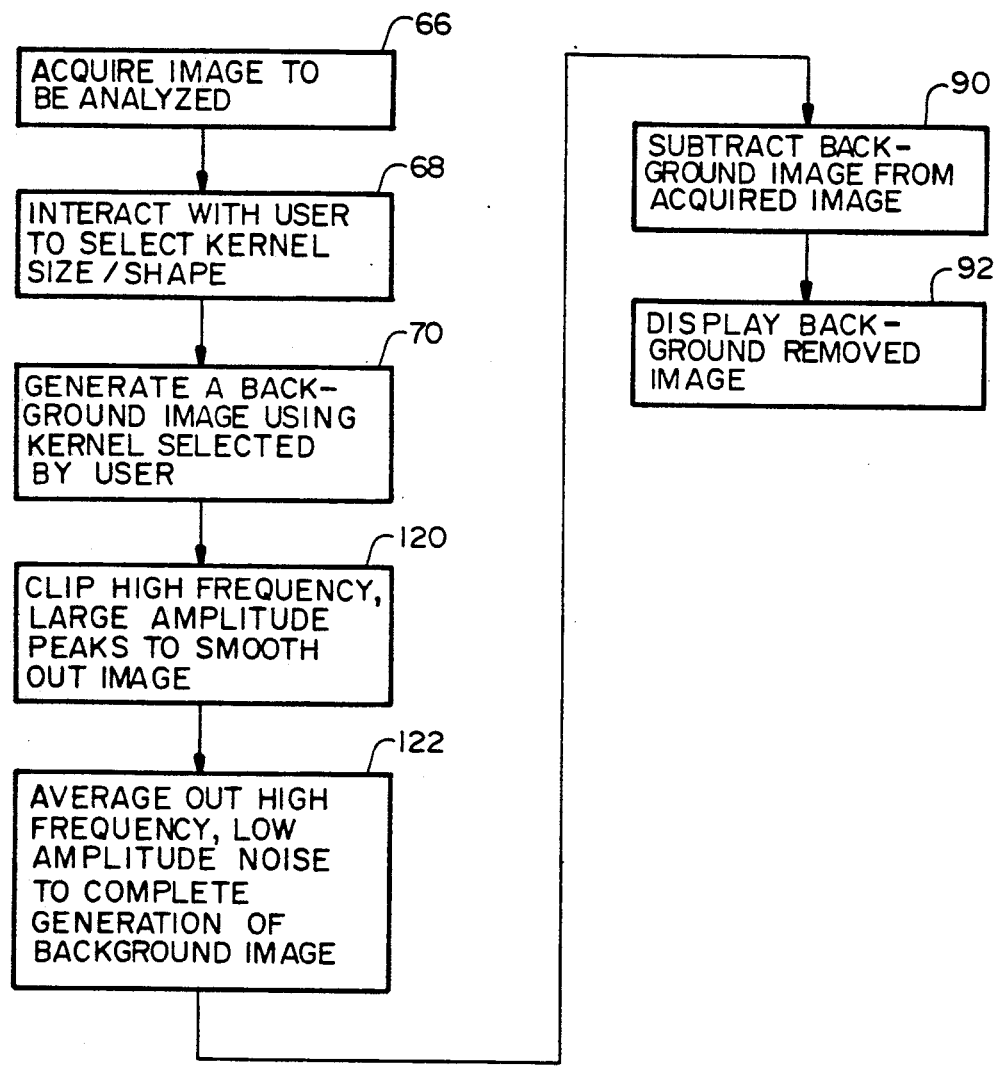
FIG. 13 is a flow chart for the preferred embodiment of the process of background noise removal.

Referring to FIG. 13, there is shown a flowchart for the preferred embodiment of a process according to the teachings of the invention. The first three stages in the process are symbolized by blocks 66, 68 and 70. These three stages are identical with the first three stages in the process symbolized by the block diagram of FIG. 4. Likewise, the last two stages, symbolized by blocks 90 and 92 are identical to the process stages symbolized by blocks 90 and 92 in FIG. 4. The difference between the process symbolized by FIG. 4 and the process symbolized by FIG. 13 lies in processed stages symbolized by blocks 120 and 122.

The process represented by block 120 is a series of steps to remove high frequency, large amplitude noise from the background image generated by the process represented by block 70. Such high frequency, large amplitude noise typically results from pinholes in the film, the penetration of gamma rays through the film or other such phenomena which cause large spikes in the intensity values of pixels. The details of this process will be given with reference to FIG. 14.

Figure 14:
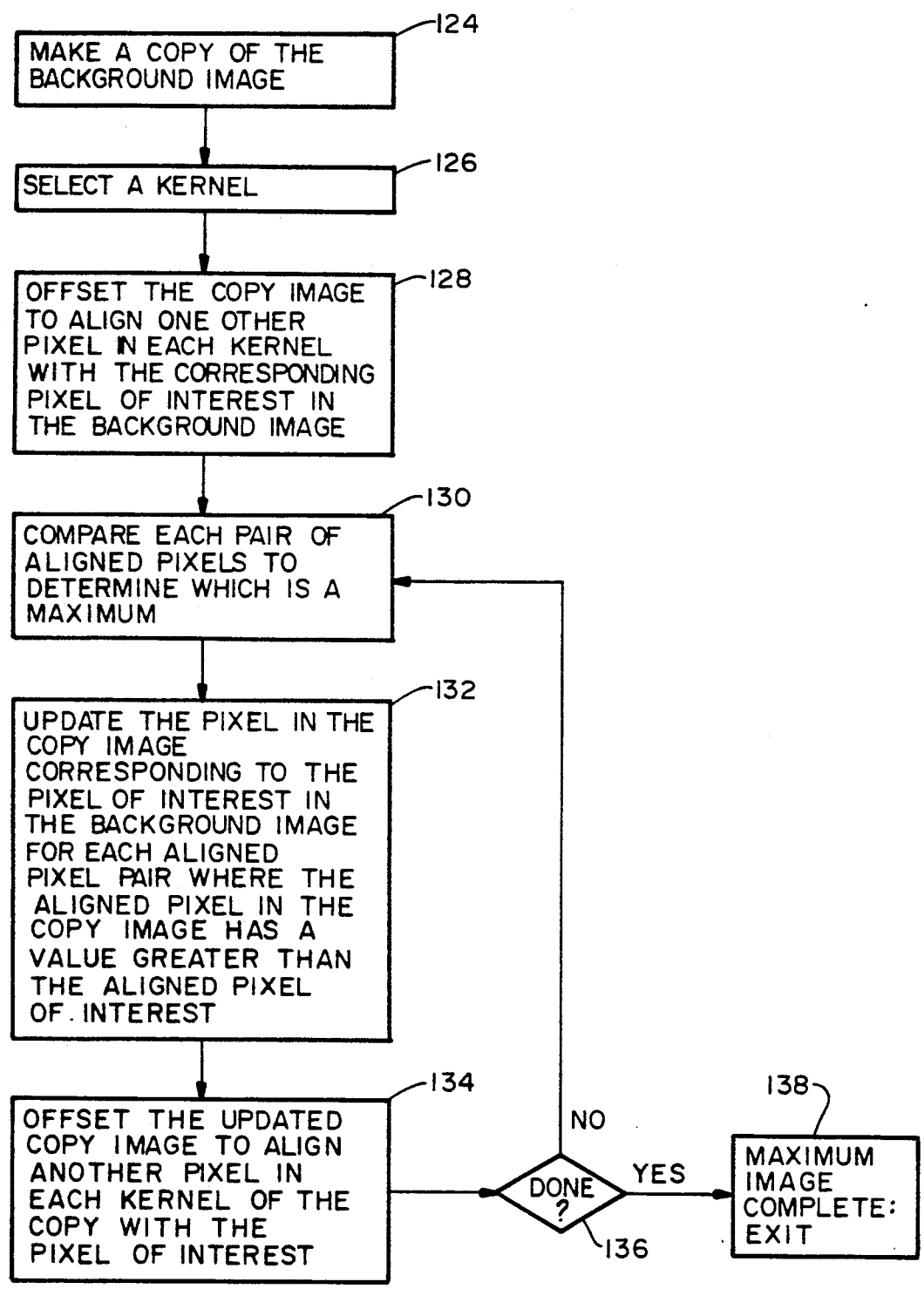
FIG. 14 is a more detailed flow chart illustrating the process of generating a maximum image.

Referring to FIG. 14, there is shown a flowchart symbolizing the process steps implemented by block 120 in FIG. 13. The process represented by FIG. 14 essentially generates a maximum image from the background image generated by block 70 in FIG. 13. This is done using a smaller kernel than was used to generate the background image and by searching throughout the kernel to find the maximum pixel value and using that value to update the value of the pixel of interest within that kernel. This process is repeated for all or some subset of all of the pixels in the image to generate a maximum image.

The first step in generating a maximum image is symbolized by block 124 representing the process of making a copy of the background image generated in the process represented by block 70 in FIG. 13.

Next, a kernel is selected as symbolized by block 126. This kernel should be smaller than the kernel used to generate the background image and, generally, is very small in that it has an area which corresponds to the area of pinhole type defects.

Next, in block 128 the copy image is offset to align any selected pixel in each kernel with the corresponding pixel of interest in the background image. This process is identical to the process described with reference to FIGS. 6, 7 and 8 except that a much smaller kernel is used.

Block 130 represents the process of comparing each pair of aligned pixels to determine which one has the maximum value. This process is also identical to the process used in generating the background image, but the neighboring pixel in the kernel is checked to determine if its value is greater than the value of the pixel of interest rather than less than as in the case of generating the background image.

Block 132 represents the process of updating the pixel in the copy image corresponding to the pixel of interest in the background image for each aligned pixel pair where the aligned pixel in the copy image has a value which is greater than the aligned pixel of interest in the background image. This process also corresponds to the background image generation process described with reference to FIGS. 6, 7 and 8 and need not be further described here.

Next, in block 134, the copy image is offset to a different location to align another pixel in each kernel with the pixel of interest in the corresponding kernel in the background image.

Then the test of block 136 is performed to determine if all the other pixels in the kernel selected for generation of the maximum image from the background image have been checked against the pixel of interest in each kernel. If all the neighboring pixels each kernel have been checked, the test of block 136 causes branching to block 138 where exit to the next step in the process is performed based upon completion of the maximum image. The next step in the process would be block 122 in FIG. 13 in the preferred embodiment. However, in alternative embodiments, the next step in the process would be block 90 in FIG. 13 or some other image processing step. If the test of block 136 indicates that not all the pixels in the kernel have been checked for a value which exceeds the value of the pixel of interest, then a branch to block 130 is performed where each pair of aligned pixels in all the kernels are checked as previously described. Steps 130, 132, 134 and 136 are performed as many times as there are neighboring pixels to the pixel of interest in each kernel. These steps 130, 132 and 134 along with step 136 result in the simultaneous processing of the entire image.

Figure 15:
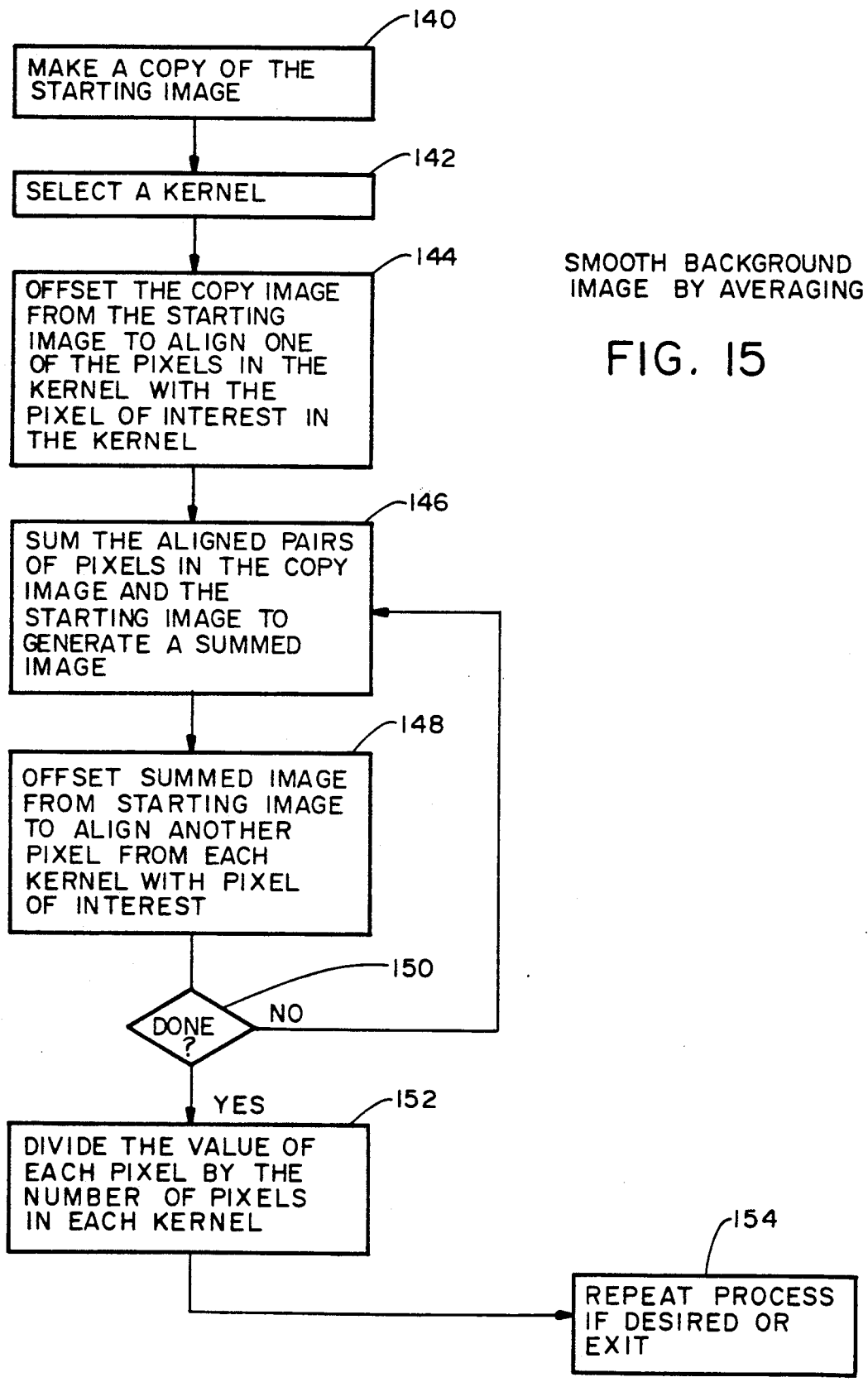
FIG. 15 is a more detailed flowchart illustrating the process of high-frequency, low-amplitude noise removal by averaging.

Referring to FIG. 15, there is shown a flowchart of the process represented by block 122 in FIG. 13. This process smooths the background image by averaging all of the pixels in a kernel thereby removing high frequency, low amplitude noise. The process of FIG. 15 can be carried out using the background image generated by the process of block 70 as the starting image in some embodiments or upon the image generated by the process represented by block 120 in FIG. 13 as the starting image. That is, alternative embodiments to the process symbolized by the flowchart at FIG. 13 are to perform either the process represented by block 120 alone or the process represented by block 122 alone or both between the processes represented by blocks 70 and 90. Accordingly, the first stage in the process represented by FIG. 15 is symbolized by block 140 and making a copy of the starting image where the starting image may be the image generated by the process represented by block 70 in FIG. 13 or the image generated by the process represented by block 120.

Next, in block 142 a kernel is selected. In some embodiments, the computer may automatically select this kernel, and in other embodiments, the user may select a kernel. In either embodiment, the size and/or shape may be variable. The size of the kernel is generally substantially smaller than the kernel used to generate the background image as selected in block 68 of FIG. 13.

Block 144 represents the process of offsetting the copy image from the starting image to align one of the pixels in each kernel having the shape and size selected in block 142 with the corresponding pixel of interest in each kernel. This process is similar to the process represented by block 128 in FIG. 14 and the process discussed with reference to FIGS. 5–8.

Next, in block 146 the pair of aligned pixels are summed with the sum being used to update the pixels in the copy image which are aligned with pixels in the starting image. In some embodiments, pixels which have no overlying pixel in the copy image are summed with a constant.

In block 148 a process is carried out to offset the summed image generated by the process of block 146 to align another pixel from each kernel with the corresponding pixel of interest in each kernel.

The test of block 150 is to determine if all other pixels in each kernel have been aligned with and summed with the pixel of interest in each kernel with the total being used to update the value of the pixel and the summed image which corresponds to the pixel of interest in each kernel. In other words, steps 144, 146 and 148 are performed a number of times equal to the number of pixels in a kernel less one. This means that every other pixel in the kernel is aligned with the pixel of interest and summed therewith. If the test of block 150 determines that not all pixels in each kernel have been summed with the pixel of interest, branching back to the process represented by block 146 occurs. If all other pixels in a kernel have been summed, the process of block 152 is performed. In this process, each pixel in the summed image has its value divided by the number of pixels in each kernel. This generates a value for each pixel in the summed image which is the average value for all pixels and the kernel. This average value is then used to update the value of the pixel in the summed image.

The resultant image is used by block 90 in FIG. 13 as the background image which is subtracted from the acquired image to leave a background removed image which is displayed by the process of block 92 in FIG. 13.

Block 154 represents the process of repeating the smoothing or averaging process if desired or necessary. If not desired or not necessary, exit to block 90 in FIG. 13 is performed.

Figure 16:
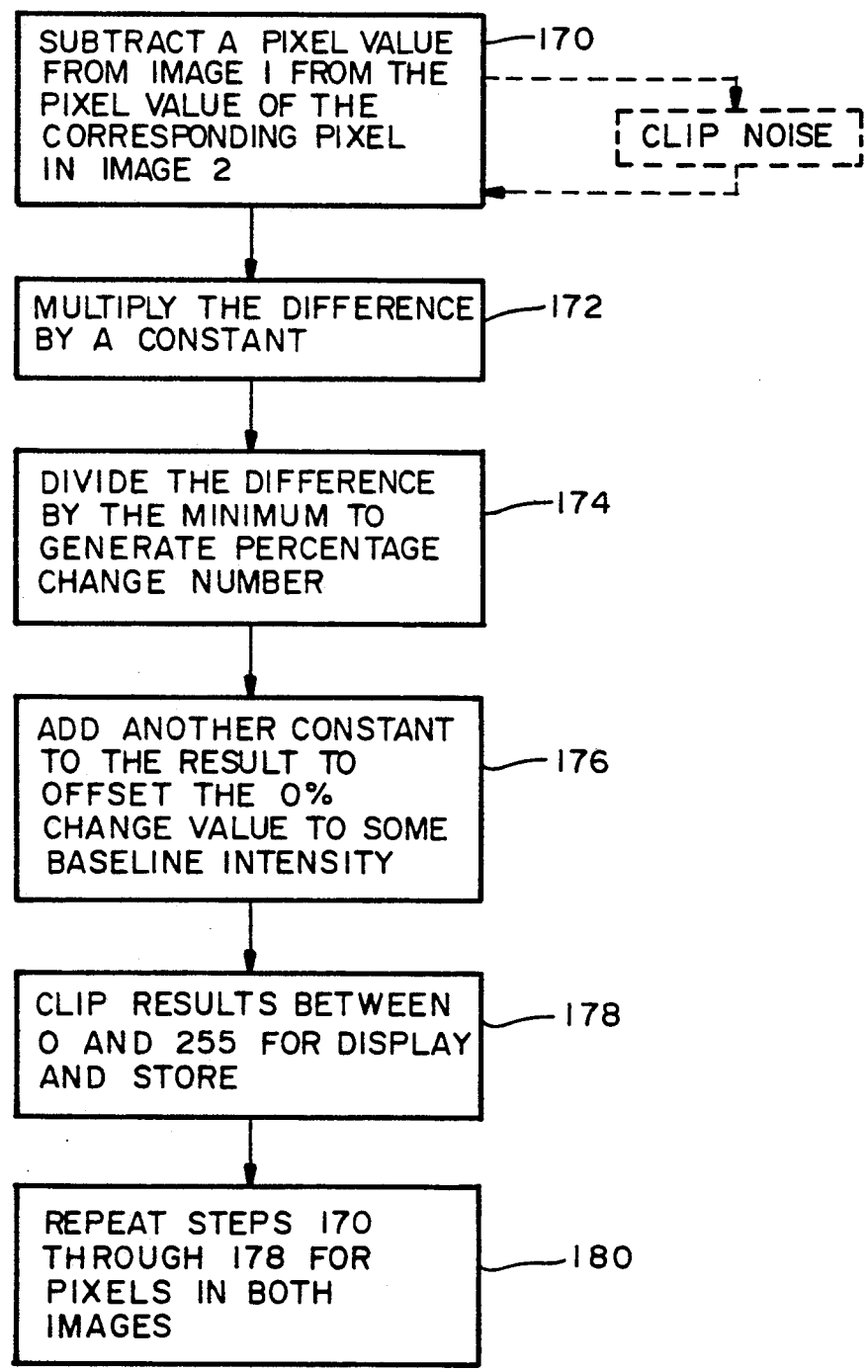
FIG. 16 is a flow chart for the process of generating a percent change image.

Referring to FIG. 16, there is shown a flow chart for a process of generating a percent change image useful in comparing two data images. Preferably, this process is carried out on a background removed image, but it may also be carried out between any two images. The process starts as symbolized in block 170 by subtracting the value of a pixel in image 1 from the value of a corresponding pixel in image 2. Typically, this process would be carried by subtracting pixel 1 of line 1 of image 1 from pixel 1 of line 1 of image 2 and storing the difference. However, the order in which the pixels are processed is immaterial as long as corresponding pixels, i.e., pixels having the same relative location in the image are subtracted. An additional feature in some embodiments including the preferred embodiment is to clip the noise from the percent change image by implementing a rule limiting the allowable differences. The rule is, if the sum of the values of the two pixels being compared is less than a noise clipping constant (fixed for any application but modifiable by the user), then the difference is set to 0. This rule has the effect of eliminating salt and pepper noise from the percent change image which can result when the differences between the images at substantially all the pixels is small.

Next, in step 172, the difference value is multiplied by a constant. This constant may, in some embodiments be fixed for all comparisons, but, in the preferred embodiment, the constant is selected by the computer based upon the application, but the user can override the selection and supply a new constant.

Step 174 represents the process of dividing the difference between the two pixel values by the minimum of the pixel values compared. This step generates a percentage change number indicating how much the intensity or value of the one of the pixels varies from the value of the other pixel. These percentage numbers vary from 255% to 1% because the maximum pixel intensity value is 255 and the minimum pixel intensity value is 1.

The significance of the constant is that it controls what percentages changes can be seen in the final percent change image and the intensities at which the percent change pixels are displayed. That is, the constant controls the range of percentage differences which can be seen by stepping up the percentage change numbers to larger numbers. However, the maximum intensity value which can be displayed is 255. Therefore, selection of larger constants can lead to clipping since the resulting percentage change numbers after multiplication can exceed 255. In the preferred embodiment, the constant ranges from +1 to +256, but in other embodiments, any number between 0 and any positive number could be used including fractional numbers.

In step 176, the result from step 174 is added to another constant to set the 0% change number equal to some reference intensity value. In the preferred embodiment, intensity values range from 1 to 255, and the constant used in step 176 is 127 such that the 0% change falls in the middle of the gray scale.

In step 178, the results from step 176 are clipped between 0 and 255 for purposes of using the results on a video display. The result is stored in a percent change image file or framestore.

Step 180 represents the process of repeating steps 170 through 178 for all pixels in both images to complete generation of the percent change image. The image may then be displayed for inspection and analysis.

Figure 17:
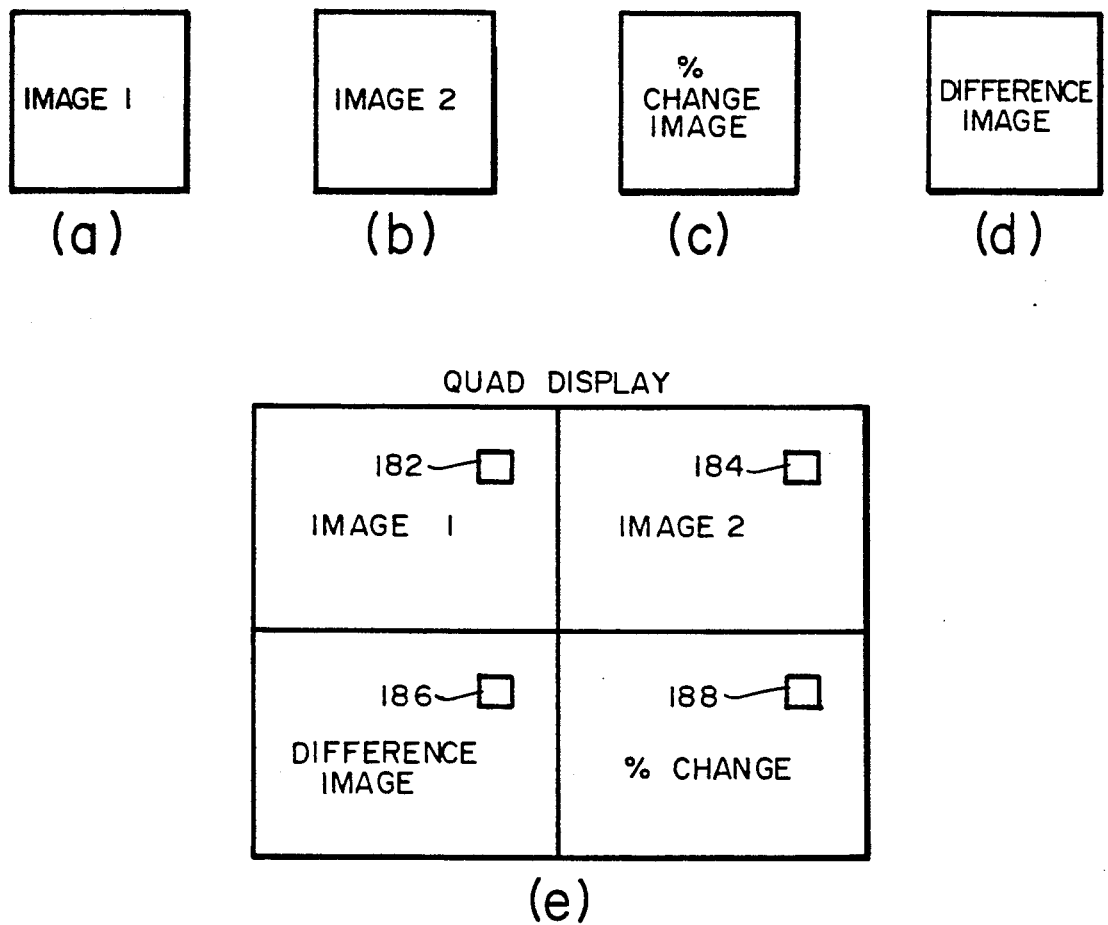
FIGS. 17(a) through 17(e) are the components of a quad display and the quad display itself.

Referring to FIGS. 17(a) through 17(b), there are shown a plurality of images which together comprise the components of a quad display and the quad display itself. The purpose of a quad display is to facilitate visual comparisons and analysis of data bearing images. The components of a quad display are the two compared images used to generate the percent change image, the percent change image itself, and a fourth image which is called the difference image. This difference image is at each pixel the difference between the two corresponding pixels in images 1 and 2, divided by 2 and added to 127. The percent change image is the image generated by the process of FIG. 16. The term "corresponding pixels" for the description of the difference image means the same thing as that term as used for the percent change image.

If the display hardware is large enough to display four complete images of the size of image 1, then all four images are simultaneously displayed as arranged in FIG. 17(e). If however, the display apparatus can display only one image having the number of pixels in image 1, then several alternative embodiments are possible. First, each image may be sampled to develop of subset of pixel for that image. Such sampling can include selecting every other pixel on every other line such that one-fourth of the total number of pixels remain to be displayed. In another alternative embodiment, a selection of one-quarter of each image is made, and that quarter of an image is displayed in the corresponding portion of the quad display of FIG. 17(e). The quarter of each image selected can be selected by the user or by the computer based upon the application or can be set to a default selection by the computer and modifiable by the user. The possibilities for which one-quarter to select are numerous and include one quadrant of each image, a horizontal strip amounting to one-fourth of the pixels or a vertical strip amounting to one-fourth of the pixels.

In the preferred embodiment, the user selects which quarter of each image to be displayed by manipulation of a "linked" cursor in a scout image. The scout image is, in the preferred embodiment, a 2 to 1 minification or subset of image 2. This minification is performed by selecting every other pixel of every other line and displaying the result as the scout image in the lower left quadrant of the display. The linked cursor is a fixed cursor encompassing one-fourth of the total area of the scout image. The user manipulates the position of this cursor by manipulation of a mouse, track ball or light pen etc. Also, the position of the cursor can be positioned by default in one of the four quadrants of the scout image and this position can then be modified by the user. As the user moves the cursor in the scout image, a corresponding cursor in each of the other three images moves synchronously to encompass the pixels corresponding to the pixels encompassed by the cursor in the scout image. When the user, selects a position for the cursor in the scout image as the final position, the corresponding pixels in the other three images are selected and displayed in the corresponding quadrants of the quad display shown in FIG. 17(e). Simultaneously, all the pixels in the difference image corresponding to the selected pixels in images 1, 2 are displayed in the lower left quadrant of the quad display.

Figure 18:
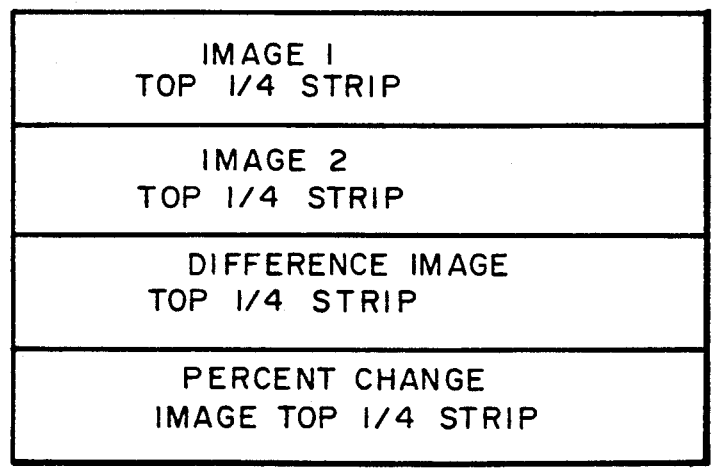
FIG. 18 is another type of quad display.

In other embodiments, the quad display may be arranged differently. An example of such an alternative arrangement is as shown in FIG. 18. Any combination of hardware and software to implement this process and cursor manipulation will suffice for purposes of practicing the invention. The preferred embodiment of computer code which when combined with the hardware illustrated in FIG. 3 will implement the teachings of the invention is given in Appendix A.

Referring again to FIG. 17(e) there is shown the positions for four measurement cursor locations covering four sets of corresponding pixels. These cursor locations are shown at 182, 184, 186 and 188 in exemplary rectangular shape. The shape and size of the cursors can be selected by default by the computer and be modifiable by the user or can be selected outright by the user.

After the position, shape and size of the cursor is established by visually or automatically locating objects showing significant differences in the percent change image as indicated by a light (high intensity value) spot or a dark spot in a gray background, the computer calculates some quantity related to the values of the pixels inside the cursor. Examples of what these quantities can be are: 1) absorption meaning the sum of all the pixel values within the cursor in preselected units, which can be optical density, counts per minute, etc. for images 1 and 2 only; 2) the average value of all pixels in each cursor location for images 1 and 2; 3) square millimeters of optical density meaning absorption in optical density units divided by the number of pixels per square millimeter. Once these values are calculated for images 1 and 2, the values for the corresponding sets of pixels in the cursor locations in the percent change and difference images are automatically determined. That is, for the percent change image, the value returned for the cursor location is calculated according to the algorithm specified in FIG. 16 as modified by omission of multiplication by the constant and addition of the second constant. That is, the number returned for the cursor location in the percent change image is the value determined for the cursor in image 1 minus the value for the cursor in image 2 divided by the minimum value between these two numbers.

Likewise, the value returned for the cursor in the difference image is the value of the difference between the values returned for the cursor locations in images 1 and 2 divided by 2.

Figure 19:
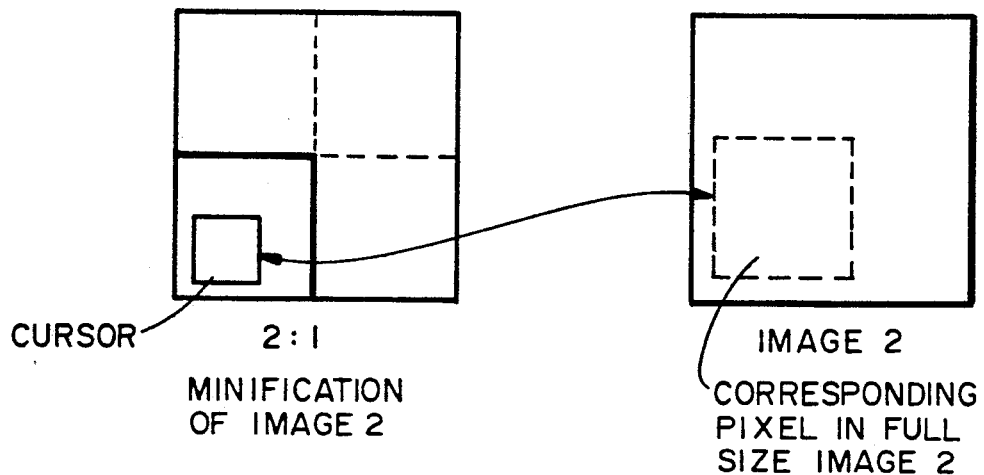
FIG. 19 illustrates the concept of linked cursors for the quad display.

FIG. 19 clarifies how the cursor manipulated by the user in the 2 to 1 minified scout image (subset of image 2) corresponds to one-quarter of the pixels in the full size image 2 at the same relative location in the image.

Figure 20:
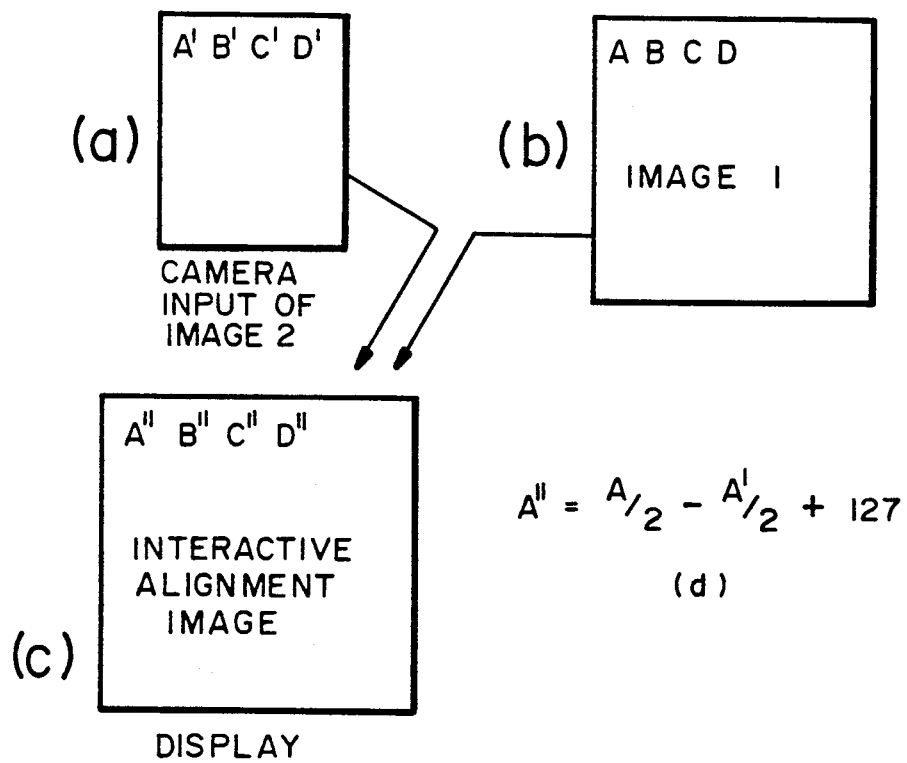
FIG. 20 illustrates the process for alignment of images 1 and 2 which must be performed prior to the computation of values for the cursor locations in the quad display.

Referring to FIG. 20, there is shown a diagram illustrating the process of alignment of images 1 and 2 which is necessary for the computation of values for the pixels in the cursors in the quad display. FIG. 20(a) represents the camera input video data that defines image 2. FIG. 20(b) illustrates an already acquired image 1 stored in a frame buffer. The corresponding pixels from these two images are combined according to the algorithm specified in FIG. 20(d) to generate the image of FIG. 20(c) on the display. The user then manipulates image 2 under the camera until the displayed image calculated per the equation of FIG. 20(d) shows minimal difference between image 1 and image 2. When this condition exists, the user so indicates, and the pixels of the image of FIG. 20(a) are captured in a frame buffer as the final image 2 for use in the processing described above to return the values for the selected cursor locations in the quad display shown in FIG. 17.

Although the invention has been described in terms of the preferred and alternative embodiments disclosed herein, those skilled in the art will appreciate numerous modifications which can be made without departing from the spirit and scope of the invention. All such modifications are intended to be included within the scope of the claims appended hereto.

```
·00000   80 0B 00 09 61 63 71 39-36 67 6F 2E 63 61 88 07   ....acq96go.ca..
 00010   00 00 00 4D 53 20 43 6E-88 09 00 00 9F 4C 4C 49   ...MS Cn.....LLI
 00020   42 43 45 25 88 06 00 00-9D 32 6C 4F E8 88 06 00   BCE%.....2lO....
 00030   00 A1 01 43 56 37 96 4C-00 00 06 44 47 52 4F 55   ...CV7.L...DGROU
 00040   50 0C 41 43 51 39 36 47-4F 5F 54 45 58 54 04 43   P.ACQ96GO_TEXT.C
·00050   4F 44 45 05 5F 44 41 54-41 04 44 41 54 41 05 43   ODE._DATA.DATA.C
·00060   4F 4E 53 54 04 5F 42 53-53 03 42 53 53 08 46 41   ONST._BSS.BSS.FA
·00070   52 5F 44 41 54 41 0D 41-43 51 39 36 47 4F 35 5F   R_DATA.ACQ96GO5_
·00080   44 41 54 41 51 98 07 00-48 58 15 03 04 01 A4 98   DATAQ...HX......
 00090   07 00 48 B6 06 05 06 01-51 98 07 00 48 0E 00 07   ..H.....Q...H...
·00A0   07 01 FC 98 07 00 48 F0-00 08 09 01 17 98 07 00   ......H.........
 000B0   68 00 06 0B 0A 01 DD 9A-08 00 02 FF 03 FF 04 FF   h...............
 000C0   02 56 9C 0D 00 00 03 01-02 02 01 03 04 40 01 45   .V...........@.E
 000D0   01 C0 8C 19 00 0A 5F 5F-61 63 72 74 75 73 65 64   ......__acrtused
 000E0   00 0A 5F 6D 6F 76 65 5F-67 72 69 64 00 13 B4 14   .._move_grid....
 000F0   00 11 61 63 71 5F 61 6E-64 5F 61 6C 69 67 6E 5F   ..acq_and_align_
 00100   39 36 77 00 B1 8C 1A 00-05 5F 7A 65 72 6F 00 10   96w......_zero..
 00110   5F 67 65 74 5F 70 72 6F-62 65 31 5F 6E 61 6D 65   _get_probe1_name
 00120   00 DF B4 15 00 12 64 65-66 69 6E 65 5F 65 6C 6C   ......define_ell
 00130   69 70 73 65 5F 39 36 77-00 28 8C BC 00 04 5F 6F   ipse_96w.(...._o
 00140   6E 65 00 08 5F 73 70 72-69 6E 74 66 00 10 5F 67   ne.._sprintf.._g
 00150   65 74 5F 70 72 6F 62 65-32 5F 6E 61 6D 65 00 04   et_probe2_name..
 00160   5F 74 77 6F 00 08 5F 6D-65 6E 75 5F 75 70 00 10   _two.._menu_up..
 00170   5F 67 65 74 5F 70 72 6F-62 65 33 5F 6E 61 6D 65   _get_probe3_name
 00180   00 10 5F 67 65 74 5F 70-72 6F 62 65 34 5F 6E 61   .._get_probe4_na
 00190   6D 65 00 0B 5F 62 6C 69-6E 6B 5F 69 74 65 6D 00   me.._blink_item.
 001A0   0F 5F 64 72 61 77 5F 6D-65 6E 75 5F 69 74 65 6D   ._draw_menu_item
 001B0   00 0A 5F 6D 65 6E 75 5F-64 6F 77 6E 00 1C 5F 67   .._menu_down.._g
 001C0   65 74 5F 73 74 61 6E 64-61 72 64 5F 67 72 69 64   et_standard_grid
 001D0   5F 73 74 72 75 63 74 75-72 65 00 0A 5F 6D 65 6E   _structure.._men
 001E0   75 5F 70 72 6F 63 00 08-5F 61 63 71 39 36 67 6F   u_proc.._acq96go
 001F0   00 05 5F 62 65 6C 6C 00-AE B4 0C 00 09 78 5F 61   .._bell......x_a
 00200   63 71 39 36 67 6F 00 E6-8C BF 00 0B 5F 69 6D 5F   cq96go......_im_
 00210   70 72 6F 63 77 69 6E 00-08 5F 61 63 74 69 6F 6E   procwin.._action
 00220   73 00 09 5F 69 6D 5F 63-6C 65 61 72 00 06 5F 63   s.._im_clear.._c
 00230   6C 5F 77 6E 00 09 5F 63-6C 5F 6F 76 6C 75 74 00   l_wn.._cl_ovlut.
 00240   0B 5F 66 69 6E 64 5F 64-65 6E 39 36 00 07 5F 6C   ._find_den96.._l
 00250   6C 5F 61 6C 75 00 09 5F-67 72 61 70 68 69 6E 74   l_alu.._graphint
 00260   00 0A 5F 6C 6C 5F 62 61-73 5F 66 62 00 1C 5F 70   .._ll_bas_fb.._p
 00270   75 74 5F 73 74 61 6E 64-61 72 64 5F 67 72 69 64   ut_standard_grid
 00280   5F 73 74 72 75 63 74 75-72 65 00 0C 5F 69 6D 5F   _structure.._im_
 00290   67 72 61 70 68 77 69 6E-00 0A 5F 6C 6C 5F 77 69   graphwin.._ll_wi
 002A0   6E 5F 66 62 00 0D 5F 6D-73 73 61 67 65 5F 61   n_fb.._message_a
 002B0   72 65 61 00 13 5F 67 65-74 5F 65 78 70 65 72 69   rea.._get_experi
 002C0   6D 65 6E 74 5F 6B 65 79-00 EE B4 0F 00 0C 64 72   ment_key......dr
 002D0   61 77 5F 65 6C 6C 69 70-73 65 00 36 8C 46 00 08   aw_ellipse.6.F..
 002E0   5F 6C 6C 5F 6D 6F 64 65-00 0A 5F 69 6D 5F 6F 70   _ll_mode.._im_op
 002F0   6D 6F 64 65 00 12 5F 63-6C 65 61 72 5F 61 63 74   mode.._clear_act
 00300   69 6F 6E 5F 61 72 65 61-00 07 5F 6C 6C 5F 62 75   ion_area.._ll_bu
 00310   73 00 10 5F 63 6C 65 61-72 5F 6D 65 6E 75 5F 61   s.._clear_menu_a
 00320   72 65 61 00 13 B4 17 00-14 62 75 69 6C 64 5F 69   rea......build_i
 00330   6D 61 67 65 5F 66 69 6C-65 6E 61 6D 65 00 0F 8C   mage_filename...
 00340   A6 00 13 5F 63 6C 65 61-72 5F 6D 65 73 73 61 67   ..._clear_messag
 00350   65 5F 61 72 65 61 00 0C-5F 69 6D 5F 66 72 6F 6D   e_area.._im_from
 00360   64 69 73 6B 00 14 5F 77-72 69 74 65 5F 61 6C 6C   disk.._write_all
```

```
00370  5F 73 74 61 6E 64 61 72-64 73 00 08 5F 66 6C 69   _standards.._fli
00380  63 6B 65 72 00 0D 5F 69-6D 5F 64 69 73 66 6F 72   cker.._im_disfor
00390  6D 61 74 00 0C 5F 6C 6C-5F 74 6B 5F 66 69 65 6C   mat.._ll_tk_fiel
003A0  64 00 0B 5F 69 6D 5F 6F-75 74 70 61 74 68 00 07   d.._im_outpath..
003B0  5F 6D 6F 75 73 65 72 00-08 5F 69 6D 5F 73 79 6E   _mouser.._im_syn
003C0  63 00 09 5F 69 6D 5F 76-69 64 65 6F 00 06 5F 6F   c.._im_video.._o
003D0  76 6C 75 74 00 07 5F 64-65 6E 39 36 77 00 07 5F   vlut.._den96w.._
003E0  65 72 72 6D 73 67 00 62-B0 16 00 10 5F 61 63 71   errmsg.b...._acq
003F0  39 36 67 6F 5F 65 6C 6C-69 70 73 65 00 61 0C 01   96go_ellipse.a..
00400  96 8C DC 00 12 5F 67 65-74 5F 70 69 63 5F 64 69   ....._get_pic_di
00410  72 65 63 74 6F 72 79 00-05 5F 65 78 69 74 00 0F   rectory.._exit..
00420  5F 73 65 74 5F 6D 65 6E-75 5F 74 69 74 6C 65 00   _set_menu_title.
00430  06 5F 6B 5F 65 78 70 00-13 5F 67 65 74 5F 63 61   ._k_exp.._get_ca
00440  6D 69 6E 69 74 5F 76 61-6C 75 65 73 00 0C 5F 69   minit_values.._i
00450  6D 5F 73 65 74 63 6F 6C-6F 72 00 15 5F 63 6C 6F   m_setcolor.._clo
00460  73 65 5F 73 74 61 6E 64-61 72 64 73 5F 66 69 6C   se_standards_fil
00470  65 00 0C 5F 69 6D 5F 64-72 61 77 6D 6F 64 65 00   e.._im_drawmode.
00480  07 5F 76 5F 70 6C 73 74-00 08 5F 69 6D 5F 6D 6F   ._v_plst.._im_mo
00490  76 65 00 13 5F 70 75 74-5F 63 61 6D 69 6E 69 74   ve.._put_caminit
004A0  5F 76 61 6C 75 65 73 00-0E 5F 67 65 74 5F 73 74   _values.._get_st
004B0  61 6E 64 61 72 64 73 00-0B 5F 69 6D 5F 65 6C 6C   andards.._im_ell
004C0  69 70 73 65 00 0C 5F 73-65 74 5F 6D 65 73 73 61   ipse.._set_messa
004D0  67 65 00 0A 5F 69 6D 5F-6F 66 66 73 65 74 00 D4   ge.._im_offset..
004E0  B0 13 00 0D 5F 61 63 71-39 36 67 6F 5F 67 72 69   ...._acq96go_gri
004F0  64 00 61 0C 01 E4 8C 0E-01 08 5F 69 6D 5F 67 61   d.a......._im_ga
00500  69 6E 00 0D 5F 53 65 74-43 75 72 73 6F 72 50 6F   in.._SetCursorPo
00510  73 00 11 5F 73 65 74 5F-73 63 72 65 65 6E 5F 74   s.._set_screen_t
00520  69 74 6C 65 00 0B 5F 77-72 69 74 65 5F 67 72 69   itle.._write_gri
00530  64 00 0C 5F 69 6D 5F 73-6F 66 74 69 6E 69 74 00   d.._im_softinit.
00540  1B 5F 73 68 6F 77 5F 73-74 61 6E 64 61 72 64 5F   ._show_standard_
00550  6D 65 6E 75 5F 61 63 74-69 6F 6E 73 00 06 5F 62   menu_actions.._b
00560  64 72 5F 30 00 0F 5F 63-6C 6F 73 65 5F 64 61 74   dr_0.._close_dat
00570  61 62 61 73 65 00 05 5F-6D 6F 76 65 00 1C 5F 75   abase.._move.._u
00580  70 64 61 74 65 5F 6D 6F-75 73 65 5F 62 75 74 74   pdate_mouse_butt
00590  6F 6E 5F 64 69 73 70 6C-61 79 00 1C 5F 77 61 69   on_display.._wai
005A0  74 5F 66 6F 72 5F 6D 6F-75 73 65 5F 62 75 74 74   t_for_mouse_butt
005B0  6F 6E 5F 70 72 65 73 73-00 1E 5F 77 61 69 74 5F   on_press.._wait_
005C0  66 6F 72 5F 6D 6F 75 73-65 5F 62 75 74 74 6F 6E   for_mouse_button
005D0  5F 72 65 6C 65 61 73 65-00 08 5F 69 6D 5F 77 6C   _release.._im_wl
005E0  75 74 00 08 5F 69 6D 5F-6D 61 73 6B 00 0B 5F 62   ut.._im_mask.._b
005F0  75 69 6C 64 5F 6B 65 79-73 00 0A 5F 69 6D 5F 63   uild_keys.._im_c
00600  73 74 61 72 74 00 A4 B4-0C 00 09 64 72 61 77 5F   start......draw_
00610  67 72 69 64 00 84 8C 3C-00 09 5F 69 6D 5F 63 67   grid...<.._im_cg
00620  72 61 62 00 0E 5F 6F 70-65 6E 5F 64 61 74 61 62   rab.._open_datab
00630  61 73 65 00 09 5F 69 6D-5F 69 6E 6D 61 70 00 13   ase.._im_inmap..
00640  5F 61 63 71 75 69 72 65-5F 69 6E 74 65 67 72 61   _acquire_integra
00650  74 65 64 00 55 B4 1F 00-10 61 63 71 39 36 67 6F   ted.U....acq96go
00660  5F 6D 76 70 5F 69 6E 69-74 00 0A 61 6C 74 65 72   _mvp_init..alter
00670  5F 67 72 69 64 00 B7 8C-0D 00 0A 5F 69 6D 5F 74   _grid......_im_t
00680  6F 64 69 73 6B 00 3B B4-21 00 0D 61 63 71 5F 66   odisk.;.!..acq_f
00690  69 72 73 74 5F 39 36 77-00 0F 61 64 6A 75 73 74   irst_96w..adjust
006A0  5F 67 72 69 64 5F 39 36-77 00 39 90 18 00 01 02   _grid_96w.9.....
006B0  11 5F 61 63 71 39 36 67-6F 5F 69 74 65 6D 6C 69   ._acq96go_itemli
006C0  73 74 62 01 00 3E B6 2E-00 00 01 11 61 63 71 5F   stb..>......acq_
006D0  61 6E 64 5F 61 6C 69 67-6E 5F 39 36 77 7A 09 00   and_align_96wz..
006E0  12 64 65 66 69 6E 65 5F-65 6C 6C 69 70 73 65 5F   .define_ellipse_
006F0  39 36 77 BC 0E 00 38 90-14 00 01 02 0D 5F 61 63   96w...8......_ac
00700  71 39 36 67 6F 5F 6D 65-6E 75 DA 01 00 84 90 0F   q96go_menu......
00710  00 00 01 08 5F 61 63 71-39 36 67 6F 00 00 00 7F   ...._acq96go....
00720  B6 8B 00 00 01 09 78 5F-61 63 71 39 36 67 6F 32   ......x_acq96go2
00730  00 00 0C 64 72 61 77 5F-65 6C 6C 69 70 73 65 46   ...draw_ellipseF
00740  12 00 14 62 75 69 6C 64-5F 69 6D 61 67 65 5F 66   ...build_image_f
00750  69 6C 65 6E 61 6D 65 FA-08 00 09 64 72 61 77 5F   ilename....draw_
00760  67 72 69 64 16 15 00 10-61 63 71 39 36 67 6F 5F   grid....acq96go_
00770  6D 76 70 5F 69 6E 69 74-A4 12 00 0A 61 6C 74 65   mvp_init....alte
00780  72 5F 67 72 69 64 D4 14-00 0D 61 63 71 5F 66 69   r_grid....acq_fi
00790  72 73 74 5F 39 36 77 1C-07 00 0F 61 64 6A 75 73   rst_96w....adjus
```

```
0007A0  74 5F 67 72 69 64 5F 39-36 77 8E 0C 00 01 88 04  t_grid_96w......
0007B0  00 00 A2 01 D1 A0 44 01-02 00 00 61 63 71 69 6D  ......D....acqim
0007C0  67 00 00 70 69 00 00 41-75 74 6F 6D 61 74 69 63  g..pi..Automatic
0007D0  20 61 63 71 75 69 73 69-74 69 6F 6E 20 73 65 71   acquisition seq
0007E0  75 65 6E 63 65 00 41 64-6A 75 73 74 20 67 72 69  uence.Adjust gri
0007F0  64 20 6C 6F 63 61 74 69-6F 6E 20 61 6E 64 20 73  d location and s
000800  69 7A 65 00 53 75 72 72-6F 75 6E 64 20 6C 61 72  ize.Surround lar
000810  67 65 73 74 20 63 6F 6C-6F 6E 79 20 69 6E 20 67  gest colony in g
000820  72 69 64 20 63 65 6C 6C-20 0A 28 49 6E 73 63 72  rid cell .(Inscr
000830  69 62 65 64 20 65 6C 6C-69 70 73 65 20 69 73 20  ibed ellipse is
000840  74 68 65 20 64 65 66 61-75 6C 74 29 00 41 6C 74  the default).Alt
000850  65 72 6E 61 74 65 20 42-65 74 77 65 65 6E 20 49  ernate Between I
000860  6D 61 67 65 73 20 56 69-65 77 65 64 00 41 63 71  mages Viewed.Acq
000870  75 69 73 69 74 69 6F 6E-20 63 6F 6D 70 6C 65 74  uisition complet
000880  65 2C 0A 53 65 6C 65 63-74 20 74 6F 20 63 6F 6E  e,.Select to con
000890  74 69 6E 75 65 20 61 6E-61 6C 79 73 69 73 00 41  tinue analysis.A
0008A0  63 71 75 69 72 65 20 20-20 20 20 20 20 20 20 20  cquire
0008B0  69 6D 61 67 65 00 41 63-71 75 69 72 65 20 20 20  image.Acquire
0008C0  20 20 20 20 20 20 20 69-6D 61 67 65 00 41 63 71         image.Acq
0008D0  75 69 72 65 20 20 20 20-20 20 20 20 20 69 6D    uire         im
0008E0  61 67 65 00 41 63 71 75-69 72 65 20 20 20 20 20  age.Acquire
0008F0  20 20 20 20 20 69 6D 61-67 65 00 8E A0 B9 03 02       image......
000900  38 02 42 69 6F 6C 6F 67-69 63 61 6C 20 56 69 73  8.Biological Vis
000910  69 6F 6E 20 2D 20 20 49-6D 61 67 65 20 41 63  ion -  Image Ac
000920  71 75 69 73 69 74 69 6F-6E 00 49 6D 61 67 65 20  quisition.Image
000930  41 63 71 75 69 73 69 74-69 6F 6E 20 4D 65 6E 75  Acquisition Menu
000940  00 43 6F 75 6C 64 20 6E-6F 74 20 6F 70 65 6E 20  .Could not open
000950  74 68 65 20 64 61 74 61-62 61 73 65 20 66 69 6C  the database fil
000960  65 2E 00 43 6F 75 6C 64-20 6E 6F 74 20 66 69 6E  e..Could not fin
000970  64 20 65 78 70 65 72 69-6D 65 6E 74 20 72 65 63  d experiment rec
000980  6F 72 64 20 69 6E 20 64-61 74 61 62 61 73 65 20  ord in database
000990  66 6F 72 20 6B 65 79 20-25 6C 64 2E 00 43 6F 75  for key %ld..Cou
0009A0  6C 64 20 6E 6F 74 20 6F-70 65 6E 20 74 68 65 20  ld not open the
0009B0  73 74 61 6E 64 61 72 64-73 20 66 69 6C 65 20 66  standards file f
0009C0  6F 72 20 6B 65 79 20 25-6C 64 2E 00 00 41 63 71  or key %ld...Acq
0009D0  75 69 72 65 20 00 20 69-6D 61 67 65 00 41 43 51  uire . image.ACQ
0009E0  55 49 53 49 54 49 4F 4E-20 2D 20 39 36 2D 57 45  UISITION - 96-WE
0009F0  4C 4C 00 41 43 51 55 49-53 49 54 49 4F 4E 20 2D  LL.ACQUISITION -
00A00  20 39 36 2D 57 45 4C 4C-00 41 6C 69 67 6E 20 25   96-WELL.Align %
00A10  73 20 69 6D 61 67 65 20-77 69 74 68 20 67 72 69  s image with gri
00A20  64 2C 20 70 72 65 73 73-20 6D 6F 75 73 65 20 62  d, press mouse b
00A30  75 74 74 6F 6E 20 77 68-65 6E 20 64 6F 6E 65 2E  utton when done.
00A40  00 54 68 65 20 67 61 69-6E 20 61 6E 64 20 6F 66  .The gain and of
00A50  66 73 65 74 20 76 61 6C-75 65 20 66 6F 72 20 69  fset value for i
00A60  6D 61 67 65 20 25 73 20-61 72 65 20 25 33 64 20  mage %s are %3d
00A70  61 6E 64 20 25 33 64 2E-00 53 61 76 69 6E 67 20  and %3d..Saving
00A80  61 63 71 75 69 72 65 64-20 69 6D 61 67 65 20 74  acquired image t
00A90  6F 20 64 69 73 6B 20 3A-20 25 73 00 25 73 25 73  o disk : %s.%s%s
00AA0  25 73 2E 25 73 25 73 25-73 2E 00 25 73 25 73 25  %s.%s%s%s..%s%s%
00AB0  73 2E 25 73 25 73 00 41-6C 69 67 6E 20 25 73  s.%s%s.Align %s
00AC0  20 69 6D 61 67 65 20 75-6E 64 65 72 20 63 61 6D   image under cam
00AD0  65 72 61 2C 20 6D 69 6E-69 6D 69 7A 69 6E 67 20  era, minimizing
00AE0  74 68 65 20 66 65 61 74-75 72 65 73 20 6F 66 20  the features of
00AF0  74 68 65 00 64 69 66 66-65 72 65 6E 63 65 20 69  the.difference i
00B00  6D 61 67 65 2E 20 20 50-72 65 73 73 20 6D 6F 75  mage.  Press mou
00B10  73 65 20 62 75 74 74 6F-6E 20 77 68 65 6E 20 64  se button when d
00B20  6F 6E 65 2E 00 50 72 65-73 73 20 61 6E 79 20 62  one..Press any b
00B30  75 74 74 6F 6E 20 74 6F-20 00 61 63 63 65 70 74  utton to .accept
00B40  20 69 6D 61 67 65 20 61-6C 69 67 6E 6D 65 6E 74   image alignment
00B50  2E 00 54 68 65 20 67 61-69 6E 20 61 6E 64 20 6F  ..The gain and o
00B60  66 66 73 65 74 20 76 61-6C 75 65 20 66 6F 72 20  ffset value for
00B70  69 6D 61 67 65 20 25 73-20 61 72 65 20 25 33 64  image %s are %3d
00B80  20 61 6E 64 20 25 33 64-2E 00 53 61 76 69 6E 67   and %3d..Saving
00B90  20 61 63 71 75 69 72 65-64 20 69 6D 61 67 65 20   acquired image
00BA0  74 6F 20 64 69 73 6B 20-3A 20 25 73 00 41 64 6A  to disk : %s.Adj
00BB0  75 73 74 20 67 72 69 64-20 70 6F 73 69 74 69 6F  ust grid positio
00BC0  6E 20 61 6E 64 20 64 69-6D 65 6E 73 69 6F 6E 73  n and dimensions
```

```
00BD0  20 75 73 69 6E 67 20 74-68 65 20 6D 6F 75 73 65   using the mouse
00BE0  2E 00 4D 6F 76 65 20 6D-6F 75 73 65 20 74 6F 20   ..Move mouse to
00BF0  6D 6F 76 65 20 67 72 69-64 2E 00 48 6F 6C 64 20   move grid..Hold
00C00  64 6F 77 6E 20 6C 65 66-74 20 62 75 74 74 6F 6E   down left button
00C10  20 74 6F 00 63 68 61 6E-67 65 20 67 72 69 64 20    to.change grid
00C20  64 69 6D 65 6E 73 69 6F-6E 73 2E 00 28 6D 6F 76   dimensions..(mov
00C30  65 73 20 6C 6F 77 65 72-20 72 69 67 68 74 20 63   es lower right c
00C40  6F 72 6E 65 72 29 00 50-72 65 73 73 20 72 69 67   orner).Press rig
00C50  68 74 20 62 75 74 74 6F-6E 20 74 6F 00 72 65 74   ht button to.ret
00C60  75 72 6E 20 74 6F 20 74-68 65 20 6D 65 6E 75 2E   urn to the menu.
00C70  00 41 64 6A 75 73 74 20-70 6F 73 69 74 69 6F 6E   .Adjust position
00C80  20 61 6E 64 20 64 69 6D-65 6E 73 69 6F 6E 73 20    and dimensions
00C90  6F 66 20 74 68 65 20 65-6C 6C 69 70 74 69 63 61   of the elliptica
00CA0  6C 20 72 65 67 69 6F 6E-20 75 73 69 6E 67 20 74   l region using t
00CF0  6E 20 74 6F 00 63 68 61-6E 67 65 20 64 69 6D 65   n to.change dime
00D00  6E 73 69 6F 6E 73 20 6F-66 00 61 72 65 61 20 6F   nsions of.area o
00D10  66 20 69 6E 74 65 72 65-73 74 2E 00 50 72 65 73   f interest..Pres
00D20  73 20 72 69 67 68 74 20-62 75 74 74 6F 6E 20 74   s right button t
00D30  6F 00 72 65 74 75 72 6E-20 74 6F 20 74 68 65 20   o.return to the
00D40  6D 65 6E 75 2E 00 C9 A0-07 00 02 40 01 64 00 32   menu......@.d.2
00D50  80 A0 07 00 02 44 01 96-B4 C8 00 A0 AE 00 02 48   .....D.........H
00D60  01 CC 00 33 00 00 00 00-00 07 00 00 00 08 00 00   ...3............
00D70  00 0B 00 00 00 01 00 00-00 00 00 00 00 03 00 02   ................
00D80  00 26 00 0C 00 00 00 08-00 04 00 01 00 26 00 2B   .&...........&.+
00D90  00 00 00 0A 00 04 00 02-00 26 00 49 00 00 00 0D   .........&.I....
00DA0  00 04 00 01 00 26 00 92-00 00 00 0F 00 04 00 02   .....&..........
00DB0  00 26 00 B2 00 00 00 03-00 04 00 01 00 26 00 E4   .&...........&..
00DC0  00 00 00 04 00 04 00 01-00 26 00 FB 00 00 00 05   .........&......
00DD0  00 04 00 01 00 26 00 12-01 00 00 06 00 04 00 01   .....&..........
00DE0  00 26 00 29 01 00 00 00-00 00 00 00 00 00 00 00   .&.)............
00DF0  00 00 00 02 00 03 00 12-00 2D 00 00 00 00 00 02   .........-......
00E00  00 01 00 00 00 00 00 62-01 00 00 FE 9C 2F 00 CC   .......b..../..
00E10  A6 9D CC 9A 56 4F CC 82-9D CC 76 9D CC 6A 9D CC   ....VO....v..j..
00E20  5E 9D CC 52 9D CC 46 9D-CC 3A 9D CC 2E 9D CC 22   ^..R..F..:....."
00E30  9D CC 10 9D CC 0C 9D CC-08 9D CC 04 9D BC A2 0B   ................
00E40  00 02 F2 01 23 00 00 00-02 00 00 39 A0 44 00 02   ....#......9.D..
00E50  76 06 43 6F 70 79 72 69-67 68 74 20 28 63 29 20   v.Copyright (c)
00E60  31 39 38 39 2C 20 42 69-6F 6C 6F 67 69 63 61 6C   1989, Biological
00E70  20 56 69 73 69 5F 6E 20-49 6E 63 2E 20 20 41 6C    Vision Inc.  Al
00E80  6C 20 72 69 67 68 74 73-20 72 65 73 65 72 76 65   l rights reserve
00E90  64 00 4B A0 36 00 01 00-00 C8 00 00 00 1E B8 00   d.K.6...........
00EA0  00 8E D8 8B 46 06 A3 5E-01 8B 46 08 A3 60 01 8B   ....F..^..F..`..
00EB0  46 0A 0B 46 0C 74 0D 8B-46 0A 8B 56 0C A3 4C 01   F..F.t..F..V..L.
00EC0  89 16 4E 01 0E E8 00 00-1F C9 CB 67 9C 14 00 84   ..N........g....
00ED0  2D 56 15 C4 29 9D C4 25-9D C4 14 9D C4 0E 9D C8   -V..)..%........
00EE0  06 9D D5 A0 0A 00 03 00-00 00 00 00 00 00 00 53   ...............S
00EF0  9C 0D 00 C8 04 56 48 C8-02 56 38 C8 00 56 36 41   .....VH..V8..V6A
00F00  A0 B6 03 01 32 00 C8 FE-00 00 57 56 1E B8 00 00   ....2....WV....
00F10  8E D8 1E 68 38 02 9A 00-00 00 00 83 C4 04 1E 68   ...h8..........h
00F20  60 02 9A 00 00 00 00 83-C4 04 9A 00 00 00 00 9A   `...............
00F30  00 00 00 00 9A 00 00 00-00 9A 00 00 00 00 9A 00   ................
00F40  00 00 00 89 46 F0 89 56-F2 0B D2 7F 0F 7C 05 3D   ....F..V.....|.=
00F50  01 00 73 08 2B C0 89 46-F2 89 46 F0 9A 00 00 00   ..s.+..F..F.....
00F60  00 9A 00 00 00 00 89 46-F0 89 56 F2 0B D2 7F 0F   .......F..V.....
00F70  7C 05 3D 01 00 73 08 2B-C0 89 46 F2 89 46 F0 9A   |.=..s.+..F..F..
00F80  00 00 00 00 0B C0 75 1B-9A 00 00 00 00 1E 68 77   ......u.......hw
00F90  02 9A 00 00 00 00 83 C4-04 6A 00 9A 00 00 00 00   .........j......
00FA0  83 C4 02 8E 06 00 00 8B-46 F0 8B 56 F2 26 A3 04   ........F..V.&..
00FB0  00 26 89 16 06 00 6A 05-6A 05 B8 00 00 BA 00 00   .&....j.j.......
00FC0  52 50 9A 00 00 00 00 83-C4 08 0B C0 75 21 9A 00   RP..........u!..
00FD0  00 00 00 FF 76 F2 FF 76-F0 1E 68 99 02 9A 00 00   ....v..v..h.....
00FE0  00 00 83 C4 08 6A 00 9A-00 00 00 00 83 C4 02 FF   .....j..........
00FF0  76 F2 FF 76 F0 9A 00 00-00 00 83 C4 04 89 46 F6   v..v..........F.
01000  89 56 F8 0B D0 75 21 9A-00 00 00 00 FF 76 F2 FF   .V...u!......v..
01010  76 F0 1E 68 D3 02 9A 00-00 00 00 83 C4 08 6A 00   v..h..........j.
01020  9A 00 00 00 00 83 C4 02-B8 0A 00 BA 00 00 52 50   ..............RP
01030  B8 08 00 52 50 B8 06 00-52 50 B8 04 00 52 50 B8   ...RP...RP...RP.
01040  0A 00 BA 00 00 52 50 B8-08 00 52 50 B8 06 00 52   .....RP...RP...R
```

```
001050  50 B8 04 00 52 50 B8 02-00 52 50 B8 00 00 52 50    P...RP...RP...RP
001060  9A 00 00 00 00 83 C4 28-9A 00 00 00 00 89 86 16    .......(........
001070  FF 89 96 18 FF 9A 00 00-00 00 89 86 1A FF 89 96    ................
001080  1C FF 9A 00 00 00 00 89-86 1E FF 89 96 20 FF 9A    ................
001090  00 00 00 00 89 86 22 FF-89 96 24 FF 1E 68 4A 01    ......"...$..hJ.
0010A0  1E 68 48 01 9A 00 00 00-00 83 C4 08 9A 00 00 00    .hH.............
0010B0  00 83 3E 48 01 00 75 13-83 3E 4A 01 00 75 0C C7    ..>H..u..>J..u..
0010C0  06 48 01 CC 00 C7 06 4A-01 33 00 FF 36 4A 01 9A    .H.....J.3..6J..
0010D0  00 00 00 00 83 C4 02 FF-36 48 01 9A 00 00 00 00    ........6H......
0010E0  83 C4 02 2B F6 8D 86 16-FF 89 86 12 FF 8C 96 14    ...+............
0010F0  FF C4 9E 12 FF 26 C4 1F-B9 01 00 56 BF 02 03 8B    .....&.....V....
001100  F3 1E 1E 06 1F 07 D1 E9-1B C0 3B C9 F3 A7 75 04    ..........;...u.
001110  2B C8 F3 A6 1F 5E 74 03-E9 5D 02 89 76 FC C7 46    +....^t..]..v..F
001120  F4 00 00 0B F6 7F 03 E9-D1 00 8D 86 28 FF 89 86    ............(...
001130  12 FF 8C 96 14 FF 8D 86-16 FF 89 86 0E FF 8C 96    ................
001140  10 FF BE A6 01 8B 7E FC-8B C7 01 46 F4 B9 09 00    ......~....F....
001150  56 57 BE 03 03 C4 BE 12-FF D1 E9 F2 A5 13 C9 F2    VW..............
001160  A4 5F 5E C4 9E 0E FF 26-8B 07 26 8B 57 02 8B D8    ._^....&..&.W...
001170  89 9E 06 FF 89 96 08 FF-57 56 C4 BE 06 FF 1E C5    ........WV......
001180  B6 12 FF B9 FF FF 33 C0-F2 AE F7 D1 2B F9 8B D9    ......3.....+...
001190  87 FE 8C DA 06 8E C2 1F-B9 FF FF F2 AE 4F 8B CB    .............O..
0011A0  D1 E9 F2 A5 13 C9 F2 A4-1F 5E 5F 57 56 BF 0C 03    .........^_WV...
0011B0  8C D8 8E C0 1E C5 B6 12-FF B9 FF FF 33 C0 F2 AE    ............3...
0011C0  F7 D1 2B F9 8B D9 87 FE-06 8E C2 1F B9 FF FF F2    ..+.............
0011D0  AE 4F 8B CB D1 E9 F2 A5-13 C9 F2 A4 1F 5E 5F 8B    .O...........^_.
0011E0  86 12 FF 89 04 89 54 02-83 86 12 FF 32 83 86 0E    ......T.....2...
0011F0  FF 04 83 C6 0C 4F 74 03-E9 52 FF 8B 46 FC 89 46    .....Ot..R..F..F
001200  F4 3D 04 00 7D 7B 8B D0-D1 E0 03 C2 D1 E0 D1 E0    .=..}{..........
001210  89 86 02 FF 8B F0 81 C6-9E 01 8B F8 81 C7 A0 01    ................
001220  05 A2 01 89 86 0C FF 8B-86 02 FF 05 A4 01 89 86    ................
001230  0E FF 8B 86 02 FF 05 A6-01 89 86 12 FF B8 04 00    ................
001240  2B C2 8B C8 01 4E F4 C7-04 00 00 C7 05 00 00 8B    +....N..........
001250  9E 0C FF C7 07 00 00 8B-9E 0E FF C7 07 00 00 8B    ................
001260  9E 12 FF 2B C0 89 47 02-89 07 83 C6 0C 83 C7 0C    ...+..G.........
001270  83 86 0C FF 0C 83 86 0E-FF 0C 83 86 12 FF 0C E2    ................
001280  C6 C7 46 F4 05 00 B8 04-00 2B 46 FC 8B F8 BE 6E    ..F......+F....n
001290  01 B9 04 00 29 3C 83 C6-0C E2 F9 0E E8 00 00 83    ....)<..........
0012A0  3E 5E 01 00 75 5A 83 7E-FC 01 7C 0F FF B6 18 FF    >^..uZ.~..|.....
0012B0  FF B6 16 FF 0E E8 00 00-3D 9C 0F 01 87 B0 56 61    ........=.....Va
0012C0  C7 9B 9D 87 97 56 5E C7-89 9D C7 31 9D C7 26 9D    .....V^....1..&.
0012D0  C7 1B 9D C7 18 9D C7 12-9D C6 A8 9D C6 4D 9D C6    .............M..
0012E0  3D 9D C5 F7 9D CD D6 56-49 C5 D3 9D CD CA 56 47    =......VI.....VG
0012F0  C5 C7 9D C5 C1 9D C5 BB-9D C5 B4 9D C5 AD 9D CD    ................
001300  A7 56 50 CD 9F 56 3D C5-9C 9D C5 98 9D CD 8A 56    .VP..V=........V
001310  0D CD 7D 56 0C CD 70 56-09 CD 63 56 05 CD 5B 56    ..}V..pV..cV..[V
001320  11 C5 56 56 48 C5 51 56-4C C5 4C 56 48 C5 47 56    ..VVH.QVH.LVH.GV
001330  48 C5 42 56 48 C9 3D 56-48 C5 3A 56 48 C5 35 56    H.BVH.=VH.:VH.5V
001340  38 C5 30 56 38 C5 2B 56-38 C9 26 56 38 C5 23 56    8.0V8.+V8.&V8.#V
001350  38 CD 1B 56 3A CD 11 56-37 C5 0E 9D CD 02 56 14    8..V:..V7.....V.
001360  CC F0 56 44 CC E2 56 3A-CC D8 56 37 C4 D5 9D CC    ..VD..V:..V7....
001370  C9 56 14 CC BD 56 1B C8-B8 56 3C C4 B5 56 3C C4    .V...V...V<..V<.
001380  AE 56 36 C4 A9 56 36 C4-9F 9C CC 96 56 3A CC 8C    .V6..V6.....V:..
001390  56 37 C4 89 9D CC 83 56-14 CC 7A 56 5B CC 5C 56    V7.....V..zV[.\V
0013A0  23 CC 57 56 57 CC 39 56-23 CC 34 56 54 CC 2F 56    #.WVW.9V#.4VT./V
0013B0  2B CC 2A 56 29 CC 25 56-27 CC 1D 56 3B C4 1A 9D    +.*V).%V'..V;...
0013C0  CC 11 56 4B C4 0E 9D C8-08 9D 8B A0 B5 03 01 E4    ..VK............
0013D0  03 83 C4 04 0E E8 00 00-C7 46 F4 02 00 83 7E FC    .........F....~.
0013E0  02 7C 32 8D 86 1A FF 89-86 06 FF 8C 96 08 FF 8B    .|2.............
0013F0  7E FC 8B 76 F4 C4 9E 06-FF 26 FF 77 02 26 FF 37    ~..v.....&.w.&.7
001400  56 0E E8 00 00 83 C4 06-83 86 06 FF 04 46 3B F7    V............F;.
001410  7E E3 89 76 F4 0E E8 00-00 1E 68 13 03 1E 68 DA    ~..v......h...h.
001420  01 9A 00 00 00 00 83 C4-08 9A 00 00 00 00 83 3E    ...............>
001430  5E 01 00 75 1E 6A 05 1E-68 DA 01 9A 00 00 00 00    ^..u.j..h.......
001440  83 C4 06 6A 01 6A 05 1E-68 DA 01 9A 00 00 00 00    ...j.j..h.......
001450  83 C4 08 C7 46 FA 00 00-8B 7E FC 8B 76 F4 68 00    ....F....~..v.h.
001460  00 68 00 00 1E 68 DA 01-9A 00 00 00 00 83 C4 08    .h...h..........
001470  89 86 26 FF 9A 00 00 00-00 8B 86 26 FF 2D 01 00    ..&........&.-..
```

```
01480  3D 08 00 76 03 E9 5F 01-03 C0 93 2E FF A7 02 06   =..v.._.........
01490  90 83 86 12 FF 04 46 83-FE 04 7C 03 E9 95 FD E9   ......F...|.....
014A0  68 FD 90 83 FF 01 7C 0F-FF B6 18 FF FF B6 16 FF   h.....|.........
014B0  0E E8 00 00 83 C4 04 0E-E8 00 00 BE 02 00 3B FE   ..............;.
014C0  7C 29 8D 86 1A FF 89 86-06 FF 8C 96 08 FF C4 9E   |)..............
014D0  06 FF 26 FF 77 02 26 FF-37 56 0E E8 00 00 83 C4   ..&.w.&.7V......
014E0  06 83 86 06 FF 04 46 3B-F7 7E E3 0E E8 00 00 E9   ......F;.~......
014F0  0F 01 90 0E E8 00 00 E9-07 01 90 6A 00 6A 00 9A   ...........j.j..
01500  00 00 00 00 83 C4 04 6A-01 0E E8 00 00 83 C4 02   .......j........
01510  1E 68 00 00 9A 00 00 00-00 83 C4 04 6A 00 6A 02   .h..........j.j.
01520  9A 00 00 00 00 83 C4 04-6A 14 6A 01 6A 00 6A 01   ........j.j.j.j.
01530  6A 00 6A 02 9A 00 00 00-00 83 C4 0C 6A 01 6A 01   j.j.........j.j.
01540  6A 00 9A 00 00 00 00 83-C4 06 6A 01 6A 02 6A FF   j.j.......j.j.j.
01550  6A 00 9A 00 00 00 00 83-C4 08 6A 01 6A 02 6A FF   j.j.......j.j.j.
01560  6A 00 9A 00 00 00 00 83-C4 08 6A 00 6A 01 9A 00   j.j.......j.j...
01570  00 00 00 83 C4 04 6A 01-6A 01 9A 00 00 00 00 83   ......j.j.......
01580  C4 04 1E 68 29 03 1E 68-DA 01 9A 00 00 00 00 83   ...h)..h........
01590  C4 08 EB 6D 90 83 FF 01-7C 67 FF B6 18 FF FF B6   ...m....|g......
015A0  16 FF 0E E8 00 00 83 C4-04 EB 56 83 FF 02 7C 51   ..........V...|Q
015B0  FF B6 1C FF FF B6 1A FF-6A 02 0E E8 00 00 83 C4   ........j.......
015C0  06 EB 3E 83 FF 03 7C 39-FF B6 20 FF FF B6 1E FF   ..>...|9........
015D0  6A 03 EB E6 90 83 FF 04-7C 27 FF B6 24 FF FF B6   j.......|'..$...
015E0  22 FF 6A 04 EB D4 90 C7-46 FA 01 00 EB 13 90 B6   ".j.....F.......
015F0  04 06 05 FE 04 0E 05 FA-05 A8 05 BE 05 D6 05 E8   ................
01600  05 6A 14 6A 14 9A 00 00-00 00 83 C4 04 83 7E FA   .j.j..........~.
01610  00 75 03 E9 48 FE 89 76-F4 8E 06 02 00 26 FF 36   .u..H..v.....&.6
01620  0A 00 26 FF 36 08 00 26-FF 36 06 00 26 FF 36 04   ..&.6..&.6..&.6.
01630  00 8E 06 04 00 26 FF 36-0A 00 26 FF 36 08 00 26   .....&.6..&.6..&
01640  FF 36 06 00 26 FF 36 04-00 26 FF 36 02 00 26 FF   .6..&.6..&.6..&.
01650  36 00 00 9A 00 00 00 00-83 C4 14 FF 36 4A 01 FF   6...........6J..
01660  36 48 01 9A 00 00 00 00-83 C4 04 FF 76 F8 FF 76   6H..........v..v
01670  F6 9A 00 00 00 00 83 C4-04 FF 76 F8 FF 76 F6 9A   ..........v..v..
01680  00 00 00 00 83 C4 04 8E-06 04 00 26 FF 36 0A 00   ...........&.6..
01690  26 FF 36 08 00 26 FF 36-06 00 26 FF 36 04 00 26   &.6..&.6..&.6..&
016A0  FF 36 02 00 26 FF 36 00-00 9A 00 00 00 00 83 C4   .6..&.6.........
016B0  0C 83 3E 60 01 00 75 07-6A 03 6A 01 EB 05 90 6A   ..>`..u.j.j....j
016C0  03 6A 00 9A 00 00 00 00-83 C4 04 6A 00 6A 00 9A   .j.........j.j..
016D0  00 00 00 00 83 C4 04 6A-01 0E E8 00 00 83 C4 02   .......j........
016E0  1E 68 00 00 9A 00 00 00-00 83 C4 04 6A 00 6A 02   .h..........j.j.
016F0  9A 00 00 00 00 83 C4 04-1E 68 DA 01 9A 00 00 00   .........h......
001700  00 83 C4 04 1F 5E 5F C9-CB C8 50 00 00 1E B8 00   .....^_...P.....
001710  00 8E D8 9A 00 00 00 00-FF 76 08 FF 76 06 1E 68  .........v..v..h
001720  3F 03 8D 46 B0 16 50 9A-00 00 00 00 83 C4 0C 8D  ?..F..P.........
001730  46 B0 16 50 6A 00 9A 00-00 00 00 83 C4 06 B8 00  F..Pj...........
001740  04 BA 00 00 52 50 52 50-52 50 68 00 01 6A 00 6A  ....RPRPRPh..j.j
001750  00 6A 00 9A 00 00 00 00-83 C4 14 68 FF 00 9A 00  .j.........h....
001760  00 00 00 83 C4 02 6A 00-6A 03 9A 00 00 00 00 83  ......j.j.......
001770  C4 04 FF 36 4A 01 9A 00-00 00 00 83 C4 02 FF 36  ...6J..........6
001780  48 01 0D 9C 66 01 C7 AF-9D CF A6 56 47 C7 A3 9D  H...f......VG...
001790  CF 9A 56 26 CF 8E 56 56-CF 83 56 55 CB 71 54 05  ..V&..VV..VU.qT.
0017A0  C7 6E 54 05 CF 66 56 46-CF 57 56 08 C7 4F 9D CF  .nT..fVF.WV..O..
0017B0  43 56 2B CB 3E 9D CF 2C-56 10 C7 29 9D CF 20 56  CV+.>..,V..).. V
0017C0  26 CF 14 56 2C C7 11 9F-87 0A 56 2A CE FF 56 26  &..V,.....V*..V&
0017D0  CE F3 56 51 C6 E2 9D CE-D9 56 4C C6 D6 56 48 C6  ..VQ.....VL..VH.
0017E0  D1 56 48 C6 CC 56 48 C6-C7 56 48 C6 C2 56 48 C6  .VH..VH..VH..VH.
0017F0  BD 56 48 C6 B8 9C CE AF-56 3F CE A1 56 2D CE 93  .VH.....V?..V-..
001800  56 43 C6 90 9D C6 8C 9D-CE 83 56 1F C6 80 56 48  VC........V...VH
001810  C6 7B 56 48 C6 76 56 48-C6 71 56 48 C6 6C 56 48  .{VH.vVH.qVH.lVH
001820  C6 67 56 48 C6 62 9C C6-5E 56 38 C6 59 56 38 C6  .gVH.b..^V8.YV8.
001830  54 56 38 C6 4F 56 38 C6-4A 9C CE 35 56 4A C6 2E  TV8.OV8.J..5VJ..
001840  8E C6 2C 8E C6 2A 8E C6-28 8E C6 26 8E C6 24 8E  ..,..*..(..&..$.
001850  C6 22 8E C6 20 8E C6 1E-8E 85 EB 56 03 85 D3 56  ."......... V...V
001860  61 CD BA 56 0B C5 B7 9D-C5 B3 9D CD AA 56 34 CD  a..V.........V4.
001870  9E 56 33 CD 92 56 31 CD-82 56 31 CD 72 56 2F CD  .V3..V1..V1.rV/.
001880  64 56 2E CD 50 56 26 CD-44 56 2C C5 41 9F 85 3A  dV..PV&.DV,.A..:
001890  56 2A CD 2F 56 26 85 24-56 62 85 1C 56 06 85 0B  V*./V&.$Vb..V...
0018A0  56 03 84 E8 56 62 84 E1-56 61 C4 BD 5E CC A4 56  V...Vb..Va..^..V
0018B0  54 CC 98 56 12 C4 95 9D-D4 91 56 54 C8 8E 56 54  T..V......VT..VT
```

```
0018C0  CC 7B 56 0F C4 78 9D CC-6B 56 0E C4 68 9D C4 5F   .{V..x..kV..h.._
0018D0  9D CC 59 56 4E CC 51 56-0B C4 4E 9D C4 4A 9D 84   ..YVN.QV..N..J..
0018E0  46 56 06 84 32 56 03 84-05 56 62 67 A0 E9 01 01   FV..2V...Vbg....
0018F0  95 07 9A 00 00 00 00 83-C4 02 6A 02 9A 00 00 00   ..........j.....
001900  00 83 C4 02 6A FF 9A 00-00 00 00 83 C4 02 9A 00   ....j...........
001910  00 00 00 9A 00 00 00 00-6A 00 9A 00 00 00 00 83   ........j.......
001920  C4 02 9A 00 00 00 00 FF-36 4A 01 FF 36 48 01 FF   ........6J..6H..
001930  76 08 FF 76 06 1E 68 77-03 8D 46 B0 16 50 9A 00   v..v..hw..F..P..
001940  00 00 00 83 C4 10 8D 46-B0 16 50 6A 00 9A 00 00   .......F..Pj....
001950  00 00 83 C4 06 6A 00 6A-02 9A 00 00 00 00 83 C4   .....j.j........
001960  04 B8 00 02 BA 00 00 52-50 52 50 52 50 68 00 01   .......RPRPRPh..
001970  6A 00 6A 00 6A 00 9A 00-00 00 00 83 C4 14 6A 00   j.j.j.........j.
001980  6A 03 6A 00 9A 00 00 00-00 83 C4 06 6A 00 6A 06   j.j.........j.j.
001990  9A 00 00 00 00 83 C4 04-6A 01 6A 02 6A FF 6A 00   ........j.j.j.j.
0019A0  9A 00 00 00 00 83 C4 08-6A 01 6A 02 6A FF 6A 00   ........j.j.j.j.
0019B0  9A 00 00 00 00 83 C4 08-83 3E 60 01 00 75 30 B8   .........>'..u0.
0019C0  00 04 BA 00 00 52 50 52-50 52 50 68 00 01 6A 00   .....RPRPRPh..j.
0019D0  6A 00 6A 00 9A 00 00 00-00 83 C4 14 6A 00 6A 01   j.j.j.......j.j.
0019E0  6A 00 9A 00 00 00 00 83-C4 06 6A 01 EB 03 90 6A   j.........j....j
0019F0  00 6A 00 9A 00 00 00 00-83 C4 04 6A 01 0E E8 00   .j.........j....
01A00   00 83 C4 02 1E 68 00 00-1E 68 AF 03 1E 68 50 00   .....h...h...hP.
01A10   9A 00 00 00 00 83 C4 0C-1E 68 50 00 6A 01 9A 00   .........hP.j...
01A20   00 00 00 83 C4 06 1E 68-00 00 9A 00 00 00 00 83   .......h........
01A30   C4 04 6A 00 6A 02 9A 00-00 00 00 83 C4 04 B8 00   ..j.j...........
01A40   00 BA 00 00 52 50 9A 00-00 00 00 83 C4 04 9A 00   ....RP..........
01A50   00 00 00 1F C9 CB 90 C8-00 00 00 1E B8 00 00 8E   ................
01A60   D8 83 3E 5C 01 00 74 31-FF 76 06 FF 36 5A 01 FF   ..>\..t1.v..6Z..
01A70   36 58 01 FF 36 56 01 FF-36 54 01 FF 36 52 01 FF   6X..6V..6T..6R..
01A80   36 50 01 FF 36 4E 01 FF-36 4C 01 9A 00 00 00 00   6P..6N..6L......
01A90   52 50 1E 68 D2 03 EB 2F-90 FF 36 5A 01 FF 36 58   RP.h.../..6Z..6X
01AA0   01 FF 36 56 01 FF 36 54-01 FF 36 52 01 FF 36 50   ..6V..6T..6R..6P
01AB0   01 FF 76 06 FF 36 4E 01-FF 36 4C 01 9A 00 00 00   ..v..6N..6L.....
01AC0   00 52 50 1E 68 E0 03 1E-68 00 00 9A 00 00 00 00   .RP.h...h.......
01AD0   83 C4 1E 1F C9 CB 90 A7-9C E3 00 CD DA 56 08 C5   .............V..
01AE0   D7 9F C5 D3 9D CD CB 56-39 C5 C8 9D C5 C4 9D C5   .......V9.......
01AF0   BD 9D C5 B9 9D C5 B5 9D-C5 B1 9D C5 AD 9D C5 A9   ................
01B00   9D C5 A2 9D CD 9A 56 39-C5 97 9D C5 93 9D C5 8F   ......V9........
01B10   9D C5 8B 9D C5 87 9D C5-83 9D C5 7F 9D C5 7B 9D   ..............{.
01B20   C5 71 9D C9 6B 9D CD 5D-56 4E CD 55 56 19 C9 50   .q..k..]VN.UV..P
01B30   56 22 C5 4D 56 22 CD 45-56 26 CD 39 56 60 C5 36   V".MV".EV&.9V'.6
01B40   9F CD 2D 56 46 C5 28 9F-CD 1F 56 08 C5 1C 9F C5   ..-VF.(...V.....
01B50   18 9D C5 14 9F 85 0D 56-2A CD 02 56 26 CC F1 56   .......V*..V&..V
01B60   5C CC E3 56 55 C8 D1 54-05 C4 CE 54 05 C4 C8 9D   \..VU..T...T....
01B70   CC BF 56 31 CC AF 56 31-CC 9F 56 5D CC 93 56 5C   ..V1..V1..V]..V\
01B80   CC 85 56 55 C8 73 54 05-C4 70 54 05 CC 68 56 26   ..VU.sT..pT..hV&
01B90   CC 5C 56 46 CC 4D 56 08-C4 45 9D C4 3B 9D C4 37   .\VF.MV..E..;..7
01BA0   9D CC 31 56 2B CC 29 56-5A CC 22 56 54 CC 1D 56   ..1V+.)VZ."VT..V
01BB0   53 CC 15 56 5A CC 0B 56-58 CC 01 56 49 C5 A0 0A   S..VZ..VX..VI...
01BC0   00 03 06 00 00 00 00 00-00 00 4D 9C 0D 00 C8 04   ..........M.....
01BD0   56 04 C8 02 56 07 C8 00-56 0A E2 A0 60 03 01 7A   V...V...V...'..z
01BE0   09 C8 5A 00 00 57 56 1E-B8 00 00 8E D8 B8 00 00   ..Z..WV.........
01BF0   BA 00 00 52 50 9A 00 00-00 00 83 C4 04 FF 76 0A   ...RP.........v.
01C00   FF 76 08 1E 68 EE 03 8D-46 B0 16 50 9A 00 00 00   .v..h...F..P....
01C10   00 83 C4 0C B8 00 00 BA-00 00 52 50 8D 46 B0 16   ..........RP.F..
01C20   50 6A 01 6A 00 9A 00 00-00 00 83 C4 0C B8 00 00   Pj.j............
01C30   BA 00 00 52 50 1E 68 2A-04 6A 01 6A 01 9A 00 00   ...RP.h*.j.j....
01C40   00 00 83 C4 0C B8 00 00-BA 00 00 52 50 9A 00 00   ...........RP...
01C50   00 00 83 C4 04 B8 00 00-BA 00 00 52 50 1E 68 5B   ...........RP.h[
01C60   04 6A 02 6A 01 9A 00 00-00 00 83 C4 0C B8 00 00   .j.j............
01C70   BA 00 00 52 50 1E 68 70-04 6A 02 6A 02 9A 00 00   ...RP.hp.j.j....
01C80   00 00 83 C4 0C 6A 00 6A-02 9A 00 00 00 00 83 C4   .....j.j........
01C90   04 68 00 02 68 00 02 6A-00 6A 00 9A 00 00 00 00   .h..h..j.j......
01CA0   83 C4 08 6A 00 6A 01 9A-00 00 00 00 83 C4 04 6A   ...j.j.........j
01CB0   00 6A 01 9A 00 00 00 00-83 C4 04 B8 00 03 BA 00   .j..............
01CC0   00 52 50 52 50 52 50 68-00 01 6A 00 6A 00 6A 00   .RPRPRPh..j.j.j.
01CD0   9A 00 00 00 00 83 C4 14-6A 00 9A 00 00 00 00 83   ........j.......
01CE0   C4 02 6A 00 6A 04 6A 04-6A 01 6A 07 9A 00 00 00   ..j.j.j.j.j.....
01CF0   00 83 C4 0A 6A 03 6A 00-9A 00 00 00 00 83 C4 04   ....j.j.........
```

```
1D00  6A 00 6A 00 9A 00 00 00-00 83 C4 04 6A 00 9A 00   j.j......j..
1D10  00 00 00 83 C4 02 6A 03-6A 03 6A 02 6A 00 9A 00   ......j.j.j.j...
1D20  00 00 00 83 C4 08 2B F6-6A 02 9A 00 00 00 00 83   ......+.j.......
1D30  C4 02 8D 46 A8 16 50 8D-46 AC 16 50 8D 46 AE 16   ...F..P.F..P.F..
01D40 50 9A 00 00 00 00 83 C4-0C 8B F8 A8 02 74 03 BE   P............t..
01D50 01 00 0B F6 74 D2 89 7E-A6 89 76 AA FF 76 A8 9A   ....t..~..v..v..
01D60 00 00 00 00 83 C4 02 6A-00 6A 02 9A 00 00 00 00   .......j.j......
01D70 83 C4 04 8E 06 06 00 26-8B 1E 00 00 8A 87 40 01   .......&......@.
01D80 2A E4 50 8E 06 08 00 26-8B 1E 00 00 8A 87 40 01   *.P....&......@.
01D90 50 8E 06 0A 00 26 8B 1E-00 00 8A 87 40 01 50 6A   P....&......@.Pj
01DA0 01 9A 00 00 00 00 83 C4-08 6A 01 6A 02 6A FF 6A   .........j.j.j.j
01DB0 00 9A 00 00 00 00 83 C4-08 6A 01 6A 02 6A FF 6A   .........j.j.j.j
01DC0 00 9A 00 00 00 00 83 C4-08 B8 00 04 BA 00 00 52   ...............R
01DD0 50 52 50 52 50 68 00 01-6A 00 6A 00 6A 00 9A 00   PRPRPh..j.j.j...
01DE0 00 00 00 83 C4 14 68 FF-00 9A 00 00 00 00 83 C4   ......h.........
01DF0 02 9A 00 00 00 00 FF 36-4A 01 FF 36 48 01 FF 76   .......6J..6H..v
01E00 0A FF 76 08 1E 68 88 04-8D 46 B0 16 50 9A 00 00   ..v..h...F..P...
01E10 00 00 83 C4 10 8D 46 B0-16 50 6A 00 9A 00 00 00   ......F..Pj.....
01E20 00 83 C4 06 6A 00 6A 06-9A 00 00 00 00 83 C4 04   ....j.j.........
01E30 6A 01 6A 02 6A FF 6A 00-9A 00 00 00 00 83 C4 08   j.j.j.j.........
01E40 6A 01 6A 02 6A FF 6A 00-9A 00 00 00 00 83 C4 08   j.j.j.j.........
01E50 9A 00 00 00 00 83 3E 60-01 00 75 2F B8 00 04 BA   ......>'..u/....
01E60 00 00 52 50 52 50 52 50-68 00 01 6A 00 6A 00 6A   ..RPRPRPh..j.j.j
01E70 00 9A 00 00 00 00 83 C4-14 6A 00 6A 01 6A 00 9A   .........j.j.j..
01E80 00 00 00 00 83 C4 06 6A-01 EB 02 6A 00 6A 00 9A   .......j...j.j..
01E90 00 00 00 00 83 C4 04 FF-76 06 0E E8 00 00 83 C4   ........v.......
01EA0 02 1E 68 00 00 1E 68 C0-04 1E 68 50 00 9A 00 00   ..h...h...hP....
01EB0 00 00 83 C4 0C 1E 68 50-00 6A 01 9A 00 00 00 00   ......hP.j......
01EC0 83 C4 06 1E 68 00 00 9A-00 00 00 00 83 C4 04 6A   ....h..........j
01ED0 00 6A 02 9A 00 00 00 00-83 C4 04 B8 00 00 BA 00   .j..............
01EE0 00 52 50 9A 00 00 00 00-83 C4 04 9A 00 00 00 00   .RP.............
01EF0 1F 5E 5F C9 CB C8 0C 00-00 57 56 1E B8 00 00 8E   .^_......WV.....
01F00 D8 2B FF B8 00 00 BA 00-00 52 50 9A 00 00 00 00   .+.......RP.....
01F10 83 C4 04 B8 00 00 BA 00-00 52 50 1E 68 E3 04 6A   .........RP.h..j
01F20 01 57 9A 00 00 00 00 83-C4 0C B8 00 00 BA 00 00   .W..............
01F30 52 50 9A 00 00 00 00 83-C4 04 B8 00 00 AA 9C 77   RP.............w
01F40 01 C7 5A 56 17 CF 52 56-19 CB 4D 56 17 C7 4A 56   ..ZV..RV..MV..JV
01F50 17 CF 42 56 41 C7 3C 9D-CB 36 56 22 C7 33 56 22   ..BVA.<..6V".3V"
01F60 CF 2B 56 19 CB 26 56 22-C7 23 56 22 CB 1C 9D CF   .+V..&V".#V"....
01F70 0B 56 4E CF 03 56 19 CA-FE 56 22 C6 FB 56 22 CE   .VN..V...V"..V".
01F80 F3 56 26 CE E7 56 60 C6-E4 9F CE DB 56 46 C6 D6   .V&..V`.....VF..
01FA0 56 2A CE AF 56 26 CE 9F-56 5C CE 91 56 55 CA 7F   V*..V&..V\..VU..
01FB0 54 05 C6 7C 54 05 C6 76-9D CE 70 56 54 CE 68 56   T..|T..v..pVT.hV
01FC0 31 CE 58 56 31 CE 48 56-5D CE 3C 56 46 CE 2D 56   1.XV1.HV].<VF.-V
01FD0 08 C6 25 9D C6 1B 9D C6-17 9D CE 11 56 2B CE 09   ..%.........V+..
01FE0 56 56 CD FE 56 55 C9 EC-54 05 C5 E9 54 05 CD E1   VV..VU..T...T...
01FF0 56 31 CD D1 56 31 CD C1-56 35 C5 BB 9D C5 B7 56   V1..V1..V5.....V
02000 04 C5 B2 9C C5 AD 9D C5-A9 56 07 C5 A4 9C C5 9D   .........V......
02010 9D C5 99 56 0A C5 94 9C-CD 8B 56 26 CD 7F 56 52   ...V......V&..VR
02020 CD 61 56 32 CD 4A 56 30-CD 3E 56 28 CD 2E 56 25   .aV2.JV0.>V(..V%
02030 CD 24 56 21 CD 18 56 1E-CD 0C 56 1C CC FA 56 1A   .$V!..V...V...V.
02040 CC F0 56 55 C8 DE 54 05-C4 DB 54 05 CC D3 56 18   ..VU..T...T...V.
02050 CC C7 56 18 CC BB 56 16-CC A9 56 26 CC 9D 56 41   ..V...V...V&..VA
02060 C4 96 9D C8 90 56 17 C4-8D 56 17 CC 85 56 41 C4   .....V...V...VA.
02070 7E 9D C8 78 56 17 C4 75-56 17 CC 6D 56 19 C8 68   ~..xV..uV..mV..h
02080 56 17 C4 65 56 17 CC 5D-56 41 C4 56 9D C8 50 56   V..eV..]VA.V..PV
02090 22 C4 4D 56 22 CC 45 56-41 C8 37 56 22 C4 34 56   ".MV".EVA.7V".4V
020A0 22 CC 2C 56 08 C4 24 9D-CC 15 56 19 C8 10 56 22   ".,V..$...V...V"
020B0 C4 0D 56 22 C8 08 9D 49-A0 CB 02 01 D6 0C BA 00   ..V"...I........
020C0 00 52 50 1E 68 18 05 6A-02 6A 01 9A 00 00 00 00   .RP.h..j.j......
020D0 83 C4 0C B8 00 00 BA 00-00 52 50 1E 68 31 05 6A   .........RP.h1.j
020E0 02 6A 03 9A 00 00 00 00-83 C4 0C B8 00 00 BA 00   .j.......RP.hJ.j
020F0 00 52 50 1E 68 4A 05 6A-02 6A 04 9A 00 00 00 00   .RP.hJ.j.j......
02100 83 C4 0C B8 00 00 BA 00-00 52 50 1E 68 62 05 6A   .........RP.hb.j
02110 02 6A 05 9A 00 00 00 00-83 C4 0C B8 00 00 BA 00   .j..............
02120 00 52 50 1E 68 7D 05 6A-02 6A 07 9A 00 00 00 00   .RP.h}.j.j......
02130 83 C4 0C B8 00 00 BA 00-00 52 50 1E 68 93 05 6A   .........RP.h..j
```

```
02140  02 6A 08 9A 00 00 00 00-83 C4 0C 2B F6 8D 46 F6   .j.........+..F.
02150  16 50 8D 46 FA 16 50 8D-46 FE 16 50 9A 00 00 00   .P.F..P.F..P....
02160  00 83 C4 0C 89 46 F4 FF-76 F6 9A 00 00 00 00 83   .....F..v.......
02170  C4 02 F6 46 F6 02 74 06-BE 01 00 E9 A9 00 83 7E   ...F..t........~
02180  FE 00 75 09 83 7E FA 00-75 03 E9 9A 00 F6 46 F6   ..u..~..u.....F.
02190  01 74 47 8E 06 04 00 26-A1 04 00 03 46 FE 3D 01   .tG....&....F.=.
021A0  00 7D 03 B8 01 00 3D 2B-00 7E 03 B8 2B 00 8E 06   .}....=+.~..+...
021B0  04 00 26 A3 04 00 26 A1-06 00 03 46 FA 3D 01 00   ..&...&....F.=..
021C0  7D 03 B8 01 00 3D 3C 00-7E 03 B8 3C 00 8E 06 04   }....=<.~..<....
021D0  00 26 A3 06 00 BF 01 00-EB 3A 8E 06 04 00 26 A1   .&.......:....&.
021E0  00 00 03 46 FE 79 02 2B-C0 3D FF 01 7E 03 B8 FF   ...F.y.+.=..~...
021F0  01 8E 06 04 00 26 A3 00-00 26 A1 02 00 03 46 FA   .....&...&....F.
02200  79 02 2B C0 3D DF 01 7E-03 B8 DF 01 8E 06 04 00   y.+.=..~........
02210  26 A3 02 00 6A 01 6A 02-B8 00 00 BA 00 00 52 50   &...j.j.......RP
02220  0E E8 00 00 83 C4 08 0B-F6 75 03 E9 1F FF 89 7E   .........u.....~
02230  FC 89 76 F8 9A 00 00 00-00 8E 06 02 00 26 C7 06   ..v..........&..
02240  00 00 00 00 26 C7 06 02-00 00 00 0B FF 74 3A 8E   ....&........t:.
02250  06 04 00 26 A1 04 00 99-2B C2 D1 F8 8E 06 02 00   ...&....+.......
02260  26 A3 04 00 8E 06 04 00-26 A1 06 00 99 2B C2 D1   &.......&....+..
02270  F8 8E 06 02 00 26 A3 06-00 26 A1 04 00 26 A3 08   .....&...&...&..
02280  00 26 A1 06 00 26 A3 0A-00 B8 00 00 BA 00 00 52   .&...&.........R
02290  50 9A 00 00 00 00 83 C4-04 9A 00 00 00 00 1F 5E   P..............^
022A0  5F C9 CB 90 C8 18 00 00-57 56 1E B8 00 00 8E D8   _.......WV......
022B0  C7 46 F2 05 00 B8 00 00-BA 00 00 52 50 9A 00 00   .F.........RP...
022C0  00 00 83 C4 04 B8 00 00-BA 00 00 52 50 1E 68 A7   ...........RP.h.
022D0  05 6A 01 6A 00 9A 00 00-00 00 83 C4 0C B8 00 00   .j.j............
022E0  BA 00 00 52 50 9A 00 00-00 00 83 C4 04 B8 00 00   ...RP...........
022F0  BA 00 00 52 50 1E 68 F0-05 6A 02 6A 01 9A 00 00   ...RP.h..j.j....
02300  00 00 83 C4 0C B8 00 00-BA 00 00 52 50 1E 68 0B   ...........RP.h.
02310  06 6A 02 6A 03 9A 00 00-00 00 83 C4 0C B8 00 00   .j.j............
02320  BA 00 00 52 50 1E 68 24-06 6A 02 6A 04 9A 00 00   ...RP.h$.j.j....
02330  00 00 83 C4 0C B8 00 00-BA 00 00 52 50 1E 68 39   ...........RP.h9
02340  06 6A 02 6A 05 9A 00 00-00 00 83 C4 0C B8 00 00   .j.j............
02350  BA 00 00 52 50 1E 68 4B-06 6A 02 6A 07 9A 00 00   ...RP.hK.j.j....
02360  00 00 83 C4 0C B8 00 00-BA 00 00 52 50 1E 68 61   ...........RP.ha
02370  06 6A 02 6A 08 9A 00 00-00 00 83 C4 0C 8E 06 04   .j.j............
02380  00 26 A1 00 00 D4 9C 73-01 C6 C5 56 48 C6 C1 9C   .&.....s...VH...
02390  CE B8 56 41 C6 B1 9D CA-AB 56 17 C6 A8 56 17 CE   ..VA.....V...V..
023A0  A0 56 41 C6 99 9D CA 7B-56 17 C6 78 56 17 CE 70   .VA....{V..xV..p
023B0  56 41 C6 81 9D CA 63 56-17 C6 60 56 17 CE 58 56   VA....cV..`V..XV
023C0  41 C6 69 9D CA 4B 56 17-C6 48 56 17 CE 40 56 41   A.i..KV..HV..@VA
023D0  C6 51 9D CA 33 56 17 C6-30 56 17 CE 28 56 19 CA   .Q..3V..0V..(V..
023E0  39 9D CA 23 56 17 C6 20-56 17 CE 18 56 41 C6 11   9..#V.. V...VA..
023F0  9D CA 0B 56 22 C6 08 56-22 CE 00 56 19 C9 FB 56   ...V"..V"..V...V
02400  22 C5 F8 56 22 C9 EE 9D-CD DC 56 4E CD D4 56 19   "..V"....VN..V..
02410  C9 CF 56 22 C5 CC 56 22-C5 C9 56 38 C5 C5 56 38   ..V"..V"..V8..V8
02420  C5 C1 56 38 C5 BD 56 38-C5 B9 56 38 C5 B5 9C C5   ..V8..V8..V8....
02430  AC 56 48 C5 A8 9C C5 A4-56 38 C5 A0 9C C5 97 56   .VH.....V8.....V
02440  48 C5 93 9C C5 89 56 38-C5 82 56 38 C5 7D 9C CD   H.....V8..V8.}..
02450  77 56 54 85 64 56 5F C9-5E 56 48 C5 5B 56 48 C5   wVT.dV_.^VH.[VH.
02460  54 56 48 C5 50 9C C5 3D-56 48 C5 39 56 48 C5 35   TVH.P..=VH.9VH.5
02470  9C C5 22 56 48 C5 1E 9C-C5 15 56 48 C5 11 9C C4   .."VH.....VH....
02480  FA 56 48 C4 F6 56 48 C4-F2 9C C4 DB 56 48 C4 D7   .VH..VH.....VH..
02490  9C CC AD 56 52 CC 9F 56-32 CC 86 56 41 C4 7F 9D   ...VR..V2..VA..
024A0  C8 79 56 17 C4 76 56 17-CC 6E 56 41 C4 4F 9D C8   .yV..vV..nVA.O..
024B0  61 56 17 C4 5E 56 17 CC-56 56 41 C4 37 9D C8 31   aV..^V..VVA.7..1
024C0  56 17 C4 2E 56 17 CC 3E-56 41 C4 1F 9D C8 19 56   V...V..>VA.....V
024D0  17 C4 16 56 17 CC 26 56-41 C4 07 9D C8 01 56 17   ...V..&VA.....V.
024E0  F1 A0 0B 03 01 CC 0E 56-41 C4 0F F0 26 A1 02 00   .......VA...&...
024F0  89 46 EE 26 A1 04 00 9D-0F 89 46 F0 26 A1 02 00   .F.&......F.&...
02500  89 46 EE 26 A1 04 00 26-F7 2E 08 00 03 46 F0 89   .F.&...&.....F..
02510  46 EA 26 A1 06 00 26 F7-2E 0A 00 03 46 EE 89 46   F.&...&.....F..F
02520  E8 26 A1 04 00 99 2B C2-D1 F8 05 05 00 89 46 FA   .&....+.......F.
02530  26 A1 06 00 99 2B C2 D1-F8 05 05 00 89 46 F8 8E   &....+.......F..
02540  06 02 00 8B 46 FA 26 A3-08 00 8B 46 F8 26 39 06   ....F.&....F.&9.
02550  ...
```

```
02560  0A 00 7E 04 26 A3 0A 00-8B 46 F0 26 39 06 00 00   ..~.&....F.&9...
02570  7E 1E 8B 46 EA 26 39 06-00 00 7D 14 8B 46 EE 26   ~..F.&9...}..F.&
02580  39 06 02 00 7E 0A 8B 46-E8 26 39 06 02 00 7C 3E   9...~..F.&9...|>
02590  8E 06 04 00 26 A1 04 00-8B C8 D1 E0 D1 E0 03 C1   ....&...........
025A0  8E 06 02 00 26 03 06 04-00 03 46 F0 26 A3 00 00   ....&.....F.&...
025B0  8E 06 04 00 26 A1 06 00-8B C8 D1 E0 03 C1 8E 06   ....&...........
025C0  02 00 26 03 06 06 00 03-46 EE 26 A3 02 00 6A 02   ..&.....F.&...j.
025D0  6A 02 9A 00 00 00 00 83-C4 04 68 FF 01 68 FF 01   j.........h..h..
025E0  6A 00 6A 00 9A 00 00 00-00 83 C4 08 68 FF 00 6A   j.j.........h..j
025F0  00 6A 00 6A 02 9A 00 00-00 00 83 C4 08 68 FF 00   .j.j.........h..
02600  6A 00 6A 00 6A 03 9A 00-00 00 00 83 C4 08 6A 02   j.j.j.........j.
02610  6A 02 B8 00 00 BA 00 00-52 50 0E E8 00 00 83 C4   j.......RP......
02620  08 2B F6 8B 7E E8 8D 46-F4 16 50 8D 46 FC 16 50   .+..~..F..P.F..P
02630  8D 46 FE 16 50 9A 00 00-00 00 83 C4 0C 89 46 EC   .F..P.........F.
02640  FF 76 F4 9A 00 00 00 00-83 C4 02 F6 46 F4 02 74   .v..........F..t
02650  06 BE 01 00 E9 BF 00 83-7E FE 00 75 09 83 7E FC   ........~..u..~.
02660  00 75 03 E9 B0 00 6A 02-6A 02 B8 00 00 BA 00 00   .u....j.j.......
02670  52 50 0E E8 00 00 83 C4-08 F6 46 F4 01 74 44 8E   RP........F..tD.
02680  06 02 00 26 A1 08 00 2B-46 FE 3D 02 00 7D 03 B8   ...&...+F.=..}..
02690  02 00 3B 46 FA 7E 03 8B-46 FA 8E 06 02 00 26 A3   ..;F.~..F.....&.
026A0  08 00 26 A1 0A 00 2B 46-FC 3D 02 00 7D 03 B8 02   ..&...+F.=..}...
026B0  00 3B 46 F8 7E 03 8B 46-F8 8E 06 02 00 26 A3 0A   .;F.~..F.....&..
026C0  00 EB 40 8E 06 02 00 26-A1 00 00 03 46 FE 3B 46   ..@....&....F.;F
026D0  F0 7D 03 8B 46 F0 3B 46-EA 7E 03 8B 46 EA 8E 06   .}..F.;F.~..F...
026E0  02 00 26 A3 00 00 26 A1-02 00 03 46 FC 3B 46 EE   ..&...&....F.;F.
026F0  7D 03 8B 46 EE 3B C7 7E-02 8B C7 8E 06 02 00 26   }..F.;.~.......&
02700  A3 02 00 6A 02 6A 02 B8-00 00 BA 00 00 52 50 0E   ...j.j.......RP.
02710  E8 00 00 83 C4 08 0B F6-75 03 E9 09 FF 89 76 F6   ........u.....v.
02720  9A 00 00 00 00 6A 02 6A-02 B8 00 00 BA 00 00 52   .....j.j.......R
02730  50 0E E8 00 00 83 C4 08-6A 00 6A 00 6A 00 6A 02   P.......j.j.j.j.
02740  9A 00 00 00 00 83 C4 08-6A 00 6A 00 6A 00 6A 03   ........j.j.j.j.
02750  9A 00 00 00 00 83 C4 08-8E 06 02 00 26 A1 00 00   ............&...
02760  2B 46 F0 99 8E 06 04 00-26 F7 3E 04 00 8E 06 02   +F......&.>.....
02770  00 26 89 16 04 00 26 A1-02 00 2B 46 EE 99 8E 06   .&....&...+F....
02780  04 00 26 F7 3E 06 00 8E-06 02 00 26 89 16 06 00   ..&.>......&....
02790  B8 00 00 BA 00 00 52 50-9A 00 00 00 00 83 C4 04   ......RP........
027A0  9A 00 00 00 00 1F 5E 5F-C9 CB 90 C8 00 00 00 1E   ......^_........
027B0  B8 00 00 8E D8 FF 76 0C-9A 00 00 00 00 83 C4 02   ......v.........
027C0  6A 02 9A 00 00 00 00 83-C4 02 C4 5E 06 26 FF 77   j..........^.&.w
027D0  02 26 FF 37 9A 00 00 00-00 83 C4 04 C4 5E 06 26   .&.7.........^.&
027E0  FF 77 0A 26 FF 77 08 9A-00 00 00 00 83 C4 04 C4   .w.&.w..........
027F0  5E 06 26 8B 47 0A 48 50-26 8B 47 08 48 50 9A 00   ^.&.G.HP&.G.HP..
02800  00 00 00 83 C4 04 1F C9-CB 6F 9C 38 01 CE FD 56   .........o.8...V
02810  45 CE E6 56 45 CE D3 56-42 CE C1 56 40 CE B7 56   E..VE..VB..V@..V
02820  3E CA AF 9D CE 9F 56 4E-CE 97 56 19 CA 92 56 22   >.....VN..V...V"
02830  C6 8F 56 22 C6 8C 56 38-C6 87 9C C6 83 56 48 C6   ..V"..V8.....VH.
02840  7E 9C C6 76 56 38 C6 72-56 38 C6 6D 9C C6 69 56   ~..vV8.rV8.m..iV
02850  48 C6 64 9C C6 5C 56 38-C6 58 9C CE 4F 56 35 CE   H.d..\V8.X..OV5.
02860  3F 56 35 86 31 56 24 CA-2B 56 38 C6 28 56 38 CE   ?V5.1V$.+V8.(V8.
02870  1F 56 54 86 0F 56 24 CA-09 56 38 C6 06 56 38 C5   .VT..V$..V8..V8.
02880  FF 56 38 C5 FB 9C C5 E6-56 38 C5 E2 56 38 C5 DE   .V8.....V8..V8..
02890  9C C5 C7 56 38 C5 C3 9C-C5 BD 56 38 C5 B9 9C C5   .V8..V8.....V8..
028A0  A2 56 38 C5 9E 56 38 C5-9A 9C C5 83 56 38 C5 7F   .V8..V8.....V8..
028B0  9C 85 72 56 24 C9 6C 56-38 C5 69 56 38 CD 42 56   ..rV$.lV8.iV8.BV
028C0  52 CD 34 56 32 85 1A 56-24 C9 14 56 38 C5 11 56   R.4V2..V$..V8..V
028D0  38 CD 05 56 35 CC F4 56-35 CC E3 56 20 CC D1 56   8..V5..V5..V ..V
028E0  1D C4 CA 56 38 C4 C3 56-38 C4 BE 9C C4 B4 56 48   ...V8..V8.....VH
028F0  C4 B0 9C C4 AC 56 38 C4-A5 56 38 C4 A0 9C C4 94   .....V8..V8.....
02900  56 48 C4 90 9C C4 8A 56-38 C4 80 56 38 C4 76 56   VH.....V8..V8.vV
02910  38 C4 6C 56 38 C4 64 56-38 C4 5E 56 38 C4 56 56   8.1V8.dV8.^V8.VV
02920  38 C4 50 56 38 C4 48 9C-C4 39 56 48 C4 2A 56 48   8.PV8.H..9VH.*VH
02930  C4 20 56 48 C4 1B 56 48-C4 11 56 48 C4 0C 56 48   . VH..VH..VH..VH
02940  C4 05 56 48 0D A0 06 00-03 0C 00 00 00 4B 9C 05   ..VH.........K..
02950  00 C8 00 54 05 3E A0 B8-02 01 A4 12 C8 06 00 00   ...T.>..........
02960  57 56 1E B8 00 00 8E D8-68 00 03 68 00 D0 9A 00   WV......h..h....
02970  00 00 00 83 C4 04 6A 00-6A 01 9A 00 00 00 00 83   ......j.j.......
02980  C4 04 6A 01 6A 01 9A 00-00 00 00 83 C4 04 2B F6   ..j.j.........+.
02990  83 C6 8E 06 0C 00 26 88-84 00 00 B8 FF 00 2B C6   ......&.......+.
```

```
029A0  8B F8 26 8A 84 00 00 26-88 85 00 04 8B C6 99 2B   ..&....&.......+
029B0  C2 D1 F8 88 46 FA 26 88-84 00 01 26 88 85 00 03   ....F.&....&....
029C0  2C 80 26 88 84 00 02 26-88 85 00 05 46 81 FE 00   ,.&....&....F...
029D0  01 7C BD 89 76 FE 6A 00-6A 02 9A 00 00 00 00 83   .|..v.j.j.......
029E0  C4 04 6A 01 6A 02 6A FF-6A 00 9A 00 00 00 00 83   ..j.j.j.j.......
029F0  C4 08 6A 01 6A 02 6A FF-6A 00 9A 00 00 00 00 83   ..j.j.j.j.......
02A00  C4 08 68 FF 00 9A 00 00-00 00 83 C4 02 68 00 02   ..h..........h..
02A10  68 00 02 6A 00 6A 00 9A-00 00 00 83 C4 08 6A      h..j.j........j
02A20  00 9A 00 00 00 00 83 C4-02 8E 06 06 00 26 8B 1E   .............&..
02A30  00 00 8A 87 40 01 2A E4-50 8E 06 08 00 26 8B 1E   ....@.*.P....&..
02A40  00 00 8A 87 40 01 50 8E-06 0A 00 26 8B 1E 00 00   ....@.P....&....
02A50  8A 87 40 01 50 6A 01 9A-00 00 00 00 83 C4 08 6A   ..@.Pj.........j
02A60  00 6A 04 9A 00 00 00 00-83 C4 04 6A 00 6A 04 9A   .j.........j.j..
02A70  00 00 00 00 83 C4 04 6A-00 6A 05 9A 00 00 00 00   .......j.j......
02A80  83 C4 04 6A 00 6A 05 9A-00 00 00 00 83 C4 04 8E   ...j.j..........
02A90  06 04 00 26 83 3E 00 00-00 75 07 26 C7 06 00 00   ...&.>...u.&....
02AA0  47 00 26 83 3E 02 00 00-75 07 26 C7 06 02 00 6D   G.&.>...u.&....m
02AB0  00 26 83 3E 04 00 00 75-07 26 C7 06 04 00 20 00   .&.>...u.&.... .
02AC0  26 83 3E 06 00 00 75 07-26 C7 06 06 00 26 00 26   &.>...u.&....&.&
02AD0  83 3E 08 00 00 75 07 26-C7 06 08 00 0C 00 26 83   .>...u.&......&.
02AE0  3E 0A 00 00 75 07 26 C7-06 0A 00 08 00 6A 01 6A   >...u.&......j.j
02AF0  02 B8 00 00 BA 00 00 52-50 0E E8 00 00 83 C4 08   .......RP.......
02B00  8E 06 02 00 26 C7 06 00-00 00 00 26 C7 06 02 00   ....&......&....
02B20  04 00 99 2B C2 D1 F8 8E-06 02 00 26 A3 04 00 26   ...+.......&...&
02B30  83 3E 06 00 00 75 15 8E-06 04 00 26 A1 06 00 99   .>...u.....&....
02B40  2B C2 D1 F8 8E 06 02 00-26 A3 06 00 26 83 3E 08   +.......&...&.>.
02B50  00 00 75 15 8E 06 04 00-26 A1 04 00 99 2B C2 D1   ..u.....&....+..
02B60  F8 8E 06 02 00 26 A3 08-00 26 83 3E 0A 00 00 75   .....&...&.>...u
02B70  15 8E 06 04 00 26 A1 06-00 99 2B C2 D1 F8 8E 06   .....&....+.....
02B80  02 00 26 A3 0A 00 1F 5E-5F C9 CB 90 C8 00 00 00   ..&....^_.......
02B90  1E B8 00 00 8E D8 FF 76-0A FF 76 0C 9A 00 00 00   .......v..v.....
02BA0  00 83 C4 04 C4 5E 06 26-FF 77 0A 26 FF 77 08 26   .....^.&.w.&.w.&
02BB0  FF 77 06 26 FF 77 04 26-FF 77 02 26 FF 37 FF 76   .w.&.w.&.w.&.7.v
02BC0  0A 6A 01 9A 00 00 00 00-83 C4 10 1F C9 CB C8 00   .j..............
02BD0  00 00 1E B8 00 00 8E D8-FF 76 0A FF 76 0C 9A 00   .........v..v...
02BE0  00 00 00 83 C4 04 C4 5E-06 26 FF 77 0A 26 FF 77   .......^.&.w.&.w
02BF0  08 26 FF 77 06 26 FF 77-04 26 FF 77 02 26 FF 37   .&.w.&.w.&.w.&.7
02C00  FF 76 0A 6A 00 9A 00 00-00 00 83 C4 10 1F C9 CB   .v.j............
02C10  D3 9C 21 01 CE AA 56 02-CE 83 56 1D CA 78 9D CE   ..!...V...V..x..
02C20  68 56 02 CE 41 56 1D CA-36 9D C6 28 56 38 C6 24   hV..AV..6..(V8.$
02C30  9C C6 1B 56 48 C6 17 9C-C6 10 56 38 C6 0B 56 38   ...VH.....V8..V8
02C40  C6 07 9C C5 FE 56 48 C5-FA 9C C5 F3 56 38 C5 EE   .....VH.....V8..
02C50  56 38 C5 EA 9C C5 E1 56-48 C5 DD 9C C5 D6 56 38   V8.....VH.....V8
02C60  C5 D1 56 38 C5 CD 9C C5-C4 56 48 C5 C0 9C C5 B9   ..V8.....VH.....
02C70  56 38 C5 B2 56 38 C5 AB-56 38 C5 A6 9C 85 9F 56   V8..V8..V8.....V
02C80  59 C9 99 56 48 C5 96 56-48 C5 8D 56 48 C5 85 56   Y..VH..VH..VH..V
02C90  48 C5 7E 56 48 C5 76 56-48 C5 6F 56 48 C5 67 56   H.~VH.vVH.oVH.gV
02CA0  48 C5 60 56 48 C5 58 56-48 C5 51 56 48 C5 49 56   H.'VH.XVH.QVH.IV
02CB0  48 C5 42 56 48 C5 3A 56-48 C5 35 9C CD 2C 56 18   H.BVH.:VH.5..,V.
02CC0  CD 20 56 18 CD 14 56 18-CD 08 56 18 CC FC 56 35   . V...V...V...V5
02CD0  C4 F6 9D C4 F2 56 04 C4-ED 9C C4 E8 9D C4 E4 56   .....V.........V
02CE0  07 C4 DF 9C C4 D8 9D C4-D4 56 0A C4 CF 9C CC C6   .........V......
02CF0  56 1A CC BC 56 16 CC AA-56 56 CC 9F 56 31 CC 8F   V...V...VV..V1..
02D00  56 31 CC 7F 56 26 C4 6E-54 05 C4 69 54 05 C4 62   V1.#V&.nT..iT..b
02D10  54 05 C4 5D 54 05 C4 4E-54 05 C4 49 54 05 C4 3D   T..]T..NT..IT..=
02D20  54 05 C4 38 9C CC 2B 56-34 CC 1F 56 33 CC 13 56   T..8..+V4..V3..V
02D30  4D C8 08 9D B7 8A 02 00-00 74                     M........t
02D30  4D C8 08 9D B7 8A 02 00-00 74                     M........t
   00  80 0B 00 09 62 6B 72 6D-5F 39 37 2E 63 60 88 07   ....bkrm_97.c'..
   10  00 00 00 4D 53 20 43 6E-88 09 00 00 9F 4C 4C 49   ...MS Cn.....LLI
   20  42 43 45 25 88 06 00 00-9D 32 6C 4F E8 88 06 00   BCE%.....2lO....
   30  00 A1 01 43 56 37 96 35-00 00 06 44 47 52 4F 55   ...CV7.5...DGROU
   40  50 0C 42 4B 52 4D 5F 39-37 5F 54 45 58 54 04 43   P.BKRM_97_TEXT.C
   50  4F 44 45 05 5F 44 41 54-41 04 44 41 54 41 05 43   ODE._DATA.DATA.C
  060  4F 4E 53 54 04 5F 42 53-53 03 42 53 53 36 98 07   ONST._BSS.BSS6..
 0070  00 48 36 0B 03 04 01 D0-98 07 00 48 96 01 05 06   .H6........H....
 0080  01 76 98 07 00 48 26 00-07 07 01 E4 98 07 00 48   .v...H&........H
 0090  00 00 08 09 01 07 9A 08-00 02 FF 03 FF 04 FF 02   ................
```

```
00A0  56 9C 0D 00 00 03 01 02-02 01 03 04 40 01 45 01   V...........@.E.
00B0  C0 8C 23 02 09 5F 5F 66-6C 74 75 73 65 64 00 06   ..#..__fltused..
00C0  46 4A 53 52 51 51 00 06-46 49 53 52 51 51 00 06   FJSRQQ..FISRQQ..
00D0  46 49 45 52 51 51 00 06-46 49 44 52 51 51 00 06   FIERQQ..FIDRQQ..
00E0  46 49 57 52 51 51 00 0A-5F 5F 61 63 72 74 75 73   FIWRQQ..__acrtus
00F0  65 64 00 07 5F 73 63 72-6F 6C 6C 00 13 5F 67 65   ed.._scroll.._ge
0100  74 5F 65 78 70 65 72 69-6D 65 6E 74 5F 6B 65 79   t_experiment_key
0110  00 0C 5F 69 6D 5F 73 6F-66 74 69 6E 69 74 00 0B   .._im_softinit..
0120  5F 69 6D 5F 61 76 65 72-61 67 65 00 08 5F 69 6D   _im_average.._im
0130  5F 73 79 6E 63 00 06 5F-66 72 61 6D 65 00 0E 5F   _sync.._frame.._
0140  63 6C 69 70 5F 73 75 62-74 72 61 63 74 00 11 5F   clip_subtract.._
0150  72 65 6D 6F 76 65 5F 62-61 72 5F 67 72 61 70 68   remove_bar_graph
0160  00 07 5F 65 72 72 6D 73-67 00 08 5F 62 6B 72 6D   .._errmsg.._bkrm
0170  5F 39 37 00 09 5F 69 6D-5F 76 69 64 65 6F 00 0B   _97.._im_video..
0180  5F 69 6D 5F 6F 75 74 6D-6F 64 65 00 13 5F 63 6C   _im_outmode.._cl
0190  65 61 72 5F 6D 65 73 73-61 67 65 5F 61 72 65 61   ear_message_area
01A0  00 0B 5F 69 6D 5F 6F 75-74 70 61 74 68 00 0A 5F   .._im_outpath.._
01B0  69 6D 5F 6F 70 6D 6F 64-65 00 15 5F 63 6C 6F 73   im_opmode.._clos
01C0  65 5F 73 74 61 6E 64 61-72 64 73 5F 66 69 6C 65   e_standards_file
01D0  00 0A 5F 69 6D 5F 63 70-75 77 69 6E 00 0E 5F 67   .._im_cpuwin.._g
01E0  65 74 5F 73 74 61 6E 64-61 72 64 73 00 0B 5F 6D   et_standards.._m
01F0  65 73 73 61 67 65 5F 6F-6E 00 0C 5F 64 72 61 77   essage_on.._draw
0200  5F 62 6F 72 64 65 72 00-09 5F 78 62 6B 72 6D 5F   _border.._xbkrm_
0210  39 37 00 0C 5F 73 65 74-5F 6D 65 73 73 61 67 65   97.._set_message
0220  00 0E 5F 69 6D 5F 69 6E-74 65 72 69 6D 61 67 65   .._im_interimage
0230  00 11 5F 73 65 74 5F 5F-66 74 6F 6C 00 05 5F 7A 65   .._set_screen_ti
0240  74 6C 65 00 06 5F 5F 66-74 6F 6C 00 05 5F 7A 65   tle..__ftol.._ze
0250  72 6F 00 04 5F 6F 6E 65-00 04 5F 74 77 6F 00 06   ro.._one.._two..
0260  5F 74 68 72 65 65 00 0C-5F 6D 65 73 73 61 67 65   _three.._message
0270  5F 6F 66 66 00 04 5F 61-6C 6C 00 08 5F 73 70 72   _off.._all.._spr
0280  69 6E 74 66 00 0F 5F 64-72 61 77 5F 62 61 72 5F   intf.._draw_bar_
0290  67 72 61 70 68 00 05 5F-63 68 61 6E 00 08 5F 67   graph.._chan.._g
02A0  72 5F 63 68 61 6E 00 0F-5F 73 65 74 5F 62 61 72   r_chan.._set_bar
02B0  5F 73 6C 69 64 65 72 00-1C 5F 67 65 74 5F 73 74   _slider.._get_st
02C0  61 6E 64 61 72 64 5F 67-72 69 64 5F 73 74 72 75   andard_grid_stru
02D0  63 74 75 72 65 00 55 90-2E 00 00 01 0E 5F 63 6C   cture.U...... cl
02E0  69 70 5F 73 75 62 74 72-61 63 74 00 00 00 08 5F   ip_subtract...._
02F0  62 6B 72 6D 5F 39 37 16-0B 00 09 5F 78 62 6B 72   bkrm_97...._xbkr
0300  6D 5F 39 37 DE 00 00 29-88 04 00 00 A2 01 D1 A0   m_97...)........
0310  53 01 02 07 00 42 69 6F-6C 6F 67 69 63 61 6C 20   S....Biological
0320  56 69 73 69 6F 6E 20 20-42 4B 52 4D 5F 39 37 20   Vision  BKRM_97
0330  42 61 63 6B 67 72 6F 75-6E 64 20 52 65 6D 6F 76   Background Remov
0340  61 6C 00 43 61 6E 27 74-20 61 63 63 65 73 73 20   al.Can't access
0350  73 74 61 6E 64 61 72 64-73 20 69 6E 66 6F 72 6D   standards inform
0360  61 74 69 6F 6E 20 66 6F-72 20 6B 65 79 20 25 6C   ation for key %l
0370  64 00 55 73 69 6E 67 20-64 65 66 61 75 6C 74 20   d.Using default
0380  67 72 69 64 20 73 74 72-75 63 74 75 72 65 20 64   grid structure d
0390  61 74 61 00 55 73 69 6E-67 20 64 65 66 61 75 6C   ata.Using defaul
03A0  74 20 67 72 69 64 20 73-74 72 75 63 74 75 72 65   t grid structure
03B0  20 64 61 74 61 00 53 65-74 74 69 6E 67 20 75 70    data.Setting up
03C0  20 66 6F 72 20 62 61 63-6B 67 72 6F 75 6E 64 20    for background
03D0  72 65 6D 6F 76 61 6C 2E-2E 2E 00 52 61 64 69 75   removal....Radiu
03E0  73 20 3D 20 25 64 20 58-69 6E 63 72 65 6D 65 6E   s = %d Xincremen
03F0  74 20 3D 20 25 64 20 59-69 6E 63 72 65 6D 65 6E   t = %d Yincremen
0400  74 20 3D 20 25 64 00 52-65 6D 6F 76 69 6E 67 20   t = %d.Removing
0410  62 61 63 6B 67 72 6F 75-6E 64 2E 2E 2E 00 42 61   background....Ba
0420  63 6B 67 72 6F 75 6E 64-20 72 65 6D 6F 76 61 6C   ckground removal
0430  20 70 65 72 63 65 6E 74-20 63 6F 6D 70 6C 65 74    percent complet
0440  65 00 43 6C 65 61 6E 69-6E 67 20 75 70 20 62 61   e.Cleaning up ba
0450  63 6B 67 72 6F 75 6E 64-20 72 65 6D 6F 76 61 6C   ckground removal
0460  2E 2E 2E 00 49 A0 07 00-02 00 00 64 00 32 C1 A0   ....I......d.2..
0470  07 00 02 04 00 96 B4 C8-41 A0 44 00 02 56 01 43   ........A.D..V.C
0480  6F 70 79 72 69 67 68 74-20 28 63 29 20 31 39 38   opyright (c) 198
0490  39 2C 20 42 69 6F 6C 6F-67 69 63 61 6C 20 56 69   9, Biological Vi
04A0  73 69 6F 6E 20 49 6E 63-2E 20 20 41 6C 6C 20 72   sion Inc.  All r
04B0  69 67 68 74 73 20 72 65-73 65 72 76 65 64 00 70   ights reserved.p
04C0  A0 06 00 03 00 00 00 00-57 9C 05 00 C8 00 56 22   ........W.....V"
04D0  1F A0 E2 00 01 00 00 C8-18 00 00 57 56 1E B8 00   ...........WV...
```

```
0004E0  00 8E D8 8E 06 00 00 26-FF 36 00 00 6A 01 9A 00    .......&.6..j...
0004F0  00 00 00 83 C4 04 6A 01-9A 00 00 00 00 83 C4 02    ......j.........
000500  6A 00 6A 00 6A FF 6A 01-9A 00 00 00 00 83 C4 08    j.j.j.j.........
000510  6A 00 6A 00 6A FF 6A 01-9A 00 00 00 00 83 C4 08    j.j.j.j.........
000520  C7 46 FA 00 D0 6A 01 9A-00 00 00 00 83 C4 02 6A    .F...j.........j
000530  04 6A 00 9A 00 00 00 00-83 C4 04 2B F6 89 76 E8    .j.........+..v.
000540  8B C6 C1 F8 06 89 46 EE-50 9A 00 00 00 00 83 C4    ......F.P.......
000550  02 8B 46 E8 89 46 F8 8B-56 FA 40 89 46 F2 89 56    ..F..F..V.@.F..V
000560  F4 BF 00 02 89 7E EA C4-5E F8 26 8A 07 2A E4 89    .....~..^.&..*..
000570  46 FC C4 5E F2 26 8A 07-89 46 F6 2B 46 FC 8B C8    F..^.&...F.+F...
000580  0B C9 7D 02 2B C9 8B C1-26 88 07 83 46 F8 02 83    ..}.+...&...F...
000590  46 F2 02 FF 4E EA 75 CF-89 4E F0 80 46 E9 04 46    F...N.u..N..F..F
0005A0  81 FE DF 01 7E 9A 6A 00-9A 00 00 00 00 83 C4 02    ....~.j.........
0005B0  1F 5E 5F C9 CB 09 9C 2B-00 CC D2 56 13 CC 73 56    .^_....+...V..sV
0005C0  18 CC 5D 56 16 CC 51 56-13 CC 42 56 15 CC 32 56    ..]V..QV..BV..2V
0005D0  15 CC 22 56 13 CC 18 56-12 C4 13 56 22 C4 0E 9C    .."V...V...V"...
0005E0  C8 08 9D BB A0 28 00 03-02 00 00 00 00 00 00 00    .....(..........
0005F0  00 00 00 00 00 00 00 00-40 00 00 00 00 00 E0 3F    ........@......?
000600  00 00 00 00 00 00 00 08-40 00 00 00 00 00 8C 9C    ........@.......
000610  19 00 C8 22 56 24 C8 20-56 26 C8 1E 56 23 C8 04    ..."V$. V&..V#..
000620  56 2A C8 02 56 29 C8 00-56 21 50 A0 B7 03 01 DE    V*..V)..V!P.....
000630  00 C8 AE 27 00 57 56 1E-B8 00 00 8E D8 8E 06 02    ...'.WV.........
000640  00 26 A1 00 00 8E 06 04-00 26 A3 00 00 8E 06 00    .&.......&......
000650  00 26 A1 00 00 8E 06 06-00 26 A3 00 00 1E 68 07    .&.......&....h.
000660  00 9A 00 00 00 00 83 C4-04 68 00 03 68 00 D0 9A    .........h..h...
000670  00 00 00 00 83 C4 04 8E-06 04 00 26 FF 36 00 00    ...........&.6..
000680  6A 02 9A 00 00 00 00 83-C4 04 8E 06 00 00 26 FF    j.............&.
000690  36 00 00 6A 00 9A 00 00-00 00 83 C4 04 8E 06 04    6..j............
0006A0  00 26 FF 36 00 00 8E 06-00 00 26 FF 36 00 00 9A    .&.6......&.6...
0006B0  00 00 00 00 83 C4 04 83-7E 0A 00 74 03 E9 B5 01    ........~..t....
0006C0  9A 00 00 00 00 89 86 70-D8 89 96 72 D8 0B D2 7D    .......p...r...}
0006D0  0A 2B C0 89 86 72 D8 89-86 70 D8 FF B6 72 D8 FF    .+...r...p...r..
0006E0  B6 70 D8 9A 00 00 00 00-83 C4 04 89 86 7A D8 89    .p...........z..
0006F0  96 7C D8 0B D0 75 1C FF-B6 72 D8 FF B6 70 D8 1E    .|...u...r...p..
000700  68 35 00 9A 00 00 00 00-83 C4 08 2B C0 1F 5E 5F    h5.........+..^_
000710  C9 CB 90 8D 46 FA 16 50-8D 86 92 D8 16 50 8D 86    ....F..P.....P..
000720  5E D8 16 50 8D 86 68 D8-16 50 8D 86 86 D8 16 50    ^..P..h..P.....P
000730  8D 86 90 D8 16 50 8D 86-84 D8 16 50 8D 86 8E D8    .....P.....P....
000740  16 50 8D 86 6E D8 16 50-8D 86 78 D8 16 50 9A 00    .P..n..P..x..P..
000750  00 00 00 83 C4 28 0B C0-75 1D 8B 86 7A D8 0B 86    .....(..u...z...
000760  7C D8 74 A7 FF B6 7C D8-FF B6 7A D8 9A 00 00 00    |.t...|...z.....
000770  00 83 C4 04 EB 95 90 83-BE 78 D8 00 75 47 83 BE    .........x..uG..
000780  6E D8 00 75 40 83 BE 8E-D8 00 75 39 83 BE 84 D8    n..u@.....u9....
000790  00 75 32 1E 68 64 00 6A-00 9A 00 00 00 00 83 C4    .u2.hd.j........
0007A0  06 C7 86 78 D8 05 00 C7-86 6E D8 05 00 C7 86 8E    ...x.....n......
0007B0  D8 2B 00 C7 86 84 D8 3C-00 C7 86 90 D8 0C 00 C7    .+.....<........
0007C0  86 86 D8 08 00 FF B6 7C-D8 FF B6 7A D8 9A 00 00    .......|...z....
0007D0  00 00 83 C4 04 83 BE 8E-D8 00 75 06 C7 86 8E D8    ..........u.....
0007E0  08 00 83 BE 84 D8 00 75-06 C7 86 84 D8 0A 00 83    .......u........
0007F0  BE 90 D8 00 75 06 C7 86-90 D8 0C 00 83 BE 86 D8    ....u...........
000800  00 75 06 C7 86 86 D8 08-00 83 BE 92 D8 00 75 13    .u............u.
000810  83 7E FA 00 75 0D 9B DF-86 8E D8 9B DF 86 84 D8    .~..u...........
000820  EB 0A 90 9B DF 86 92 D8-9B DF 46 FA 9B DE C1 9B    ..........F.....
000830  DC 36 08 00 9B D9 96 60-D8 9B DC 06 10 00 9B DC    .6.....`........
000840  0E 18 00 9A 00 00 00 00-89 86 88 D8 3D 31 00 7E    ............=1.~
000850  06 C7 86 88 D8 31 00 8B-86 88 D8 99 B9 04 00 F7    .....1..........
000860  F9 89 86 E8 D8 8B 86 88-D8 99 B9 03 00 F7 F9 89    ................
000870  86 E6 D8 EB 54 8B 46 0A-89 86 88 D8 8B 46 0C 89    ....T.F......F..
000880  86 E8 D8 8B 46 0E 89 86-E6 D8 83 BE 88 D8 31 7E    ....F.........1~
000890  06 C7 86 88 D8 31 00 1E-68 86 00 6A 00 9A 00 00    .....1..h..j....
0008A0  00 00 83 C4 06 C7 86 78-D8 05 00 C7 86 6E D8 05    .......x.....n..
0008B0  00 C7 86 8E D8 2B 00 C7-86 84 D8 3C 00 C7 86 90    .....+.....<....
0008C0  D8 0C 00 C7 86 86 D8 08-00 1E 68 A8 00 9A 00 00    ..........h.....
0008D0  00 00 83 C4 04 8E 06 02-00 8B 86 E6 D8 26 39 06    .............&9.
0008E0  00 00 75 08 8B 86 E8 D8-89 86 E6 D8 8B 86 88 D8    ..u.............
0008F0  8E 06 00 00 26 2B 06 00-00 89 86 64 D8 8B 86 88    ....&+.....d....
000900  D8 99 8E 06 20 00 26 F7-3E 00 00 26 A1 00 00 8B    .... .&.>..&....
```

```
.0910  CA F7 AE 88 D8 2B C1 89-86 6A D8 8B 86 88 D8 99   ......+..j......
.0920  26 F7 3E 00 00 89 46 FC-03 86 88 D8 89 46 FE FF   &.>...F......F..
.0930  B6 E6 D8 FF B6 E8 D8 FF-B6 88 D8 1E 68 CD 00 8D   ............h...
.0940  86 96 D8 16 50 9A 00 00-00 00 83 C4 0E 8D 86 96   ....P...........
.0950  D8 16 50 6A 00 9A 00 00-00 00 83 C4 06 8B 86 78   ..Pj...........x
.0960  D8 89 86 82 D8 8B 86 6E-D8 89 86 74 D8 8B 86 90   .......n...t....
.0970  D8 F7 AE 8E D8 03 86 78-D8 89 86 76 D8 8B 86 86   .......x...v....
.0980  D8 F7 AE 84 D8 03 86 6E-D8 89 86 6C D8 8E 06 20   .......n...l... 
.0990  00 8B 46 08 26 39 06 00-00 75 0A 8E 06 22 00 26   ..F.&9...u..."&
.09A0  A1 00 00 EB 08 8E 06 02-00 26 A1 00 00 89 86 94   .........&......
.09B0  D8 FF B6 6C D8 FF B6 76-D8 FF B6 74 D8 FF B6 82   ...l...v...t....
.09C0  D8 50 FF 76 06 9A 00 00-00 00 83 C4 0C 8E 06 04   .P.v............
.09D0  00 26 FF 36 00 00 6A 02-9A 00 00 00 00 83 C4 04   .&.6..j.........
.09E0  8E 06 04 00 49 9C 03 01-C7 B1 9C CF A8 56 16 C7   ....I........V..
.09F0  A3 56 29 C7 9E 9C CF 95-56 1B C7 7A 56 21 C7 76   .V).....V..zV!.v
.0A00  9C C7 70 56 26 C7 6C 9C-C7 66 56 23 C7 5E 9C CF   ..pV&.l..fV#.^..
.0A10  25 56 1D CF 15 56 27 C7-0C 9D C6 F2 56 23 C6 DC   %V...V'.....V#..
.0A20  56 23 C6 D8 56 23 C6 D3-9C C6 C6 56 22 C6 C1 9C   V#..V#.....V"...
.0A30  C6 AF 56 21 C6 A6 9C CE-9D 56 1A C6 9A 9D CE 6D   ..V!.....V.....m
.0A40  56 1D C6 68 9D CE 13 56-20 C6 10 9C C6 0D 56 05   V..h...V .....V.
.0A50  C6 0B 9C C6 08 56 05 C6-03 56 05 C6 01 9C C5 FE   .....V...V......
.0A60  56 05 C5 FB 56 05 C5 F7-56 05 C5 F2 56 05 C5 EA   V...V...V...V...
.0A70  56 05 C5 E5 56 05 CD 9D-56 17 CD 69 56 1D C5 64   V...V...V..iV..d
.0A80  9D CD 3C 56 17 CD 1E 56-2C CC D3 56 10 C4 D0 9D   ..<V...V,..V....
.0A90  CC B3 56 19 CC 90 56 09-CC 7F 56 0C C4 7C 56 22   ..V...V...V..|V"
.0AA0  C4 77 9C C4 73 56 29 C4-6E 9C CC 65 56 12 C4 60   .w..sV).n..eV..`
.0AB0  56 22 C4 5B 9C CC 52 56-16 C4 4D 56 29 C4 48 9C   V".[..RV..MV).H.
.0AC0  CC 3F 56 0A CC 31 56 1F-C4 2E 9D C4 2A 56 2A C4   .?V..1V.....*V*.
.0AD0  26 9C C4 22 56 22 C4 1E-9C C4 1A 56 29 C4 16 9C   &.."V".....V)...
.0AE0  C4 12 56 21 C4 0E 9C C8-08 9D BE A0 B4 03 01 91   ..V!............
.0AF0  04 26 FF 36 00 00 6A 02-9A 00 00 00 00 83 C4 04   .&.6..j.........
.0B00  6A 01 9A 00 00 00 00 83-C4 02 6A 08 8E 06 02 00   j.........j.....
.0B10  26 FF 36 00 00 FF 76 06-FF 76 06 9A 00 00 00 00   &.6...v..v......
.0B20  83 C4 08 6A 08 8E 06 02-00 26 FF 36 00 00 FF 76   ...j.....&.6...v
.0B30  06 FF 76 06 9A 00 00 00-00 83 C4 08 6A 01 9A 00   ..v.........j...
.0B40  00 00 00 83 C4 02 6A 08-8E 06 24 00 26 FF 36 00   ......j...$.&.6.
.0B50  00 8E 06 02 00 26 FF 36-00 00 26 FF 36 00 00 9A   .....&.6..&.6...
.0B60  00 00 00 00 83 C4 08 6A-08 8E 06 24 00 26 FF 36   .......j...$.&.6
.0B70  00 00 8E 06 02 00 26 FF-36 00 00 26 FF 36 00 00   ......&.6..&.6..

.0B80  9A 00 00 00 00 83 C4 08-8E 06 02 00 26 A1 00 00   ............&...
.0B90  89 86 8C D8 3D 63 00 7F-54 6B C0 64 8B F8 B8 64   ....=c..Tk.d...d
.0BA0  00 2B 86 8C D8 89 86 56-D8 01 86 8C D8 8E 06 02   .+.....V........
.0BB0  00 26 8B 36 00 00 83 FE-63 7F 25 B8 64 00 2B C6   .&.6....c.%.d.+.
.0BC0  89 86 58 D8 8B DF 03 DE-03 DD 26 A0 00 00 8B 8E   ..X.......&.....
.0BD0  58 D8 57 8D BF EA D8 16-07 F2 AA 5F 03 B6 58 D8   X.W........_..X.
.0BE0  83 C7 64 81 FF AC 26 7E-C4 89 B6 66 D8 8B 46 FC   ..d...&~...f..F.
.0BF0  89 86 8C D8 8B 46 FE 39-86 8C D8 7D 5C 6B 46 FC   .....F.9...}\kF.
.0C00  64 89 86 56 D8 8B 46 FE-2B 46 FC 89 86 5A D8 01   d..V..F.+F...Z..
.0C10  86 8C D8 8B BE 58 D8 8E-06 02 00 26 8B 36 00 00   .....X.....&.6..
.0C20  3B B6 6A D8 7D 24 8B BE-6A D8 2B FE 8B 9E 56 D8   ;.j.}$..j.+...V.
.0C30  03 DE 03 DD 8E 06 00 00-26 A0 00 00 8B CF 57 8D   ........&.....W.
.0C40  BF EA D8 16 07 F2 AA 5F-03 F7 83 86 56 D8 64 FF   ......._....V.d.
.0C50  8E 5A D8 75 C2 89 B6 66-D8 8B 86 6A D8 8E 06 00   .Z.u...f...j....
.0C60  00 26 2B 06 00 00 89 86-8A D8 26 A1 00 00 03 46   .&+.......&....F
.0C70  FC 89 86 7E D8 8E 06 02-00 26 A1 00 00 89 86 80   ...~.....&......
.0C80  D8 8B 46 FC 39 86 80 D8-7D 7D 6B 86 80 D8 64 89   ..F.9...}}k...d.
.0C90  86 56 D8 6B 86 8A D8 64-89 86 58 D8 8B 46 FC 2B   .V.k...d..X..F.+
.0CA0  86 80 D8 89 86 5A D8 01-86 80 D8 F7 D8 01 86 8A   .....Z..........
.0CB0  D8 8B 76 FE 8B 8E 7E D8-8E 06 00 00 26 2B 0E 00   ..v...~.....&+..
.0CC0  00 3B CE 7D 26 26 8B 3E-00 00 8B 9E 56 D8 03 D9   .;.}&&.>....V...
.0CD0  03 DD 8B C7 36 88 87 EA-D8 8B 9E 58 D8 03 D9 03   ....6......X....
.0CE0  DD 36 88 87 EA D8 41 3B-CE 7C DF 83 AE 58 D8 64   .6....A;.|...X.d
.0CF0  FF 8E 7E D8 46 83 86 56-D8 64 FF 8E 5A D8 75 B4   ..~.F..V.d..Z.u.
.0D00  89 76 FE 89 8E 66 D8 9A-00 00 00 00 1E 68 F9 00   .v...f.......h..
.0D10  6A 01 9A 00 00 00 00 83-C4 06 1E 68 10 01 6A 05   j..........h..j.
.0D20  6A 0A 9A 00 00 00 00 83-C4 08 8E 06 02 00 26 A1   j.............&.
```

```
000D30  00 00 89 86 8A D8 8B 86-6A D8 39 86 8A D8 7C 03   ........j.9...|.
000D40  E9 67 01 8B 86 64 D8 F7-D8 89 86 54 D8 6B 86 8A   .g...d.....T.k..
000D50  D8 64 89 86 5A D8 6B 86-E8 D8 64 89 86 52 D8 6A   .d..Z.k...d..R.j
000D60  00 FF B6 6A D8 FF B6 8A-D8 9A 00 00 00 00 83 C4   ...j............
000D70  06 8E 06 02 00 26 8B 36-00 00 3B B6 6A D8 7C 03   .....&.6..;.j.|.
000D80  E9 06 01 8B 86 54 D8 89-86 56 D8 8B 86 64 D8 2B   .....T...V...d.+
000D90  86 8A D8 89 86 58 D8 8B-7E 08 8B 9E 5A D8 03 DE   .....X..~...Z...
000DA0  03 DD 36 80 BF EA D8 00-75 03 E9 CF 00 8B 86 58   ..6.....u......X
000DB0  D8 89 86 66 D8 8B 86 56-D8 03 C6 89 86 8C D8 50   ...f...V.......P
000DC0  FF B6 66 D8 8E 06 00 00-26 FF 36 00 00 8E 06 24   ..f.....&.6....$
000DD0  00 26 FF 36 00 00 9A 00-00 00 00 83 C4 08 6A 01   .&.6..........j.
000DE0  9A 00 00 00 00 83 C4 02-57 8E 06 20 00 26 FF 36   ........W.. .&.6
000DF0  00 00 8E 06 00 00 26 FF-36 00 00 8E 06 02 00 26   ......&.6......&
000E00  FF 36 00 00 9A 00 00 00-00 83 C4 08 57 8E 06 20   .6..........W.. 
000E10  00 26 FF 36 00 00 8E 06-00 00 26 FF 36 00 00 8E   .&.6......&.6...
000E20  06 02 00 26 FF 36 00 00-9A 00 00 00 00 83 C4 08   ...&.6..........
000E30  6A 01 9A 00 00 00 00 83-C4 02 6A 08 8E 06 04 00   j.........j.....
000E40  26 FF 36 00 00 8E 06 20-00 26 FF 36 00 00 26 FF   &.6.... .&.6..&.
000E50  36 00 00 9A 00 00 00 00-83 C4 08 6A 08 8E 06 04   6..........j....
00E60   00 26 FF 36 00 00 8E 06-20 00 26 FF 36 00 00 26   .&.6.... .&.6..&
00E70   FF 36 00 00 9A 00 00 00-00 83 C4 08 03 B6 E6 D8   .6..............
00E80   39 B6 6A D8 7E 03 E9 11-FF 8B 86 52 D8 01 86 5A   9.j.~......R...Z
00E90   D8 8B 86 E8 D8 01 86 8A-D8 8B 86 6A D8 39 86 8A   ...........j.9..
00EA0   D8 1C 9C 2C 01 CF 84 56-1E C7 81 56 23 C7 7C 56   ...,...V...V#.|V
00EB0   23 C7 77 9C C7 73 56 29-C7 6E 9C CF 63 56 1E C7   #.w..sV).n..cV..
00EC0   60 56 23 C7 5B 56 23 C7-56 9C C7 52 56 29 C7 4D   `V#.[V#.V..RV).M
00ED0   9C CF 42 56 13 CF 38 56-1E C7 35 56 21 C7 30 9C   ..BV..8V..5V!.0.
00EE0   C7 2C 56 22 C7 27 9C C7-23 56 23 C7 1E 9C CF 14   .,V".'..#V#.....
00EF0   56 1E C7 11 56 21 C7 0C-9C C7 08 56 22 C7 03 9C   V...V!.....V"...
00F00   C6 FF 56 23 C6 FA 9C CE-F0 56 13 CE E6 56 08 C6   ..V#.....V...V..
00F10   E3 56 24 C6 DE 9C C6 DA-56 22 C6 D5 9C C6 87 56   .V$.....V".....V
00F20   21 C6 82 9C CE 79 56 2B-C6 3F 56 21 C6 3B 9C CE   !....yV+.?V!.;..
00F30   32 56 28 C6 2B 9D CE 22-56 1D C6 1D 9D CE 17 56   2V(.+.."V......V
00F40   25 C5 D7 56 22 C5 CE 56-22 C5 C9 9C C5 8A 56 21   %..V"..V".....V!
00F50   C5 86 9C C5 7B 56 22 C5-73 56 22 C5 6E 9C C5 49   ....{V".sV".n..I
00F60   56 22 C5 45 9C C5 2D 56-21 C5 28 9C C4 DB 56 21   V".E..-V!.(...V!
00F70   C4 C3 56 21 C4 BE 9C C4-9D 56 21 C4 99 9C CC 90   ..V!.....V!.....
00F80   56 1E C4 8D 56 21 C4 88-56 21 C4 83 9C C4 7F 56   V...V!..V!.....V
00F90   24 C4 7A 9C CC 6F 56 1E-C4 6C 56 21 C4 67 56 21   $.z..oV..lV!.gV!
00FA0   C4 62 9C C4 5E 56 24 C4-59 9C CC 4E 56 13 CC 44   .b..^V$.Y..NV..D
00FB0   56 1E C4 3B 56 21 C4 36-9C CC 2B 56 1E C4 22 56   V..;V!.6..+V.."V
00FC0   21 C4 1D 9C CC 12 56 13-CC 08 56 16 C4 03 56 29   !.....V...V...V)
00FD0   63 A0 7F 02 01 41 08 7D-03 E9 B9 FE 89 B6 7E D8   c....A.}......~.
00FE0   6A 00 FF B6 6A D8 FF B6-6A D8 9A 00 00 00 00 83   j...j...j.......
00FF0   C4 06 1E 68 34 01 6A 01-9A 00 00 00 00 83 C4 06   ...h4.j.........
01000   6A 00 8E 06 06 00 26 FF-36 00 00 6A FF 8E 06 04   j.....&.6..j....
01010   00 26 FF 36 00 00 9A 00-00 00 00 83 C4 08 6A 00   .&.6..........j.
01020   8E 06 00 00 26 FF 36 00-00 6A FF 8E 06 04 00 26   ....&.6..j.....&
01030   FF 36 00 00 9A 00 00 00-00 83 C4 08 6A 01 9A 00   .6..........j...
01040   00 00 00 83 C4 02 6A 08-8E 06 00 00 26 FF 36 00   ......j.....&.6.
01050   00 8E 06 24 00 26 FF 36-00 00 26 FF 36 00 00 9A   ...$.&.6..&.6...
01060   00 00 00 00 83 C4 08 6A-08 8E 06 00 00 26 FF 36   .......j.....&.6
01070   00 00 8E 06 24 00 26 FF-36 00 00 26 FF 36 00 00   ....$.&.6..&.6..
01080   9A 00 00 00 00 83 C4 08-6A 01 9A 00 00 00 00 83   ........j.......
01090   C4 02 C7 86 7E D8 05 00-BE 05 00 6A 05 6A 00 9A   ....~......j.j..
010A0   00 00 00 00 83 C4 04 6A-08 8E 06 02 00 26 FF 36   .......j.....&.6
010B0   00 00 8E 06 20 00 26 FF-36 00 00 26 FF 36 00 00   .... .&.6..&.6..
010C0   9A 00 00 00 00 83 C4 08-6A 08 8E 06 02 00 26 FF   ........j.....&.
010D0   36 00 00 8E 06 20 00 26-FF 36 00 00 26 FF 36 00   6.... .&.6..&.6.
010E0   00 9A 00 00 00 00 83 C4-08 4E 75 AF 6A 08 8E 06   .........Nu.j...
010F0   20 00 26 FF 36 00 00 8E-06 00 00 26 FF 36 00 00    .&.6......&.6..
01100   26 FF 36 00 00 9A 00 00-00 00 83 C4 08 6A 08 8E   &.6..........j..
01110   06 20 00 26 FF 36 00 00-8E 06 00 00 26 FF 36 00   . .&.6......&.6.
01120   00 26 FF 36 00 00 9A 00-00 00 00 83 C4 08 68 FF   .&.6..........h.
01130   00 6A 00 9A 00 00 00 00-83 C4 04 68 FF 00 6A 01   .j.........h..j.
```

```
 140  9A 00 00 00 00 83 C4 04-0E E8 00 00 6A 08 8E 06   ............j...
 150  24 00 26 FF 36 00 00 8E-06 02 00 26 FF 36 00 00   $.&.6......&.6..
 160  26 FF 36 00 00 9A 00 00-00 00 83 C4 08 6A 08 8E   &.6..........j..
 170  06 24 00 26 FF 36 00 00-8E 06 02 00 26 FF 36 00   .$.&.6......&.6.
 180  00 26 FF 36 00 00 9A 00-00 00 00 83 C4 08 6A 08   .&.6..........j.
1190  8E 06 02 00 26 FF 36 00-00 8E 06 00 00 26 FF 36   ....&.6......&.6
11A0  00 00 26 FF 36 00 00 9A-00 00 00 00 83 C4 08 6A   ..&.6..........j
11B0  08 8E 06 02 00 26 FF 36-00 00 8E 06 00 00 26 FF   .....&.6......&.
11C0  36 00 00 26 FF 36 00 00-9A 00 00 00 00 83 C4 08   6..&.6..........
11D0  6A 08 8E 06 00 00 26 FF-36 00 00 8E 06 20 00 26   j.....&.6.... .&
11E0  FF 36 00 00 26 FF 36 00-00 9A 00 00 00 00 83 C4   .6..&.6.........
11F0  08 6A 08 8E 06 00 00 26-FF 36 00 00 8E 06 20 00   .j.....&.6.... .
1200  26 FF 36 00 00 26 FF 36-00 00 9A 00 00 00 00 83   &.6..&.6........
1210  C4 08 8E 06 20 00 8B 46-08 26 39 06 00 00 75 0C   .... ..F.&9...u.
1220  8E 06 02 00 26 A1 00 00-EB 0A 90 90 8E 06 22 00   ....&........."..
1230  26 A1 00 00 89 86 94 D8-FF B6 6C D8 FF B6 76 D8   &.........l...v.
1240  FF B6 74 D8 FF B6 82 D8-50 8E 06 20 00 26 FF 36   ..t.....P.. .&.6
1250  00 00 1E 9C 6C 01 C6 79-56 23 C6 74 9C C6 5B 56   ....l..yV#.t..[V
1260  26 C6 57 9C C6 4F 56 21-C6 4B 9C C6 45 56 23 C6   &.W..OV!.K..EV#.
1270  3D 9C CE 34 56 1E C6 31-56 23 C6 2C 56 23 C6 27   =..4V..1V#.,V#.'
1280  9C C6 23 56 22 C6 1E 9C-CE 13 56 1E C6 10 56 23   ..#V"....V...V#
1290  C6 0B 56 23 C6 06 9C C6-02 56 22 C5 FD 9C CD F2   ..V#.....V".....
12A0  56 1E C5 EF 56 22 C5 EA-56 22 C5 E5 9C C5 E1 56   V...V"..V"....V
12B0  21 C5 DC 9C CD D1 56 1E-C5 CE 56 22 C5 C9 56 22   !.....V...V"..V"
12C0  C5 C4 9C C5 C0 56 21 C5-BB 9C CD B0 56 1E C5 AD   V!..V!......V...
12D0  56 21 C5 A8 56 21 C5 A3-9C C5 9F 56 24 C5 9A 9C   V!..V!.....V$...
12E0  CD 8F 56 1E C5 8C 56 21-C5 87 56 21 C5 82 9C C5   ~V$.y..sV..jV..]
12F0  7E 56 24 C5 79 9C 85 73-56 0E CD 6A 56 0D CD 5D   V..PV..MV".HV".C
1300  56 0D CD 50 56 1E C5 4D-56 22 C5 48 56 22 C5 43   ..?V#.:../V..,V"
1310  9C C5 3F 56 23 C5 3A 9C-CD 2F 56 1E C5 2C 56 22   .'V"."...V#.
1320  C5 27 56 22 C5 22 9C C5-1E 56 23 C5 19 9C CD 0B   V...V#..V#.....V
1330  56 1E C5 08 56 23 C5 03-56 23 C4 FE 9C C4 FA 56   !.....V...V#..V#
1340  21 C4 F5 9C CC EA 56 1E-C4 E7 56 23 C4 E2 56 23   .....V!.....V...
1350  C4 DD 9C C4 D9 56 21 C4-D4 9C CC C9 56 0B CC B4   V..V...V$..V$..
1360  56 13 CC AA 56 1E C4 A7-56 24 C4 A2 56 24 C4 9D   ...V".....V...V$
1370  9C C4 99 56 22 C4 94 9C-CC 89 56 1E C4 86 56 24   ..V$.|..xV".s..h
1380  C4 81 56 24 C4 7C 9C C4-78 56 22 C4 73 9C CC 68   V..^V..[V).V..PV
1390  56 13 CC 5E 56 15 C4 5B-56 29 C4 56 9C C4 50 56   *.K..@V..=V).8..
13A0  2A C4 4B 9C CC 40 56 15-C4 3D 56 29 C4 38 9C C4   2V*.-.."V......V
13B0  32 56 2A C4 2D 9C CC 22-56 1D C4 1D 9D CC 14 56   +V.~............
13C0  2B 56 A0 7E 00 01 BC 0A-9A 00 00 00 00 83 C4 0C   j.j.............
13D0  6A 03 6A 02 9A 00 00 00-00 83 C4 04 8E 06 00 00   &.6..j.........j
13E0  26 FF 36 00 00 6A 01 9A-00 00 00 00 83 C4 04 6A   .j.j.j.........j
13F0  00 6A 03 6A FF 6A 02 9A-00 00 00 00 83 C4 08 6A   .j.j.j.........j
1400  00 6A 03 6A FF 6A 02 9A-00 00 00 00 83 C4 08 9A   ................^_.
1410  00 00 00 00 9A 00 00 00-00 B8 01 00 1F 5E 5F C9

420  CB 90 C8 00 00 00 1E B8-00 00 8E D8 6A 00 6A 00   ............j.j.
 430  6A 00 FF 76 08 FF 76 06-0E E8 00 00 83 C4 0A 1F   j..v..v.........
 440  C9 CB E6 9C 2B 00 84 72-56 1C C8 60 9D CC 4D 56   ....+..rV..`..MV
 450  14 CC 48 56 0F CC 40 56-15 CC 30 56 15 CC 20 56   ..HV..@V..0V.. V
 460  12 C4 1B 56 22 C4 16 9C-CC 0D 56 16 CC 01 56 1B   ...V".....V...V.
1470  8E 8A 02 00 00 74                                 .....t
1470  8E 8A 02 00 00 74                                 .....t 000  80 0B 00 09 71 75 61 64-5F 39 37 2E 63 61 88 07   ....quad_97.ca..
 010  00 00 00 4D 53 20 43 6E-88 09 00 00 9F 4C 4C 49   ...MS Cn.....LLI
 020  42 43 45 25 88 06 00 00-9D 32 6C 4F E8 88 06 00   BCE%.....210....
 030  00 A1 01 43 56 37 96 35-00 00 06 44 47 52 4F 55   ...CV7.5...DGROU
 040  50 0C 51 55 41 44 5F 39-37 5F 54 45 58 54 04 43   P.QUAD_97_TEXT.C
 050  4F 44 45 05 5F 44 41 54-41 04 44 41 54 41 05 43   ODE._DATA.DATA.C
 060  4F 4E 53 54 04 5F 42 53-53 03 42 53 53 37 98 07   ONST._BSS.BSS7..
 070  00 48 B8 23 03 04 01 36-98 07 00 48 9A 0A 05 06   .H.#...6...H....
 080  01 69 98 07 00 48 2E 00-07 07 01 DC 98 07 00 48   .i...H.........H
 090  1E 00 08 09 01 E9 9A 08-00 02 FF 03 FF 04 FF 02   ................
 00A0  56 9C 0D 00 00 03 01 02-02 01 03 04 40 01 45 01   V...........@.E.
```

```
000B0  C0 8C A8 00 09 5F 5F 66-6C 74 75 73 65 64 00 06   ....._ _fltused..
000C0  46 4A 53 52 51 51 00 06-46 49 53 52 51 51 00 06   FJSRQQ..FISRQQ..
000D0  46 49 45 52 51 51 00 06-46 49 44 52 51 51 00 06   FIERQQ..FIDRQQ..
000E0  46 49 57 52 51 51 00 0A-5F 5F 61 63 72 74 75 73   FIWRQQ.._ _acrtus
000F0  65 64 00 13 5F 67 65 74-5F 65 78 70 65 72 69 6D   ed.._get_experim
00100  65 6E 74 5F 6B 65 79 00-11 5F 72 65 61 64 5F 72   ent_key.._read_r
00110  61 6D 5F 64 69 73 6B 5F-66 62 00 09 5F 5F 61 46   am_disk_fb.._ _aF
00120  75 6C 64 69 76 00 12 5F-67 65 74 5F 70 69 78 65   uldiv.._get_pixe
00130  6C 73 5F 70 65 72 5F 6D-6D 00 0C 5F 6D 65 73 73   ls_per_mm.._mess
00140  61 67 65 5F 6F 66 66 00-07 5F 5F 63 74 79 70 65   age_off.._ _ctype
00150  00 08 5F 73 70 72 69 6E-74 66 00 8A B4 09 00 06   .._sprintf......
00160  6D 76 5F 63 69 72 00 BD-8C 16 00 08 5F 6D 65 6E   mv_cir......_men
00170  75 5F 77 6E 00 09 5F 69-6D 5F 70 61 69 6E 74 00   u_wn.._im_paint.
00180  45 B4 1D 00 0D 63 6C 65-61 72 5F 59 4E 5F 66 6C   E....clear_YN_fl
00190  61 67 00 0B 52 45 50 4F-52 54 5F 43 49 52 43 00   ag..REPORT_CIRC.
001A0  B5 8C 4E 01 07 5F 75 6E-6C 69 6E 6B 00 10 5F 63   ..N.._unlink.._c
001B0  6C 65 61 72 5F 6D 65 6E-75 5F 61 72 65 61 00 08   lear_menu_area..
001C0  5F 69 6D 5F 72 6F 77 72-00 17 5F 77 72 69 74 65   _im_rowr.._write
001D0  5F 64 65 6E 73 69 74 79-5F 72 65 63 6F 72 64 39   _density_record9
001E0  37 00 15 5F 63 6C 6F 73-65 5F 73 74 61 6E 64 61   7.._close_standa
001F0  72 64 73 5F 66 69 6C 65-00 08 5F 69 6D 5F 72 6F   rds_file.._im_ro
00200  77 77 00 0A 5F 69 6D 5F-74 6F 64 69 73 6B 00 0E   ww.._im_todisk..
00210  5F 67 65 74 5F 73 74 61-6E 64 61 72 64 73 00 07   _get_standards..
00220  5F 65 72 72 6D 73 67 00-0C 5F 69 6D 5F 64 72 61   _errmsg.._im_dra
00230  77 6D 6F 64 65 00 0F 5F-73 65 74 5F 6D 65 6E 75   wmode.._set_menu
00240  5F 74 69 74 6C 65 00 06-5F 63 6C 6F 73 65 00 08   _title.._close..
00250  5F 71 75 61 64 5F 39 37-00 07 5F 73 74 72 64 73   _quad_97.._strds
00260  70 00 0E 5F 73 65 74 5F-6D 65 6E 75 5F 6C 69 6E   p.._set_menu_lin
00270  65 00 06 5F 64 65 6E 73-6D 00 0B 5F 69 6D 5F 6F   e.._densm.._im_o
00280  75 74 70 61 74 68 00 0C-5F 73 65 74 5F 6D 65 73   utpath.._set_mes
00290  73 61 67 65 00 07 5F 6D-76 5F 62 6F 78 00 0E 5F   sage.._mv_box.._
002A0  69 6D 5F 69 6E 74 65 72-69 6D 61 67 65 00 11 5F   im_interimage.._
002B0  73 65 74 5F 73 63 72 65-65 6E 5F 74 69 74 6C 65   set_screen_title
002C0  00 0A 5F 69 6D 5F 63 69-72 63 6C 65 00 16 5F 67   .._im_circle.._g
002D0  65 74 5F 66 5F 6F 70 74-69 63 61 6C 5F 64 65 6E   et_f_optical_den
002E0  73 69 74 79 00 0A 5F 69-6D 5F 70 69 78 62 6C 74   sity.._im_pixblt
002F0  00 23 B4 19 00 0B 43 4C-45 41 52 5F 46 52 41 4D   .#....CLEAR_FRAM
00300  45 00 09 74 65 78 74 5F-70 72 65 70 00 13 8C 15   E..text_prep....
00310  00 12 5F 77 72 69 74 65-5F 72 61 6D 5F 64 69 73   .._write_ram_dis
00320  6B 5F 66 62 00 F3 B4 0A-00 07 72 6F 77 5F 74 78   k_fb......row_tx
00330  74 00 24 8C 4C 00 05 5F-6F 70 65 6E 00 1C 5F 75   t.$.L.._open.._u
00340  70 64 61 74 65 5F 6D 6F-75 73 65 5F 62 75 74 74   pdate_mouse_butt
00350  6F 6E 5F 64 69 73 70 6C-61 79 00 0C 5F 69 6D 5F   on_display.._im_
00360  73 65 74 63 6F 6C 6F 72-00 07 5F 49 4E 54 44 53   setcolor.._INTDS
00370  50 00 0D 5F 69 6D 5F 73-65 74 62 63 6F 6C 6F 72   P.._im_setbcolor
00380  00 8B B4 0E 00 0B 4C 41-42 45 4C 5F 43 45 4C 4C   ......LABEL_CELL
00390  53 00 01 8C 2B 00 09 5F-69 6D 5F 6F 62 73 75 6D   S...+.._im_obsum
003A0  00 03 5F 6B 69 00 07 5F-76 5F 70 6C 73 74 00 0F   .._ki.._v_plst..
003B0  5F 67 65 74 5F 64 69 73-6B 5F 73 70 61 63 65 00   _get_disk_space.
003C0  2F B4 0B 00 08 6C 61 62-65 6C 5F 72 63 00 05 8C   /....label_rc...
003D0  73 00 07 5F 6B 69 5F 63-68 6B 00 08 5F 69 6D 5F   s.._ki_chk.._im_
003E0  69 6E 69 74 00 17 5F 67-65 74 5F 72 61 6D 64 69   init.._get_ramdi
003F0  73 6B 5F 66 72 65 65 5F-73 70 61 63 65 00 0A 5F   sk_free_space.._
00400  69 6D 5F 6F 70 6D 6F 64-65 00 06 5F 77 72 69 74   im_opmode.._writ
00410  65 00 0D 5F 69 6D 5F 64-69 73 66 6F 72 6D 61 74   e.._im_disformat
00420  00 09 5F 69 6D 5F 76 69-64 65 6F 00 0C 5F 6F 6B   .._im_video.._ok
00430  5F 74 6F 5F 70 72 69 6E-74 00 08 5F 69 6D 5F 73   _to_print.._im_s
00440  79 6E 63 00 3A B4 18 00-07 42 55 49 4C 44 5F 33   ync.:....BUILD_3
00450  00 0C 51 55 41 44 5F 39-37 5F 4C 4F 47 4F 00 95   ..QUAD_97_LOGO..
00460  8C 32 00 07 5F 6D 6F 75-73 65 72 00 12 5F 64 65   .2.._mouser.._de
00470  6C 65 74 65 5F 72 61 6D-64 69 73 6B 5F 66 62 00   lete_ramdisk_fb.
00480  08 5F 69 6D 5F 6D 6F 76-65 00 08 5F 69 6D 5F 72   ._im_move.._im_r
00490  65 63 74 00 4F B4 0E 00-0B 52 45 50 4F 52 54 5F   ect.O....REPORT_
004A0  4D 4F 44 45 00 D3 8C 54-00 07 5F 53 54 52 44 53   MODE...T.._STRDS
004B0  50 00 1C 5F 67 65 74 5F-73 74 61 6E 64 61 72 64   P.._get_standard
004C0  5F 67 72 69 64 5F 73 74-72 75 63 74 75 72 65 00   _grid_structure.
```

```
004D0  1C 5F 70 75 74 5F 66 69-72 73 74 5F 64 65 6E 73   ._put_first_dens
004E0  69 74 79 5F 73 74 72 75-63 74 75 72 65 00 0C 5F   ity_structure.._
004F0  69 6D 5F 66 72 6F 6D 64-69 73 6B 00 11 B4 10 00   im_fromdisk.....
00500  0D 59 4E 72 65 73 70 6F-6E 73 65 6D 73 67 00 D2   .YNresponsemsg..
00510  8C 2B 00 09 5F 63 6C 5F-6F 76 6C 75 74 00 06 5F   .+.._cl_ovlut.._
00520  5F 66 74 6F 6C 00 08 5F-69 6D 5F 77 6C 75 74 00   _ftol.._im_wlut.
00530  0B 5F 69 6D 5F 6F 75 74-6D 6F 64 65 00 FC B4 0A   ._im_outmode....
00540  00 07 4D 56 5F 43 49 52-34 00 27 8C 4A 00 08 5F   ..MV_CIR4.'.J.._
00550  69 6D 5F 6D 61 73 6B 00-09 5F 69 6D 5F 69 6D 61   im_mask.._im_ima
00560  67 65 00 1A 5F 70 75 74-5F 6E 74 68 5F 64 65 6E   ge.._put_nth_den
00570  73 69 74 79 5F 73 74 72-75 63 74 75 72 65 00 09   sity_structure..
00580  5F 69 6D 5F 63 6C 65 61-72 00 0B 5F 6D 65 73 73   _im_clear.._mess
00590  61 67 65 5F 6F 6E 00 E9-B6 2D 00 00 01 06 6D 76   age_on...-....mv
005A0  5F 63 69 72 46 23 00 0D-63 6C 65 61 72 5F 59 4E   _cirF#..clear_YN
005B0  5F 66 6C 61 67 8C 00 00-0B 52 45 50 4F 52 54 5F   _flag....REPORT_
005C0  43 49 52 43 94 1A 00 79-90 2A 00 00 01 17 5F 77   CIRC...y.*...._w
005D0  72 69 74 65 5F 64 65 6E-73 69 74 79 5F 72 65 63   rite_density_rec
005E0  6F 72 64 39 37 9A 00 00-08 5F 71 75 61 64 5F 39   ord97...._quad_9
005F0  37 6E 01 00 0D B6 8B 00-00 01 0B 43 4C 45 41 52   7n.........CLEAR
00600  5F 46 52 41 4D 45 30 1F-00 09 74 65 78 74 5F 70   _FRAME0...text_p
00610  72 65 70 D6 19 00 07 72-6F 77 5F 74 78 74 FC 19   rep....row_txt..
00620  00 0B 4C 41 42 45 4C 5F-43 45 4C 4C 53 8E 1F 00   ..LABEL_CELLS...
00630  08 6C 61 62 65 6C 5F 72-63 02 20 00 07 42 55 49   .label_rc. ..BUI
00640  4C 44 5F 33 6C 1E 00 0C-51 55 41 44 5F 39 37 5F   LD_3l...QUAD_97_
00650  4C 4F 47 4F 06 18 00 0B-52 45 50 4F 52 54 5F 4D   LOGO....REPORT_M
00660  4F 44 45 22 1A 00 0D 59-4E 72 65 73 70 6F 6E 73   ODE"...YNrespons
00670  65 6D 73 67 00 00 00 07-4D 56 5F 43 49 52 34 26   emsg....MV_CIR4&
00680  22 00 2A 88 04 00 00 A2-01 D1 A0 D2 00 02 06 00   ".*.............
00690  4E 6F 20 73 74 61 6E 64-61 72 64 73 20 66 69 6C   No standards fil
006A0  65 20 65 78 69 73 74 73-2C 20 63 61 6E 27 74 20   e exists, can't
006B0  73 61 76 65 20 64 61 74-61 2E 0A 50 72 65 73 73   save data..Press
006C0  20 61 6E 79 20 6B 65 79-20 74 6F 20 63 6F 6E 74    any key to cont
006D0  69 6E 75 65 2E 00 71 75-61 64 5F 39 37 3A 20 43   inue..quad_97: C
006E0  61 6E 27 74 20 77 72 69-74 65 20 63 65 6C 6C 20   an't write cell
006F0  64 65 6E 73 69 74 79 20-64 61 74 61 20 74 6F 20   density data to
00700  73 74 61 6E 64 61 72 64-73 20 66 69 6C 65 2E 20   standards file.
00710  43 61 6C 6C 20 42 56 49-2E 00 71 75 61 64 5F 39   Call BVI..quad_9
00730  65 6C 6C 20 64 65 6E 73-69 74 79 20 64 61 74 61   ell density data
00740  20 74 6F 20 73 74 61 6E-64 61 72 64 73 20 66 69    to standards fi
00750  6C 65 2E 20 43 61 6C 6C-20 42 56 49 2E 00 EB A0   le. Call BVI....
00760  67 02 02 D6 00 42 69 6F-6C 6F 67 69 63 61 6C 20   g....Biological
00770  56 69 73 69 6F 6E 20 2D-20 51 55 41 44 20 2D 20   Vision - QUAD -
00780  50 72 6F 62 65 20 64 69-66 66 65 72 65 6E 63 65   Probe difference
00790  20 61 6E 64 20 25 20 63-68 61 6E 67 65 00 71 75    and % change.qu
007A0  61 64 5F 39 37 3A 20 4E-6F 74 20 65 6E 6F 75 67   ad_97: Not enoug
007B0  68 20 64 69 73 6B 20 73-70 61 63 65 20 74 6F 20   h disk space to
007C0  72 75 6E 2E 00 71 75 61-64 5F 39 37 3A 20 4E 6F   run..quad_97: No
007D0  74 20 65 6E 6F 75 67 68-20 72 61 6D 20 64 69 73   t enough ram dis
007E0  6B 20 73 70 61 63 65 20-74 6F 20 72 75 6E 2E 00   k space to run..
007F0  2D 2D 2D 2D 2D 20 50 52-4F 43 45 53 53 49 4E 47   ----- PROCESSING
00800  20 49 4D 41 47 45 53 20-2D 2D 2D 2D 2D 00 43 61    IMAGES -----.Ca
00810  6E 27 74 20 61 63 63 65-73 73 20 67 72 69 64 20   n't access grid
00820  64 61 74 61 2C 20 75 73-69 6E 67 20 64 65 66 61   data, using defa
00830  75 6C 74 73 00 55 73 69-6E 67 20 64 65 66 61 75   ults.Using defau
00840  6C 74 20 67 72 69 64 20-73 74 72 75 63 74 75 72   lt grid structur
00850  65 20 64 61 74 61 00 5C-62 76 69 5C 6D 69 6E 2E   e data.\bvi\min.
00860  70 69 63 00 5C 62 76 69-5C 68 6F 6C 64 2E 70 69   pic.\bvi\hold.pi
00870  63 00 2D 2D 2D 2D 2D 20-43 41 4C 43 55 4C 41 54   c.----- CALCULAT
00880  49 4E 47 20 4F 50 54 49-43 41 4C 20 44 45 4E 53   ING OPTICAL DENS
00890  49 54 59 20 2D 2D 2D 2D-2D 00 2D 2D 2D 2D 2D 20   ITY -----.-----
008A0  50 52 4F 43 45 53 53 49-4E 47 20 49 4D 41 47 45   PROCESSING IMAGE
008B0  53 20 2D 2D 2D 2D 2D 00-43 68 65 63 6B 20 70 72   S -----.Check pr
008C0  69 6E 74 65 72 20 73 74-61 74 75 73 2C 20 70 72   inter status, pr
008D0  65 73 73 20 49 20 74 6F-20 69 67 6E 6F 72 65 20   ess I to ignore
008E0  69 74 2C 20 43 20 74 6F-20 63 6F 6E 74 69 6E 75   it, C to continu
008F0  65 2E 00 50 52 4E 00 2A-2A 2A 2A 20 43 61 6E 20   e..PRN.**** Can
```

```
.900   6E 6F 74 20 6F 70 65 6E-20 64 65 76 69 63 65 20   not open device
0910   4C 69 6E 65 20 50 72 69-6E 74 65 72 20 2A 2A 2A   Line Printer ***
0920   2A 00 25 63 00 5C 62 76-69 5C 68 6F 6C 64 2E 70   *.%c.\bvi\hold.p
0930   69 63 00 5C 62 76 69 5C-6D 69 6E 2E 70 69 63 00   ic.\bvi\min.pic.
0940   43 68 65 63 6B 20 70 72-69 6E 74 65 72 20 73 74   Check printer st
0950   61 74 75 73 2C 20 70 72-65 73 73 20 49 20 74 6F   atus, press I to
0960   20 69 67 6E 6F 72 65 20-69 74 2C 20 43 20 74 6F    ignore it, C to
0970   20 63 6F 6E 74 69 6E 75-65 2E 00 50 52 4E 00 2A    continue..PRN.*
0980   2A 2A 2A 20 43 61 6E 20-6E 6F 74 20 6F 70 65 6E   *** Can not open
0990   20 64 65 76 69 63 65 20-4C 69 6E 65 20 50 72 69    device Line Pri
09A0   6E 74 65 72 20 2A 2A 2A-2A 00 25 63 00 5C 62 76   nter ****.%c.\bv
09B0   69 5C 6D 69 6E 2E 70 69-63 00 5C 62 76 69 5C 68   i\min.pic.\bvi\h
09C0   6F 6C 64 2E 70 69 63 00-71 A0 B9 03 02 F8 03 4D   old.pic.q......M
09D0   6F 76 65 20 74 68 65 20-6D 6F 75 73 65 20 74 6F   ove the mouse to
09E0   20 70 6F 73 69 74 69 6F-6E 20 74 68 65 20 77 69    position the wi
09F0   6E 64 6F 77 20 69 6E 74-6F 20 74 68 65 20 69 6D   ndow into the im
0A00   61 67 65 73 00 53 75 72-72 6F 75 6E 64 20 61 20   ages.Surround a
0A10   64 6F 74 20 77 69 74 68-20 74 68 65 20 63 75 72   dot with the cur
0A20   73 6F 72 73 20 62 79 20-6D 6F 76 69 6E 67 20 74   sors by moving t
0A30   68 65 20 6D 6F 75 73 65-00 20 20 20 20 20 20 20   he mouse.
0A40   20 20 20 20 4D 4F 55 53-45 20 42 55 54 54 4F 4E       MOUSE BUTTON
0A50   20 41 43 54 49 4F 4E 20-4D 45 4E 55 20 20 20 20    ACTION MENU
0A60   20 20 20 20 20 20 00 CD-CD CD CD CD CD CD CD CD          ..........
0A70   CD CD CD CD CD CD CB CD-CD CD CD CD CD CD CD CD   ................
0A80   CD CD CD CD CD CD CB CD-CD CD CD CD CD CD CD CD   ................
0A90   CD CD CD CD CD 00 20 20-4C 45 46 54 20 42 55 54   ...... LEFT BUT
0AA0   54 4F 4E 20 20 BA 20 4D-49 44 44 4C 45 20 42 55   TON . MIDDLE BU
0AB0   54 54 4F 4E 20 BA 20 52-49 47 48 54 20 42 55 54   TTON . RIGHT BUT
0AC0   54 4F 4E 20 00 20 20 C4-54 6F 67 67 6C 65 20 74   TON . .Toggle t
0AD0   6F C4 20 20 BA 20 C4 C4-C4 48 6F 6C 64 20 74 6F   o. . ...Hold to
0AE0   C4 C4 C4 20 BA 20 C4 C4-50 72 65 73 73 20 74 6F   ... . ..Press to
0AF0   C4 C4 20 00 20 4D 4F 56-45 20 49 6D 61 67 65 73   .. . MOVE Images
0B00   20 2F 20 BA 20 20 43 48-41 4E 47 45 20 53 49 5A    / . CHANGE SIZ
0B10   45 20 20 BA 20 20 43 41-4C 43 55 4C 41 54 45 20   E  .  CALCULATE
0B20   20 20 00 20 4D 4F 56 45-20 43 75 72 73 6F 72 73     . MOVE Cursors
0B30   20 20 BA 20 20 20 6F 66-20 43 69 72 63 6C 65 20     .   of Circle
0B40   20 20 BA 20 4F 44 20 69-6E 20 63 75 72 73 6F 72     . OD in cursor
0B50   20 00 CD CD CD CD CD CD-CD CD CD CD CD CD CD CD    ................
0B60   CD CA CD CD CD CD CD CD-CD D1 CD CD CD CD CD CD   ................
0B70   CD CA CD CD CD CD CD CD-CD CD CD CD CD CD CD CD   ................
0B80   00 20 20 20 20 20 4C 45-46 54 20 26 20 4D 49 44   .     LEFT & MID
0B90   44 4C 45 20 20 20 20 20-B3 20 20 20 20 4D 49 44   DLE     .    MID
0BA0   44 4C 45 20 26 20 52 49-47 48 54 20 20 20 20 00   DLE & RIGHT    .
0BB0   20 C4 C4 53 41 56 45 2F-50 52 49 4E 54 20 56 61    ..SAVE/PRINT Va
0BC0   6C 75 65 73 C4 C4 20 B3-20 20 20 20 C4 C4 C4 4E   lues.. .    ...N
0BD0   6F 74 20 55 73 65 64 C4-C4 C4 20 20 20 20 00 CD   ot Used...    ..
0BE0   CD CD CD CD CD CD CD CD-CD CD CD CD CD CD CD CD   ................
0BF0   CD CD CD CD CD CD CF CD-CD CD CD CD CD CD CD CD   ................
0C00   CD CD CD CD CD CD CD CD-CD CD CD CD 00 20 20 20   ............
0C10   20 20 20 20 20 20 20 20-20 4C 45 46 54 20 20 26              LEFT  &
0C20   20 20 4D 49 44 44 4C 45-20 20 26 20 20 52 49 47     MIDDLE  &  RIG
0C30   48 54 20 20 20 20 20 20-20 20 20 20 20 20 20 20   HT            .
0C40   20 20 20 20 20 20 20 C4-C4 C4 C4 50 72 65 73 73          ....Press
0C50   73 20 41 6C 6C 20 54 68-72 65 65 20 74 6F C4 C4   s All Three to..
0C60   C4 20 20 20 20 20 20 20-20 20 00 20 20 20 20 20   .             .
0C70   45 58 49 54 20 50 72 6F-62 65 20 44 69 66 66 65   EXIT Probe Diffe
0C80   72 65 6E 63 65 20 26 20-50 65 72 63 65 6E 74 20   rence & Percent
0C90   43 68 61 6E 67 65 20 20-20 20 00 CD CD CD CD CD   Change    ......
0CA0   CD CD CD CD CD CD CD CD-CD CD CD CD CD CD CD CD   ................
0CB0   CD CD CD CD CD CD CD CD-CD CD CD CD CD CD CD CD   ................
0CC0   CD CD CD CD CD CD CD CD-CD 00 20 20 31 2E 20 4D   .......... 1. M
0CD0   6F 76 65 20 72 65 63 74-61 6E 67 6C 65 20 74 6F   ove rectangle to
0CE0   20 73 65 6C 65 63 74 20-61 6E 61 6C 79 73 69 73    select analysis
0CF0   20 72 65 67 69 6F 6E 2E-00 20 20 32 2E 20 4C 65    region.. 2. Le
0D00   66 74 20 42 75 74 74 6F-6E 20 74 6F 20 73 77 69   ft Button to swi
0D10   74 63 68 20 74 6F 20 61-6E 61 6C 79 73 69 73 20   tch to analysis
0D20   6D 6F 64 65 2E 20 20 00-20 20 33 2E 20 53 69 7A   mode. . 3. Siz
```

```
000D30  65 20 61 6E 64 20 6D 6F-76 65 20 63 75 72 73 6F   e and move curso
000D40  72 20 61 6E 64 20 63 61-6C 63 75 6C 61 74 65 20   r and calculate
000D50  4F 44 2E 20 20 20 20 00-CD CD CD CD CD CD CD CD   OD. ............
000D60  CD CD CD CD CD CD CD CD-CD CD CD CD CD CD CD CD   ................
000D70  CD CD CD CD CD CD CD CD-CD CD CD CD CD CD CD CD   ................
000D80  CD CD CD CD 3C A0 21 00-02 AD 07 CD 00 31 00 32   ....<.!......1.2
000D90  00 33 00 34 00 35 00 36-00 37 00 38 00 39 00 31   .3.4.5.6.7.8.9.1
000DA0  30 00 31 31 00 31 32 00-B9 A0 14 00 02 FA 07 41   0.11.12........A
000DB0  00 42 00 43 00 44 00 45-00 46 00 47 00 48 00 25   .B.C.D.E.F.G.H.%
000DC0  A0 2E 02 02 2A 08 4D 6F-76 65 20 43 69 72 63 6C   ....*.Move Circl
000DD0  65 73 20 2F 20 52 61 64-69 75 73 20 3D 20 25 32   es / Radius = %2
000DE0  64 00 53 69 7A 65 20 43-69 72 63 6C 65 73 20 2F   d.Size Circles /
000DF0  20 52 61 64 69 75 73 20-3D 20 25 32 64 00 4D 6F    Radius = %2d.Mo
00E00   76 65 20 49 6D 61 67 65-73 00 29 00 20 C9 CD CD   ve Images.). ...
000E10  CD CD CD CD CD CD CD CD-CD CD D1 CD CD CD CD CD   ................
000E20  CD CD CD CD CD CD CD CD-CD D1 CD CD CD CD CD CD   ................
000E30  CD CD CD CD CD CD CD BB-00 20 BA 20 20 20 20 20   ......... .
000E40  25 36 64 20 20 B3 20 20-20 20 25 36 64 20 20 20   %6d  .    %6d
000E50  B3 20 43 65 6C 6C 20 20-3D 20 25 73 25 32 73 20   . Cell  = %s%2s
 E60    BA 00 20 C7 C4 C4 C4 C4-C4 C4 C4 C4 C4 C4 C4 C4   .. .............
 E70    C4 C5 C4 C4 C4 C4 C4 C4-C4 C4 C4 C4 C4 C4 C4 B3   ................
 E80    20 52 61 64 69 75 73 3D-20 25 33 64 20 BA 00 20    Radius= %3d ..
 E90    BA 20 20 25 36 64 20 20-20 20 20 B3 20 20 25 36   .  %6d     .  %6
 EA0    64 25 25 20 20 20 20 20-B3 20 58 20 20 20 20 3D   d%%     . X    =
 EB0    20 25 33 64 20 BA 00 20-BA 20 20 20 20 28 25 36    %3d .. .    (%6
 EC0    64 29 20 B3 20 20 20 28-25 36 64 29 20 20 B3 20   d) .   (%6d)  .
 ED0    59 20 20 20 20 20 3D 20-25 33 64 20 BA 00 20 C8   Y     = %3d .. .
 EE0    CD CD CD CD CD CD CD CD-CD CD CD CD CF CD CD CD   ................
 EF0    CD CD CD CD CD CD CD CD-CD CD CF CD CD CD CD CD   ................
00F00   CD CD CD CD CD CD CD CD-BC 00 43 68 65 63 6B 20   ..........Check
00F10   20 70 72 69 6E 74 65 72-20 73 74 61 74 75 73 2C    printer status,
00F20   20 70 72 65 73 73 20 49-20 74 6F 20 69 67 6E 6F    press I to igno
00F30   72 65 20 69 74 2C 20 43-20 74 6F 20 63 6F 6E 74   re it, C to cont
00F40   69 6E 75 65 2E 00 50 52-4E 00 2A 2A 2A 2A 20 43   inue..PRN.**** C
00F50   61 6E 20 6E 6F 74 20 6F-70 65 6E 20 64 65 76 69   an not open devi
00F60   63 65 20 4C 69 6E 65 20-50 72 69 6E 74 65 72 20   ce Line Printer
00F70   2A 2A 2A 2A 00 20 20 20-20 50 4F 53 49 54 49 4F   ****.    POSITIO
00F80   4E 00 20 20 20 20 20 43-4F 4E 54 52 4F 4C 00 20   N.     CONTROL.
00F90   20 20 20 20 20 20 45 58-50 45 52 49 4D 45 4E 54         EXPERIMENT
00FA0   00 20 20 20 20 20 20 44-49 46 46 45 52 45 4E 43   .      DIFFERENC
00FB0   45 00 20 20 20 20 20 25-25 43 48 41 4E 47 45 0A   E.     %%CHANGE.
00FC0   25 32 64 25 73 20 20 20-25 73 2C 25 73 25 31 31   %2d%s   %s,%s%11
00FD0   64 25 31 36 64 25 31 36-64 25 31 33 64 00 25 73   d%16d%16d%13d.%s
00FE0   20 25 73 25 34 64 25 34-64 25 35 64 25 35 64 00    %s%4d%4d%5d%5d.
00FF0   4B A0 2B 00 02 70 0A 43-4F 4E 54 52 4F 4C 00 45   K.+..p.CONTROL.E
01000   58 50 45 52 49 4D 45 4E-54 00 44 49 46 46 45 52   XPERIMENT.DIFFER
01010   45 4E 43 45 00 25 20 43-48 41 4E 47 45 00 E1 A0   ENCE.% CHANGE...
01020   0A 00 02 00 00 00 00 00-00 01 00 53 A0 06 00 02   ...........S....
01030   D4 00 FF FF 86 A0 C2 00-02 3A 03 43 6F 70 79 72   .........:.Copyr
01040   69 67 68 74 20 28 63 29-20 31 39 38 39 2C 20 42   ight (c) 1989, B
01050   69 6F 6C 6F 67 69 63 61-6C 20 56 69 73 69 6F 6E   iological Vision
01060   20 49 6E 63 2E 20 20 41-6C 6C 20 72 69 67 68 74    Inc.  All right
01070   73 20 72 65 73 65 72 76-65 64 00 00 00 00 00 00   s reserved......
01080   00 0C 00 00 00 15 00 00-00 25 00 00 00 3F 00 00   .........%...?..
01090   00 61 00 00 00 81 00 00-00 B1 00 00 00 DD 00 00   .a..............
010A0   00 15 01 00 00 5D 01 00-00 9F 01 00 00 E9 01 00   .....]..........
010B0   00 39 02 00 00 91 02 00-00 ED 02 00 00 4D 03 00   .9...........M..
010C0   00 BD 03 00 00 31 04 00-00 A9 04 00 00 21 05 00   .....1.......!..
010D0   00 A1 05 00 00 2D 06 00-00 C5 06 00 00 55 07 00   .....-.......U..
010E0   00 E9 07 00 00 A1 08 00-00 41 09 00 00 F9 09 00   .........A......
010F0   00 A5 0A 00 00 5D 0B 00-00 48 A0 34 00 02 CA 07   .....]...H.4....
01100   AF 07 00 00 B1 07 00 00-B3 07 00 00 B5 07 00 00   ................
01110   B7 07 00 00 B9 07 00 00-BB 07 00 00 BD 07 00 00   ................
01120   BF 07 00 00 C1 07 00 00-C4 07 00 00 C7 07 00 00   ................
01130   4A 9C 25 00 CC 2C 9D CC-28 9D CC 24 9D CC 20 9D   J.%..,..(..$.. .
```

```
.140   CC 1C 9D CC 18 9D CC 14-9D CC 10 9D CC 0C 9D CC    ................
.150   08 9D CC 04 9D CC 00 9D-4B A0 24 00 02 0A 08 FA    ........K.$.....
.160   07 00 00 FC 07 00 00 FE-07 00 00 00 08 00 00 02    ................
.170   08 00 00 04 08 00 00 06-08 00 00 08 08 00 00 E3    ................
.180   9C 19 00 CC 1C 9D CC 18-9D CC 14 9D CC 10 9D CC    ................
.190   0C 9D CC 08 9D CC 04 9D-CC 00 9D 93 A0 20 00 02    ................
11A0   54 0A 00 00 00 01 00 00-00 01 00 00 00 00 F0 00    T...............
011B0  F0 00 00 00 00 00 00 00-03 00 01 00 01 00 F9 A0    ................
011C0  06 00 02 98 0A 01 00 B5-A0 9E 00 01 00 00 C8 08    ................
011D0  00 00 57 56 1E B8 00 00-8E D8 EB 05 9A 00 00 00    ..WV............
011E0  00 9A 00 00 00 00 0B C0-75 F2 FF 76 08 FF 76 06    ........u..v..v.
011F0  9A 00 00 00 00 83 C4 04-2B F6 2B FF 8A 46 0C 98    ........+.+..F..
01200  89 46 FA 8A 46 0A 98 89-46 F8 9A 00 00 00 00 8B    .F..F...F.......
01210  F0 F6 84 01 00 02 74 06-8D 44 E0 EB 03 90 8B C6    ......t..D......
01220  8B F0 3B 76 F8 74 05 3B-76 FA 75 03 BF 01 00 0B    ..;v.t.;v.u.....
01230  FF 74 D7 89 7E FC 89 76-FE 9A 00 00 00 00 8A 46    .t..~..v.......F
01240  0A 98 3B C6 75 0A C6 06-04 00 01 1F 5E 5F C9 CB    ..;.u.......^_..
01250  C6 06 04 00 00 1F 5E 5F-C9 CB 1E B8 00 00 8E D8    ......^_........
01260  C6 06 04 00 01 1F CB 90-1F 9C 28 00 C4 94 9D C8    ..........(.....
01270  8E 9D C4 84 9D C4 7A 9D-CC 6C 56 0C C4 45 56 0D    ......z..lV..EV.
01280  CC 3D 56 37 CC 23 56 59-CC 14 56 3B CC 0F 56 37    .=V7.#VY..V;..V7
01290  C8 08 9D 14 A0 06 00 03-00 00 00 00 57 9C 05 00    ............W...
012A0  C8 00 56 23 1E A0 D8 00-01 9A 00 C8 00 00 00 1E    ..V#............
012B0  B8 00 00 8E D8 A1 00 00-0B 06 02 00 75 27 80 3E    ............u'.>
012C0  05 00 00 75 1A FE 06 05-00 1E 68 06 00 9A 00 00    ...u......h.....
012D0  00 00 83 C4 04 9A 00 00-00 00 9A 00 00 00 00 2B    ...............+
012E0  C0 1F C9 CB 90 8E 06 00-00 8B 46 06 26 A3 00 00    ..........F.&...
012F0  8B 46 08 26 A3 02 00 8B-46 0A 8B 56 0C 26 A3 04    .F.&....F..V.&..
01300  00 26 89 16 06 00 8B 46-0E 8B 56 10 26 A3 08 00    .&.....F..V.&...
01310  26 89 16 0A 00 83 3E D4-00 00 7D 33 FF 36 02 00    &.....>...}3.6..
01320  FF 36 00 00 B8 00 00 BA-00 00 52 50 9A 00 00 00    .6........RP....
01330  00 83 C4 08 0B C0 75 0F-1E 68 4C 00 9A 00 00 00    ......u..hL.....
01340  00 83 C4 04 EB 99 90 C7-06 D4 00 01 00 EB 2A FF    ..............*.
01350  36 D4 00 FF 06 D4 00 FF-36 02 00 FF 36 00 00 B8    6.......6...6...
01360  00 00 BA 00 00 52 50 9A-00 00 00 00 83 C4 0A 0B    .....RP.........
01370  C0 75 06 1E 68 90 00 EB-C3 B8 01 00 1F C9 CB 81    .u..h...........
01380  9C 74 00 C4 CA 9D CC BD-56 57 C8 B8 56 23 C4 B5    .t......VW..V#..
01390  56 23 C4 B2 9D C4 AE 9D-C4 AA 9D C4 A6 9D C4 9E    V#..............
013A0  9D CC 92 56 1C C4 8F 9D-CC 82 56 4D C8 7D 56 23    ...V......VM.}V#
013B0  C4 7A 56 23 C4 77 9D C4-73 9D C4 6C 9D C4 68 56    .zV#.w..s..l..hV
013C0  23 C4 63 56 23 C4 59 56-23 C4 54 56 23 C4 4A 56    #.cV#.YV#.TV#.JV
013D0  23 C4 43 56 23 C4 3C 9C-CC 30 56 0C CC 2B 56 37    #.CV#.<..0V..+V7
013E0  CC 23 56 59 C4 20 9D C4-1C 9D C4 15 9D C4 0F 9D    .#VY. ..........
013F0  C4 0B 9D C8 06 9D 88 A0-30 00 03 02 00 00 00 40    ........0......@
01400  40 00 00 00 00 00 00 00-00 00 00 00 00 00 E0 6F    @..............o
01410  40 00 00 00 00 00 00 00-40 00 00 00 00 00 00 F0    @.......@.......
1420   3F 00 00 00 00 00 00 E0-3F 8E A0 B7 03 01 6E 01    ?.......?.....n.
1430   C8 8C 0D 00 57 56 1E B8-00 00 8E D8 C7 86 BA F6    ....WV..........
1440   00 00 00 C7 86 4C F7 00-00-C7 86 EA F6 80 00 C7 86    .....L..........
1450   DC F6 78 00 C7 86 BC F6-02 00 C7 86 C0 F6 00 00    ..x.............
1460   C7 86 D6 F6 00 00 C7 46-A4 01 00 C7 86 C2 F6 00    .......F........
1470   00 C7 86 A0 F2 01 00 C7-86 EC F6 FF 00 C7 86 A2    ................
1480   F2 00 00 C7 86 E0 F6 7E-00 C7 86 D8 F6 76 00 C7    .......~.....v..
01490  86 DA F6 80 00 C7 86 CC-F6 78 00 C7 86 54 F7 0A    .........x...T..
014A0  00 C7 46 C2 00 00 C7 86-EE F6 00 00 C7 46 AC 14    ..F..........F..
014B0  00 68 00 03 68 00 D0 9A-00 00 00 00 83 C4 04 6A    .h..h..........j
014C0  00 6A 02 9A 00 00 00 00-83 C4 04 6A 01 6A 01 6A    .j.........j.j.j
014D0  00 9A 00 00 00 00 83 C4-06 6A 01 6A 01 9A 00 00    .........j.j....
014E0  00 00 83 C4 04 6A 00 6A-01 9A 00 00 00 00 83 C4    .....j.j........
014F0  04 C7 06 D4 00 FF FF 0E-E8 00 00 C7 86 C4 F6 00    ................
01500  00 C7 86 C6 F6 01 01 C7-86 C8 F6 00 00 C7 86 CA    ................
01510  F6 01 01 C7 86 B0 F6 F1-00 C7 86 B2 F6 F1 00 C7    ................
01520  86 B4 F6 00 00 C7 86 B6-F6 00 00 C7 46 BA 00 00    ............F...
01530  C7 46 BC 01 00 C7 46 BE-02 00 C7 46 C0 03 00 1E    .F....F....F....
01540  68 D6 00 9A 00 00 00 00-83 C4 04 6A 00 0E E8 00    h..........j....
01550  00 83 C4 02 9A 00 00 00-00 0B D2 7F 1B 7C 05 3D    .............|.=
```

```
001560  00 04 73 14 1E 68 0F 01-9A 00 00 00 00 83 C4 04   ..s..h..........
001570  2B C0 1F 5E 5F C9 CB 90-9A 00 00 00 00 9A 00 00   +..^_...........
001580  00 00 0B D2 7F 0E 7C 05-3D 22 01 73 07 1E 68 36   ......|.=".s..h6
001590  01 EB D5 90 FF B6 54 F7-FF B6 C2 F6 FF 76 A4 0E   ......T......v..
0015A0  E8 00 00 83 C4 06 1E 68-61 01 6A 00 9A 00 00 00   .......ha.j.....
0015B0  00 83 C4 06 C7 86 A6 F4-01 00 8B 8E A6 F4 8B F1   ................
0015C0  8B C1 88 82 A7 F4 C6 82-A8 F4 FF 88 82 A3 F2 C6   ................
0015D0  82 A4 F2 00 83 C1 02 81-F9 FF 00 7E E1 89 8E A6   ...........~....
0015E0  F4 6A 00 9A 00 00 00 00-83 C4 02 8D 86 A4 F2 16   .j..............
0015F0  50 8D 86 A4 F2 16 50 8D-86 A8 F4 16 50 68 00 01   P.....P.....Ph..
001600  6A 00 6A 00 6A 01 9A 00-00 00 00 83 C4 14 6A 00   j.j.j.........j.
001610  6A 02 9A 00 00 00 00 83-C4 04 6A 00 9A 00 00 00   j.........j.....
001620  00 83 C4 02 FF B6 EC F6-9A 00 00 00 00 83 C4 02   ................
001630  6A 01 68 FE 00 6A 06 FF-76 BC FF 76 BC 9A 00 00   j.h..j..v..v....
001640  00 00 83 C4 0A 6A 01 68-FE 00 6A 06 FF 76 BE FF   .....j.h..j..v..
001650  76 BE 9A 00 00 00 00 83-C4 0A 6A 01 68 FE 00 6A   v.........j.h..j
001660  06 FF 76 C0 FF 76 C0 9A-00 00 00 00 83 C4 0A 6A   ..v..v.........j
001670  00 FF 76 BA 9A 00 00 00-00 83 C4 04 9A 00 00 00   ..v.............
001680  00 A3 00 00 89 16 02 00-0B D2 7F 0E 7C 04 0B C0   ............|...
001690  75 08 2B C0 A3 02 00 A3-00 00 FF 36 02 00 FF 36   u.+........6...6
0016A0  00 00 9A 00 00 00 00 83-C4 04 A3 00 00 89 16 02   ................
0016B0  00 1E 68 0E 00 1E 68 0E-00 1E 68 0E 00 1E 68 0E   ..h...h...h...h.
0016C0  00 1E 68 0E 00 1E 68 0E-00 1E 68 0C 00 1E 68 0A   ..h...h...h...h.
0016D0  00 1E 68 08 00 1E 68 06-00 9A 00 00 00 00 83 C4   ..h...h.........
0016E0  28 0B C0 75 24 1E 68 7F-01 9A 00 00 00 00 83 C4   (..u$.h.........
0016F0  04 C7 06 06 00 00 00 C7-06 08 00 00 00 C7 06 0A   ................
 700    00 2B 00 C7 06 0C 00 3C-00 83 3E 06 00 00 75 3B   .+.....<..>...u;
 710    83 3E 08 00 00 75 34 83-3E 0A 00 00 75 2D 83 3E   .>...u4.>...u-.>
 720    0C 00 00 75 26 1E 68 A6-01 6A 00 9A 00 00 00 00   ...u&.h..j......
 730    83 C4 06 C7 06 06 00 00-00 C7 06 08 00 00 00 C7   ................
 740    06 0A 00 2B 00 C7 06 0C-00 3C 00 8D 86 F0 F6 16   ...+.....<......
 750    50 8D 86 56 F7 16 50 9A-00 00 00 00 83 C4 08 0B   P..V..P.........
 760    D0 75 14 9B D9 EE 9B D9-9E 56 F7 9B D9 06 02 00   .u.......V......
 1770   9B D9 9E F0 F6 90 9B 8D-46 B2 16 50 8D 46 C4 16   ........F..P.F..
 1780   50 9A 00 00 00 00 83 C4-08 9B D9 86 F0 F6 9B DC   P...............
 1790   16 06 00 9B DD D8 9B DF-E0 9E 75 0A 9B D9 06 02   ..........u.....
 17A0   00 9B D9 9E F0 F6 9B D9-86 F0 F6 9B DC 16 06 00   ................
 17B0   9B DD D8 9B DF E0 9E 72-13 9B D9 86 F0 F6 9B D8   .......r........
 17C0   96 56 F7 9B DD D8 9B DF-E0 9E 73 0A 9B D9 06 02   .V........s.....
 17D0   00 9B D9 9E F0 F6 9B D9-46 C4 9B D8 4E B2 9B D9   ........F...N...
 17E0   9E A8 F6 10 9C 5A 01 C7-AE 56 05 C7 AA 56 05 C7   .....Z...V...V..
 17F0   A6 56 05 C7 A1 56 05 C7-9F 9C C7 9C 56 05 C7 96   .V...V......V...
 1800   56 05 C7 93 56 05 C7 8E-56 05 C7 89 56 05 C7 83   V...V...V...V...
 1810   56 05 C7 80 56 05 C7 7E-9C C7 7B 56 05 C7 76 56   V...V..~..{V..vV
 1820   05 C7 71 56 05 C7 6F 9C-C7 6C 56 05 C7 66 56 05   ..qV..o..lV..fV.
 1830   C7 63 56 05 C7 61 9C C7-5E 56 05 C7 59 56 05 CF   .cV..a..^V..YV..
 1840   52 56 0B C7 45 56 06 C7-40 56 05 C7 3E 9C C7 3B   RV..EV..@V..>..;
 1850   56 05 C7 36 56 05 C7 33-56 05 CF 28 56 2A C7 17   V..6V..3V..(V*..
 1860   9F C7 11 9F C7 0B 9F C7-05 9F CE FC 56 25 C6 F7   ............V%..
 1870   9D C6 F0 9F C6 E9 9F C6-E2 9F C6 DB 9F C6 D5 9F   ................
 1880   C6 CF 9F C6 C9 9F C6 C3-9F CE BA 56 1C C6 B7 9D   ...........V....
 1890   CE AA 56 4C C6 A7 9F C6-A3 9F C6 9F 9F C6 9B 9F   ..VL............
 18A0   C6 97 9F C6 93 9F C6 8F-9F C6 8B 9F C6 87 9F C6   ................
 18B0   83 9F C6 7F 9D C6 7B 9D-CE 73 56 1B C6 70 9F C6   ......(...sV..p..
 18C0   6C 9F C6 68 9F C6 65 9F-C6 56 9F C6 52 9F CE 4D   l..h..e..V..R..M
 18D0   56 08 CE 45 56 58 CE 38-56 56 CE 23 56 56 CE 0E   V..EVX.8VV.#VV..
 18E0   56 56 CD F9 56 55 CD ED-56 53 CD E3 56 3E CD D7   VV..VU..VS..V>..
 18F0   56 52 CD B4 56 50 CD 7D-56 25 C5 78 9D 85 71 56   VR..VP.}V%.x..qV
 01900  4A C5 5F 9D CD 4E 56 3D-CD 49 56 47 CD 39 56 1C   J._..NV=.IVG.9V.
 01910  C5 36 9D CD 25 56 39 85-1F 56 45 CD 14 56 28 C5   .6..%V9..VE..V(.
 01920  11 9D 84 C6 12 C4 C3 9D-CC BA 56 43 CC AE 56     ....V...VC..V
 01930  41 CC A2 56 40 CC 94 56-3E CC 88 56 3C C8 08 9D   A..V@..V>..V<...
 01940  77 A0 B8 03 01 21 05 9B-D9 86 F0 F6 9B DC 36 0E   w....!........6.
 01950  00 9B D8 B6 A8 F6 9B D9-5E A8 90 9B C7 86 A6 F4   ........^.......
 01960  00 00 2B C0 B9 00 00 01-8D BE A4 F2 16 07 F2 AB   ..+.............
 01970  86 A7 F4 02 BF EF 00 C7-86 98 F2 DE 01 FF 76 C0   ..............v.
 01980  6A 00 9A 00 00 00 00 83-C4 04 8D 86 A8 F4 16 50   j..............P
```

```
01990  68 00 02 FF B6 98 F2 6A-00 9A 00 00 00 00 83 C4   h......j........
019A0  0A C7 46 EE 00 00 8D 86-A8 F4 89 86 9A F2 8C 96   ..F.............
019B0  9C F2 2B C9 8C 9E 9E F2-C5 B6 9A F2 8B D9 03 DD   ..+.............
019C0  8A 04 36 88 87 A4 F2 83-C6 02 41 81 F9 FE 00 7E   ..6.......A....~
019D0  EB 8E 9E 9E F2 89 4E EE-FF 76 BA 6A 00 9A 00 00   ......N..v.j....
 9E0   00 00 83 C4 04 8D 86 A4-F2 16 50 68 00 02 8D 85   ..........Ph....
 9F0   F0 00 50 6A 00 9A 00 00-00 00 83 C4 0A 83 AE 98   ..Pj............
 A00   F2 02 4F 83 FF 01 7C 03-E9 72 FF 89 BE A6 F4 1E   ..O...|..r......
 A10   68 C8 01 9A 00 00 00 00-83 C4 04 FF 76 BC 6A 00   h...........v.j.
 A20   9A 00 00 00 00 83 C4 04-1E 68 D5 01 9A 00 00 00   .........h......
 A30   00 83 C4 04 A1 06 00 99-2B C2 D1 F8 89 86 B8 F6   ........+.......
 A40   A1 08 00 99 2B C2 D1 F8-05 F1 00 89 86 AC F6 A1   ....+...........
01A50  0A 00 99 B9 04 00 F7 F9-03 86 B8 F6 89 46 D0 6A   .............F.j
01A60  00 6A 01 9A 00 00 00 00-83 C4 04 6A 00 9A 00 00   .j.........j....
01A70  00 00 83 C4 02 6A 00 6A-00 9A 00 00 00 00 83 C4   .....j.j........
01A80  04 FF B6 A0 F2 9A 00 00-00 00 83 C4 02 2B F6 A1   .............+..
01A90  0A 00 99 2B C2 D1 F8 F7-EE 03 46 D0 89 46 A0 56   ...+......F..F.V
01AA0  0E E8 00 00 83 C4 02 8B-D8 8E C2 57 8B FB B9 FF   ...........W....
01AB0  FF 33 C0 F2 AE F7 D1 49-5F 8B F9 56 0E E8 00 00   .3.....I_..V....
01AC0  83 C4 02 52 50 57 57 6A-01 68 FA 00 FF 76 A0 6A   ...RPWWj.h...v.j
01AD0  01 6A 00 9A 00 00 00 00-83 C4 12 46 83 FE 0B 7E   .j.........F...~
01AE0  AE 89 BE 5A F7 89 B6 A6-F4 A1 0C 00 99 B9 04 00   ...Z............
01AF0  F7 F9 8B C8 A1 08 00 99-2B C2 D1 F8 03 C1 05 F7   ........+.......
01B00  00 89 46 C8 2B F6 A1 0C-00 99 2B C2 D1 F8 F7 EE   ..F.+.....+.....
01B10  03 46 C8 89 86 5C F7 56-0E E8 00 00 83 C4 02 8B   .F...\.V........
01B20  D8 8E C2 57 8B FB B9 FF-FF 33 C0 F2 AE F7 D1 49   ...W.....3.....I
01B30  5F 8B F9 56 0E E8 00 00-83 C4 02 52 50 57 57 6A   _..V.......RPWWj
01B40  02 FF B6 5C F7 6A 08 6A-01 6A 00 9A 00 00 00 00   ...\.j.j.j......
01B50  83 C4 12 46 83 FE 07 7E-AD 89 BE 5A F7 89 B6 A6   ...F...~...Z....
01B60  F4 6A 00 6A 02 9A 00 00-00 00 83 C4 04 6A 00 FF   .j.j.........j..
01B70  76 BA 6A FF FF 76 BA 9A-00 00 00 00 83 C4 08 6A   v.j..v.........j
01B80  00 6A 02 9A 00 00 00 00-83 C4 04 8B 86 EA F6 05   .j..............
01B90  FE 00 89 86 DE F6 8B 86-DC F6 05 EE 00 89 86 D2   ................
01BA0  F6 8B 86 EA F6 99 2B C2-D1 F8 40 89 86 D4 F6 8B   ......+...@.....
01BB0  86 DC F6 99 2B C2 D1 F8-05 F1 00 89 86 BE F6 FF   ....+...........
01BC0  B6 A0 F2 9A 00 00 00 00-83 C4 02 8B B6 D4 F6 03   ................
01BD0  B6 E0 F6 8B BE BE F6 03-BE D8 F6 57 56 FF B6 BE   ...........WV...
01BE0  F6 FF B6 D4 F6 FF 76 BA-6A 00 9A 00 00 00 00 83   ......v.j.......
01BF0  C4 0C 9B DF 06 0A 00 9B-D9 C0 9B DB BE 8E F2 90   ................
01C00  9B 8B 86 D4 F6 2B 86 B8-F6 89 86 98 F2 9B DF 86   .....+..........
01C10  98 F2 9B DC 0E 16 00 9B-D8 F1 9B D9 9E 4E F7 90   .............N..
01C20  9B 8B C6 2B 86 B8 F6 89-86 98 F2 9B DF 86 98 F2   ...+............
01C30  9B DC 0E 16 00 9B D8 F1-9B D9 9E F4 F6 9B DF 06   ................
01C40  0C 00 9B D9 C0 9B DB BE-84 F2 90 9B 8B 86 BE F6   ................
01C50  2B 86 AC F6 89 86 98 F2-9B DF 86 98 F2 9B DC 0E   +...............
01C60  16 00 9B D8 F1 9B D9 9E-F8 F6 90 9B 8B C7 2B 86   ..............+.
01C70  AC F6 89 86 98 F2 9B DF-86 98 F2 9B DC 0E 16 00   ................
01C80  9B D8 F1 9B D9 9E E2 F6-9B D9 86 4E F7 9A 00 00   ...........N....
01C90  00 00 89 46 D2 9B D9 86-F4 F6 9A 00 00 00 00 89   ...F............
01CA0  46 CA 9B D9 86 F8 F6 9A-00 00 00 00 89 46 CC 9B   F............F..
01CB0  D9 86 E2 F6 9A 00 00 00-00 89 46 B6 9B DF 46 D2   ..........F...F.
 1CC0  9B D8 A6 4E F7 9B DC 06-1E 00 9B D9 96 E6 F6 9B   ...N............
 1CD0  DC 16 06 00 9B DD D8 9B-DF E0 9E 9B DD C1 9B DD   ................
 1CE0  C0 74 13 9B D9 86 E6 F6-9B DC 16 1E 00 9B DD D8   .t..............
 1CF0  9B DF E0 9E 75 14 9B DF-06 0A 00 C5 9C 69 01 C7   ....u........i..
 1D00  B2 9F C7 AF 56 05 C7 A9-56 05 C7 A6 56 05 C7 A4   ....V...V...V...
 1D10  9C C7 A1 56 05 C7 9C 56-05 C7 97 56 05 C7 94 56   ...V...V...V...V
 1D20  05 C7 90 56 05 C7 8D 56-05 C7 8B 9C C7 88 56 05   ...V...V......V.
001D30  C7 83 56 05 C7 81 9C C7-7E 56 05 C7 79 56 05 C7   ..V.....~V..yV..
001D40  75 56 05 CF 6E 56 51 C7-68 56 05 CF 61 56 51 C7   uV..nVQ.hV..aVQ.
001D50  5B 56 05 CF 54 56 51 C7-4E 56 05 CF 47 56 51 C7   [V..TVQ.NV..GVQ.
001D60  41 56 05 C7 3C 56 05 C7-39 56 05 C7 37 9C C7 34   AV..<V..9V..7..4
001D70  56 05 C7 2F 56 05 C7 23-56 06 C7 1E 56 05 C7 1B   V../V..#V...V...
001D80  56 05 C7 19 9C C7 16 56-05 C7 11 56 05 C7 03 56   V......V...V...V
001D90  06 C6 FE 56 05 C6 FB 56-05 C6 F9 9F C6 F6 56 05   ...V...V......V.
001DA0  C6 F1 56 05 C6 EE 56 05-C6 EC 9C C6 E9 56 05 C6   ..V...V......V..
001DB0  E4 56 05 C6 D8 56 06 C6-D3 56 05 C6 D0 56 05 C6   .V...V...V...V..
```

```
)01DC0   CE 9C C6 CB 56 05 C6 C6-56 05 C6 B8 56 06 C6 B3    ....V...V...V...
)01DD0   56 05 C6 B0 56 05 C6 AE-9F C6 AB 56 05 CE A4 56    V...V......V...V
)01DE0   26 CE 7D 56 55 CE 3D 56-3E CE 31 56 24 CE 1F 56    &.)VU.=V>.1V$..V
)01DF0   3E CE 05 56 21 85 EF 56-2F 85 D3 56 2F C5 C0 9F    >..V!..V/..V/...
)01E00   C5 AE 9F C5 A3 9F CD 8D-56 21 85 77 56 2D 85 5B    ........V!.wV-.[
)01E10   56 2D C5 49 9F CD 3F 56-55 CD 33 56 3E CD 27 56    V-.I..?VU.3V>.'V
)01E20   1D CD 1D 56 3E C5 09 9F-C4 FA 9F C4 EE 9F CC E6    ...V>...V.......
)01E30   56 1A C4 E3 9D CC DA 56-3E CC CD 56 1A C4 CA 9D    V......V>..V....
)01E40   CC AF 56 19 CC 97 56 3E-CC 53 56 16 CC 3C 56 3E    ..V...V>.SV..<V>
)01E50   C4 13 56 06 C4 0F 56 05-C4 0A 56 05 C4 08 9C C4    ..V...V...V.....
)01E60   05 56 05 C4 00 56 05 49-A0 17 03 01 D5 08 9B DC    .V...V.I........
)01E70   36 16 00 9A 00 00 00 00-89 46 B8 EB 48 9B D9 86    6........F..H...
)01E80   E6 F6 9B DC 16 26 00 9B-DD D8 9B DF E0 9E 76 13    .....&........v.
)01E90   9B D9 86 E6 F6 9B DC 16-26 00 9B DD D8 9B DF E0    ........&.......
)01EA0   9E 76 22 9B D9 86 E6 F6-9B DE 0E 0A 00 9B DF 06    .v".............
)01EB0   0A 00 9B DC 36 16 00 9B-DE C1 9A 00 00 00 00 89    ....6...........
)01EC0   46 B8 FF 46 D2 9B DF 46-CA 9B D8 A6 F4 F6 9B DC    F..F...F........
)01ED0   06 1E 00 9B D9 96 E6 F6-9B DC 16 06 00 9B DD D8    ................
)01EE0   9B DF E0 9E 74 16 9B D9-86 E6 F6 9B DC 16 1E 00    ....t...........
)01EF0   9B DD D8 9B DF E0 9E 74-03 FF 4E CA 9B DF 46 CC    .......t..N...F.
)01F00   9B D8 A6 F8 F6 9B DC 06-1E 00 9B D9 96 CE F6 9B    ................
)01F10   DC 16 06 00 9B DD D8 9B-DF E0 9E 74 13 9B D9 86    ...........t....
)01F20   CE F6 9B DC 16 1E 00 9B-DD D8 9B DF E0 9E 75 15    ..............u.
)01F30   9B DF 06 0C 00 9B DC 36-16 00 9A 00 00 00 00 89    .......6........
)01F40   86 A4 F4 EB 49 9B D9 86-CE F6 9B DC CE F6 9B DC 16 ....I...........
)01F50   DD D8 9B DF E0 9E 76 13-9B D9 86 CE F6 23 9B D9 86 CE F6 &......v#....
)01F60   26 00 9B DD D8 9B DF E0-9E 76 23 9B D9 86 CE F6    &........v#....
)01F70   9B DE 0E 0C 00 9B DF 06-0C 00 9B DC 36 16 00 9B    ............6...
)01F80   DE C1 9A 00 00 00 00 89-86 A4 F4 FF 46 CC 9B DF    ............F...
)01F90   46 B6 9B D8 A6 E2 F6 9B-DC 06 1E 00 9B D9 96 CE    F...............
 .FA0    F6 9B DC 16 06 00 9B DD-D8 9B DF E0 9E 74 16 9B    .............t..
 .FB0    D9 86 CE F6 9B DC 16 1E-00 9B DD D8 9B DF E0 9E    ................
 .FC0    74 03 FF 4E B6 FF B6 D2-F6 FF B6 DE F6 FF B6 DC    t..N............
 .FD0    F6 FF B6 EA F6 0E E8 00-00 83 C4 08 FF B6 54 F7    ..............T.
 1FE0    FF B6 C2 F6 FF 76 A4 0E-E8 00 00 83 C4 06 E9 68    .....v.........h
 1FF0    0D 8D 86 C0 F6 16 50 8D-46 CE 16 50 8D 46 F2 16    ......P.F..P.F..
 2000    50 9A 00 00 00 00 83 C4-02 83 7E A4 00 74 23 83 7E P.........~..t#.~
 02010   9A 00 00 00 00 83 C4 02-83 7E 1D 83 7E C2 01-75 17 .........~..~..u.
 02020   F0 00 7E 1D 83 7E C2 01-75 17 FF B6 D2 F6 FF B6    ..~..~..u.......
 02030   DE F6 FF B6 DC F6 FF B6-EA F6 0E E8 00 00 83 C4    ................
 02040   08 83 7E F0 00 7F 03 E9-0F 0D 83 7E F0 01 74 03    ..~........~..t.
 02050   E9 91 03 83 7E A4 00 75-62 C7 86 C2 F6 00 00 8B    ....~..ub.......
 02060   46 F2 01 86 DA F6 8B 46-CE 01 86 CC F6 83 BE DA    F......F........
 02070   F6 00 7D 06 C7 86 DA F6-00 00 81 BE DA F6 FE 00    ..}.............
 02080   7E 06 C7 86 DA F6 FE 00-83 BE CC F6 00 7D 06 C7    ~............}..
 C2090   86 CC F6 00 00 81 BE CC-F6 EE 00 7E 06 C7 86 CC    ...........~....
 020A0   F6 EE 00 FF B6 CC F6 FF-B6 DA F6 FF B6 54 F7 FF    .............T..
 020B0   76 BA 6A 01 0E E8 00 00-83 C4 0A 83 7E A4 01 74    v.j.........~..t
 020C0   03 E9 20 03 8B 46 F2 F7-AE BC F6 01 86 EA F6 8B    .. ..F..........
 020D0   46 CE F7 AE BC F6 01 86-DC F6 83 BE EA F6 01 7D    F..............}
 020E0   0A C7 86 EA F6 01 00 FF-86 A2 F2 81 BE EA F6 FE    ................
 020F0   00 7E 0A C7 86 EA F6 FE-00 FF 86 A2 F2 83 BE DC    .~..............
 02100   F6 00 7D 06 C7 86 DC F6-00 00 81 BE DC F6 EE 00    ..}.............
 02110   7E 06 C7 86 DC F6 EE 00-8B 86 EA F6 05 FE 00 89    ~...............
 02120   86 DE F6 8B 86 DC F6 05-EE 00 89 86 D2 F6 8B 86    ................
 02130   EA F6 D1 F8 40 89 86 D4-F6 8B 86 DC F6 D1 F8 05    ....@...........
 02140   F1 00 89 86 BE F6 FF B6-A0 F2 9A 00 00 00 00 83    ................
 )02150  C4 02 8B B6 D4 F6 03 B6-E0 F6 8B BE BE F6 03 BE    ................
 02160   D8 F6 57 56 FF B6 BE F6-FF B6 D4 F6 FF 76 BA 6A    ..WV.........v.j
 .02170  01 9A 00 00 00 00 83 C4-0C 9B DF 06 0A 00 9B D9    ................
 02180   C0 9C 9C 76 01 C7 10 56-05 C7 0E 9F C7 0B 56 05    ...v...V......V.
 02190   CF 04 56 26 CE DD 56 55-86 48 56 54 85 CE 56 44    ..V&..VU.HVT..VD
 021A0   CD A3 56 31 CD 94 56 46-05 C5 49 9C C5 46 56 05 C5 ..V1..VF.(VJ.iVD
 021B0   C5 4E 56 05 C5 4B 56 05-C5 38 56 05 C5 36 9C C5 33 .NV..KV..I..FV
 021C0   41 56 05 C5 3B 56 05 C5-2C 9C C5 29 56 05 C5 24 56 AV..;V..8V..6..3
 021D0   56 05 C5 2E 56 05 C5 2C-9C C5 29 56 05 C5 24 56    V...V..,..)V..$V
 021E0   05 C5 20 56 05 CD 15 56-51 C5 11 56 05 C5 0F 9C    .. V..VQ..V.....
```

```
021F0  C5 0C 56 05 C5 0A 9F C5-07 56 05 C5 05 9F C5 02    ..V.....V......
02200  56 05 C4 FD 56 05 C4 F7-56 05 C4 F4 56 05 C4 F2    V...V...V...V..V
02210  9C C4 EF 56 05 C4 EA 56-05 C4 E4 56 05 C4 E1 56    ...V...V...V...V
02220  05 C4 DF 9C C4 DC 56 05-C4 D7 56 05 CC CD 56 51    ......V...V...VQ
02230  C4 CA 9C C4 C7 56 05 C4-C5 9F C4 C2 56 05 C4 BC    .....V......V...
02240  56 05 C4 B9 56 05 C4 B7-9C C4 B4 56 05 C4 AF 56    V...V......V...V
02250  05 C4 A9 56 05 C4 A6 56-05 C4 A4 9C C4 A1 56 05    ...V...V......V.
02260  C4 9C 56 05 C4 9A 9C C4-97 56 05 C4 92 56 05 C4    ..V...V...V...V.
02270  8E 56 05 C4 85 56 05 C4-82 56 05 C4 80 9C C4 7D    .V...V...V.....}
02280  56 05 C4 78 56 05 C4 72-56 05 C4 6F 56 05 C4 6D    V..xV..rV..oV..m
02290  9C C4 6A 56 05 C4 65 56-05 C4 63 9C C4 60 56 05    ..jV..eV..c..`V.
022A0  C4 5B 56 05 C4 57 56 05-CC 4D 56 51 C4 49 56 05    .[V..WV..MVQ.IV.
022B0  C4 47 9C C4 44 56 05 C4-42 9F C4 3F 56 05 C4 3D    .G..DV..B..?V..=
022C0  9F C4 3A 56 05 C4 35 56-05 C4 2F 56 05 C4 2C 56    ..:V..5V../V..,V
022D0  05 C4 2A 9C C4 27 56 05-C4 22 56 05 C4 0F 56 05    ..*..'V.."V...V.
022E0  C4 19 56 05 C4 17 9C C4-14 56 05 3B A0 AE 01 01 E8  ..V......V.;....
022F0  06 56 51 C4 03 9C C4 00-56 05 3B A0 AE 01 01 E8   .VQ.....V.;.....
02300  0B 9B DB BE 84 F2 90 9B-8B 86 D4 F6 2B 86 B8 F6   ............+...
02310  89 86 98 F2 9B DF 86 98-F2 9B DC 0E 16 00 9B D8   ................
02320  F1 9B D9 9E 4E F7 90 9B-8B C6 2B 86 B8 F6 89 86   ....N.....+.....
02330  98 F2 9B DF 86 98 F2 9B-DC 0E 16 00 9B D8 F1 9B   ................
02340  D9 9E F4 F6 9B DF 06 0C-00 9B D9 C0 9B DB BE 8E   ................
02350  F2 90 9B 8B 86 BE F6 2B-86 AC F6 89 86 98 F2 9B   .......+........
02360  DF 86 98 F2 9B DC 0E 16-00 9B D8 F1 9B D9 9E F8   ................
02370  F6 90 9B 8B C7 2B 86 AC-F6 89 86 98 F2 9B DF 86   .....+..........
02380  98 F2 9B DC 0E 16 00 9B-D8 F1 9B D9 9E E2 F6 9B   ................
02390  D9 86 4E F7 9A 00 00 00-00 89 46 D2 9B D9 86 F4   ..N.......F.....
023A0  F6 9A 00 00 00 00 89 46-CA 9B D9 86 F8 F6 9A 00   .......F........
023B0  00 00 00 89 46 CC 9B D9-86 E2 F6 9A 00 00 00 00   ....F...........
023C0  89 46 B6 9B DF 46 D2 9B-D8 A6 4E F7 9B DC 06 1E   .F...F....N.....
023D0  00 9B D9 96 E6 F6 9B DC-16 06 00 9B DD D8 9B DF   ................
023E0  E0 9E 9B DD C1 9B DD C0-74 13 9B D9 86 E6 F6 9B   ........t.......
023F0  DC 16 1E 00 9B DD D8 9B-DF E0 9E 75 14 9B DF 06   ...........u....
02400  0A 00 9B DC 36 16 00 9A-00 00 00 00 89 46 B8 EB   ....6........F..
02410  48 9B D9 86 E6 F6 9B DC-16 26 00 9B DC 16 26 00 9B DD   H........&....&...
02420  E0 9E 76 13 9B D9 86 E6-F6 9B DC 16 26 00 9B DD   ..v.........&...
02430  D8 9B DF E0 9E 76 22 9B-D9 86 E6 F6 9B DE 0E 0A   .....v".........
02440  00 9B DF 06 0A 00 9B DC-36 16 00 9B DE C1 9A 00   ........6.......
02450  00 00 00 89 46 B8 FF 46-D2 9B DF 46 CA 9B D8 A6   ....F..F...F....
02460  F4 F6 9B DC 06 1E 00 9B-D9 96 E6 F6 9B DC 16 06   ................
02470  00 9B DD D8 9B DF E0 9E-74 16 9B D9 86 E6 F6 9B   ........t.......
02480  DC 16 1E 00 9B DD D8 9B-DF E0 9E 74 03 FF 4E CA   ...........t..N.
02490  9B DF 46 CC 9B D8 A6 F8-F6 9B DC 06 1E 00 9B D9   ..F.............
024A0  96 CE F6 9B DC 16 06 00-9B DD D8 1F 9C 79 01 C5   .............y..
024B0  A7 56 05 C5 A5 9C C5 A2-56 05 C5 9D 56 05 C5 9B   .V......V...V...V
024C0  9C C5 98 56 05 C5 93 56-05 C5 8F 56 05 C5 86 56   ...V...V...V...V
024D0  05 C5 83 56 05 C5 81 9C-C5 7E 56 05 C5 79 56 05   ...V.....~.yV...
024E0  C5 73 56 05 C5 70 56 05-C5 6E 9C C5 6B 56 05 C5   .sV..pV..n..kV..
024F0  66 56 05 C5 64 9C C5 61-56 05 C5 5C 56 05 C5 58   fV..d..aV..\V..X
02500  56 05 CD 4E 56 51 C5 4A-56 05 C5 48 9C C5 45 56   V..NVQ.JV..H..EV
02510  05 C5 43 9F C5 40 56 05-C5 3E 9F C5 3B 56 05 C5   ..C..@V..>..;V..
02520  36 56 05 C5 30 56 05 C5-2D 56 05 C5 2B 9C C5 28   6V..0V..-V..+..(
02530  56 05 C5 23 56 05 C5 1D-56 05 C5 1A 56 05 C5 18   V..#V...V...V...
02540  9C C5 15 56 05 C5 10 56-05 CD 07 56 51 C5 04 9C   ...V...V...VQ...
02550  C5 01 56 05 C4 FF 9F C4-FC 56 05 C4 F6 56 05 C4   ..V......V...V..
02560  F3 56 05 C4 F1 9C C4 EE-56 05 C4 E9 56 05 C4 E4   V...V...V...V...
02570  56 05 C4 E1 56 05 C4 DD-56 05 C4 DA 56 05 C4 D8   V...V...V...V...
02580  9C C4 D5 56 05 C4 D2 56-05 C4 CE 9C C4 CB 56 05   ...V...V......V.
02590  C4 C6 56 05 C4 C2 56 05-CC BB 56 51 C4 B5 56 05   ..V...V...VQ..V.
025A0  CC AE 56 51 C4 A8 56 05-CC A1 56 51 C4 9B 56 05   ..VQ..V...VQ..V.
025B0  CC 94 56 51 C4 8E 56 05-C4 89 56 05 C4 86 56 05   ..VQ..V...V...V.
025C0  C4 84 9C C4 81 56 05 C4-7C 56 05 C4 70 56 06 C4   .....V..|V..pV..
025D0  6B 56 05 C4 68 56 05 C4-66 9C C4 63 56 05 C4 5E   kV..hV..f..cV..^
025E0  56 05 C4 50 56 06 C4 4B-56 05 C4 48 56 05 C4 46   V..PV..KV..HV..F
025F0  9F C4 43 56 05 C4 3E 56-05 C4 3B 56 05 C4 39 9C   ..CV..>V..;V..9.
02600  C4 36 56 05 C4 31 56 05-C4 25 56 06 C4 20 56 05   .6V..1V..%V.. V.
02610  C4 1D 56 05 C4 1B 9C C4-18 56 05 C4 13 56 05 C4   ..V......V...V..
```

```
02620  05 56 06 C4 00 56 05 E9-A0 B4 03 01 92 0D 9B DF   .V...V..........
02630  E0 9E 74 13 9B D9 86 CE-F6 9B DC 16 1E 00 9B DD   ..t.............
02640  D8 9B DF E0 9E 75 15 9B-DF 06 0C 00 9B DC 36 16   .....u........6.
02650  00 9A 00 00 00 00 89 86-A4 F4 EB 49 9B D9 86 CE   ...........I....
02660  F6 9B DC 16 26 00 9B DD-D8 9B DF E0 9E 76 13 9B   ....&........v..
02670  D9 86 CE F6 9B DC 16 26-00 9B DD D8 9B DF E0 9E   .......&........
02680  76 23 9B D9 86 CE F6 9B-DE 0E 0C 00 9B DF 06 0C   v#..............
02690  00 9B DC 36 16 00 9B DE-C1 9A 00 00 00 00 89 86   ...6............
026A0  A4 F4 FF 46 CC 9B DF 46-B6 9B D8 A6 E2 F6 9B DC   ...F...F........
026B0  06 1E 00 9B D9 96 CE F6-9B DC 16 06 00 9B DD D8   ................
026C0  9B DF E0 9E 74 16 9B D9-86 CE F6 9B DC 16 1E 00   ....t...........
026D0  9B DD D8 9B DF E0 9E 74-03 FF 4E B6 C7 46 C2 01   .......t..N..F..
026E0  00 C7 86 EE F6 00 00 83-7E F0 03 75 6B 8B 86 C0   ........~..uk...
026F0  F6 3D 04 00 75 62 83 7E-A4 00 75 51 C7 86 C2 F6   .=..ub.~..uQ....
02700  01 00 8B 46 CE 29 86 54-F7 83 BE 54 F7 02 7D 06   ...F.).T...T..}.
02710  C7 86 54 F7 02 00 83 BE-54 F7 1E 7E 06 C7 86 54   ..T.....T..~...T
02720  F7 1E 00 FF B6 CC F6 FF-B6 DA F6 FF B6 54 F7 FF   .............T..
02730  76 BA 6A 01 0E E8 00 00-83 C4 0A FF B6 54 F7 FF   v.j..........T..
02740  B6 C2 F6 FF 76 A4 0E E8-00 00 83 C4 06 83 7E A4   ....v.........~.
02750  01 75 05 C7 46 A4 01 00-83 7E F0 02 74 03 E9 FB   .u..F....~..t...
02760  08 8B 86 C0 F6 3D 01 00-74 1C 3D 02 00 75 03 E9   .....=..t.=..u..
02770  76 04 3D 05 00 75 03 E9-86 07 3D 07 00 75 03 E9   v.=..u....=..u..
02780  D4 08 E9 D7 08 90 FF 46-A4 83 7E A4 01 7F 03 E9   .......F..~.....
02790  74 01 C7 46 A4 00 00 C7-86 C2 F6 00 00 FF B6 54   t..F...........T
027A0  F7 6A 00 6A 00 0E E8 00-00 83 C4 06 1E 68 E3 01   .j.j.........h..
027B0  6A 00 9A 00 00 00 00 83-C4 06 6A 01 0E E8 00 00   j.........j.....
027C0  83 C4 02 6A 00 6A 02 9A-00 00 00 00 83 C4 04 6A   ...j.j.........j
027D0  01 6A 00 9A 00 00 00 00-83 C4 04 6A 00 9A 00 00   .j.........j....
027E0  00 00 83 C4 02 6A 00 FF-76 BA 9A 00 00 00 00 83   .....j..v.......
027F0  C4 04 6A 08 68 80 00 6A-00 FF 76 BA FF 76 C0 9A   ..j.h..j..v..v..
02800  00 00 00 00 83 C4 0A 6A-01 FF 76 BA FF 76 BE FF   .......j..v..v..
02810  76 BA 9A 00 00 00 00 83-C4 08 6A 00 9A 00 00 00   v.........j.....
02820  00 83 C4 02 6A 05 6A 01-FF B6 B0 F6 FF B6 C4 F6   ....j.j.........
02830  FF 76 BA FF B6 D2 F6 FF-B6 DE F6 FF B6 DC F6 FF   .v..............
02840  B6 EA F6 FF 76 BA 9A 00-00 00 00 83 C4 14 6A 00   ....v.........j.
02850  6A 02 9A 00 00 00 00 83-C4 04 6A 01 6A 01 9A 00   j.........j.j...
02860  00 00 00 83 C4 04 FF B6-D2 F6 FF B6 DE F6 FF B6   ................
02870  DC F6 FF B6 EA F6 0E E8-00 00 83 C4 08 0E E8 00   ................
02880  00 FF 76 BA 6A 00 9A 00-00 00 00 83 C4 04 FF 76   ..v.j..........V
02890  BA 9A 00 00 00 00 83 C4-02 FF 76 BA 6A 01 9A 00   ..........v.j...
028A0  00 00 00 83 C4 04 FF B6-A0 F2 9A 00 00 00 00 83   ................
028B0  C4 02 6A 00 9A 00 00 00-00 83 C4 02 FF B6 A0 F2   ..j.............
028C0  9A 00 00 00 00 83 C4 02-FF B6 CC F6 FF B6 DA F6   ................
028D0  FF B6 54 F7 FF 76 BA 6A-00 0E E8 00 00 83 C4 0A   ..T..v.j........
028E0  0E E8 00 00 FF 76 B6 FF-76 CC FF 76 CA FF 76 D2   .....v..v..v..v.
028F0  FF B6 A4 F4 FF 76 B8 FF-36 0C 00 FF 36 0A 00 0E   .....v..6...6...
02900  E8 00 00 83 C4 10 83 7E-A4 01 74 03 E9 4D 07 6A   .......~..t..M.j
02910  00 6A 01 9A 00 00 00 00-83 C4 04 6A 00 9A 00 00   .j.........j....
02920  00 00 83 C4 02 FF B6 54-F7 FF B6 C2 F6 FF 76 A4   .......T......v.
02930  0E E8 00 00 83 C4 06 1E-68 0B 02 6A 00 9A 00 00   ........h..j....
02940  00 00 83 C4 06 6A 00 0E-E8 00 00 83 C4 02 83 BE   .....j..........
02950  BA F6 00 75 03 E9 D2 00-80 3E 04 00 00 74 18 9A   ...u.....>...t..
02960  00 00 00 00 0B C0 75 0F-6A 49 6A 43 1E 68 29 02   ......u.jIjC.h).
02970  0E E8 00 00 83 C4 08 80-3E 04 00 00 75 03 E9 9D   ........>...u...
02980  00 6A 01 1E 68 64 02 9A-00 00 00 00 83 C4 06 89   .j..hd..........
02990  46 A2 40 75 11 1E 68 68-02 6A 01 9A 00 00 00 00   F.@u..hh.j......
029A0  83 C4 06 EB 6E 90 C7 86-A6 F4 00 00 B8 20 20 B9   ....n........
029B0  01 00 8D BE FC F6 16 07-F2 AB AA 83 86 A6 F4 03   ................
029C0  8D 86 FC F6 8B D8 8B FB-8C D0 B9 FF FF 33 C0 F2   .............3..
029D0  AE F7 D1 49 51 8D 86 FC-F6 16 50 FF 76 A2 AB 9C   ...IQ.....P.v...
029E0  4D 01 CF 6E 56 25 C7 69-9D CF 5A 56 30 C7 57 9D   M..nV%.i..ZV0.W.
029F0  C7 4B 9D 87 44 56 4F C7-40 9D CF 32 56 42 C7 2C   .K..DVO.@..2VB.,
02A00  9D 87 1B 56 45 CF 10 56-25 C7 0B 9D 87 04 56 4A   ...VE..V%.....VJ
02A10  CE F0 56 1D CE E6 56 3E-86 D3 56 3A C6 CF 9F C6   ..V...V>..V:....
02A20  CB 9F 86 B4 56 35 86 AD-56 54 CE 93 56 55 CE 87   ....V5..VT..VU..
02A30  56 34 CE 7D 56 32 CE 71-56 3E CE 64 56 2E CE 59   V4.}V2.qV>.dV..Y
02A40  56 3E 86 51 56 2C 86 4A-56 44 CE 31 56 41 CE 25   V>.QV,.JVD.1VA.%
02A50  56 3E CE 19 56 2B CD EF-56 53 CD E5 56 27 CD D2   V>..V+..VS..V'..
```

```
02A60  56 56 CD BD 56 58 CD B0-56 53 CD A6 56 41 CD 9A   VV..VX..VS..VA..
02A70  56 3E 85 90 56 45 CD 85-56 25 C5 80 9D 85 79 56   V>..VE..V%....yV
02A80  4A 85 1A 56 4A 85 08 56-54 C4 A5 56 05 C4 A2 56   J..VJ..VT..V...V
02A90  05 C4 A0 9C C4 9D 56 05-C4 98 56 05 C4 92 56 05   ......V...V...V.
02AA0  C4 8F 56 05 C4 8D 9C C4-8A 56 05 C4 85 56 05 C4   ..V......V...V..
02AB0  83 9C C4 80 56 05 C4 7B-56 05 C4 77 56 05 CC 6C   ....V..{V..wV..l
02AC0  56 51 C4 68 56 05 C4 66-9C C4 63 56 05 C4 61 9F   VQ.hV..f..cV..a.
02AD0  56 05 C4 5E 56 05 C4 5C-9F C4 59 56 05 C4 54 56   .^V..\.YV..TV
02AE0  4E 56 05 C4 4B 56 05 C4-49 9C C4 46 56 05 C4 41   NV..KV..I..FV..A
02AF0  56 05 C4 3B 56 05 C4 38-56 05 C4 36 9C C4 33 56   V..;V..8V..6..3V
02B00  05 C4 2E 56 05 CC 24 56-51 C4 21 9C C4 1E 56 05   ...V..$VQ.!...V.
02B10  C4 1C 9F C4 19 56 05 C4-13 56 05 C4 10 56 05 C4   .....V...V...V..
 B20   0E 9C C4 0B 56 05 C4 06-56 05 C4 00 56 05 53 A0   ....V...V...V.S.
 B30   B6 03 01 42 11 9A 00 00-00 00 83 C4 08 8D 86 FC   ...B............
 B40   F6 89 46 D4 8C 56 D6 6A-0A 1E 68 93 02 16 50 9A   ..F..V.j..h...P.
 B50   00 00 00 00 83 C4 0A 6A-01 8D 86 FC F6 16 50 FF   .......j......P.
 B60   76 A2 9A 00 00 00 00 83-C4 08 FF 76 A2 9A 00 00   v..........v....
 B70   00 00 83 C4 02 C7 86 BA-F6 00 00 C7 86 4C F7 00   .............L..
 2B80  00 68 FE 00 9A 00 00 00-00 83 C4 02 6A 00 6A 02   .h..........j.j.
02B90  9A 00 00 00 00 83 C4 04-6A 00 FF 76 BC 6A FF FF   ........j..v.j..
02BA0  76 BA 9A 00 00 00 00 83-C4 08 FF 76 BC 6A 00 9A   v..........v.j..
02BB0  00 00 00 00 83 C4 04 1E-68 96 02 9A 00 00 00 00   ........h.......
02BC0  83 C4 04 FF 76 BA 6A 00-9A 00 00 00 00 83 C4 04   ....v.j.........
02BD0  1E 68 A4 02 9A 00 00 00-00 83 C4 04 8B 86 EA F6   .h..............
02BE0  99 2B C2 D1 F8 40 89 86-D4 F6 8B 86 DC F6 99 2B   .+...@.........+
02BF0  C2 D1 F8 05 F1 00 89 86-BE F6 FF B6 A0 F2 9A 00   ................
02C00  00 00 00 83 C4 02 A1 0A-00 99 B9 04 00 F7 F9 8B   ............F.+.
02C10  C8 A1 06 00 99 2B C2 D1-F8 03 C1 89 46 D0 2B F6   .....+......F.+.
02C20  A1 0A 00 99 2B C2 D1 F8-F7 EE 03 46 D0 89 46 A0   ....+......F..F.
02C30  56 0E E8 00 00 83 C4 02-8B D8 8E C2 57 8B FB B9   V...........W...
02C40  FF FF 33 C0 F2 AE F7 D1-49 5F 8B F9 56 0E E8 00   ..3.....I_..V...
02C50  00 83 C4 02 52 50 57 57-6A 01 68 FA 00 FF 76 A0   ....RPWWj.h...v.
02C60  6A 01 6A 00 9A 00 00 00-00 83 C4 12 46 83 FE 0B   j.j.........F...
02C70  7E AE 89 BE 5A F7 89 B6-A6 F4 A1 0C 00 99 B9 04   ~...Z...........
02C80  00 F7 F9 8B C8 A1 08 00-99 2B C2 D1 F8 03 C1 05   .........+......
02C90  F7 00 89 46 C8 2B F6 A1-0C 00 99 2B C2 D1 F8 F7   ...F.+.....+....
02CA0  EE 03 46 C8 89 86 5C F7-56 0E E8 00 00 83 C4 02   ..F...\.V.......
02CB0  8B D8 8E C2 57 8B FB B9-FF FF 33 C0 F2 AE F7 D1   ....W.....3.....
02CC0  49 5F 8B F9 56 0E E8 00-00 83 C4 02 52 50 57 57   I_..V.......RPWW
02CD0  6A 02 FF B6 5C F7 6A 08-6A 01 6A 00 9A 00 00 00   j...\.j.j.j.....
02CE0  00 83 C4 12 46 83 FE 07-7E AD 89 BE 5A F7 89 B6   ....F...~...Z...
02CF0  A6 F4 8B 86 BE F6 03 86-D8 F6 50 8B 86 D4 F6 03   ..........P.....
02D00  86 E0 F6 50 FF B6 BE F6-FF B6 D4 F6 FF 76 BA 6A   ...P.........v.j
02D10  00 9A 00 00 00 00 83 C4-0C FF B6 D2 F6 FF B6 DE   ................
02D20  F6 FF B6 DC F6 FF B6 EA-F6 0E E8 00 00 83 C4 08   ................
02D30  FF B6 A0 F2 9A 00 00 00-00 83 C4 02 E9 74 04 83   .............t..
02D40  7E A4 00 74 03 E9 FD 02-FF 76 BC 6A 01 9A 00 00   ~..t.....v.j....
02D50  00 00 83 C4 04 68 FF 00-9A 00 00 00 00 83 C4 02   .....h..........
02D60  FF B6 A0 F2 9A 00 00 00-00 83 C4 02 FF B6 EC F6   ................
02D70  9A 00 00 00 00 83 C4 02-FF 76 BA 6A 00 9A 00 00   .........v.j....
02D80  00 00 83 C4 04 FF 76 BA-9A 00 00 00 00 83 C4 02   ......v.........
02D90  6A 00 6A 02 9A 00 00 00-00 83 C4 04 6A 01 6A 00   j.j.........j.j.
02DA0  9A 00 00 00 00 83 C4 04-6A 00 9A 00 00 00 00 83   ........j.......
02DB0  C4 02 2B F6 8B 9E 54 F7-C1 E3 02 8B 87 7C 03 8B   ..+...T......|..
02DC0  97 7E 03 89 86 84 F2 89-96 86 F2 8D 86 B0 F6 89   .~..............
02DD0  86 8E F2 8C 96 90 F2 8D-86 C4 F6 89 86 9A F2 8C   ................
02DE0  96 9C F2 8D 46 F4 89 86-80 F2 8C 96 82 F2 8D 46   ....F..........F
02DF0  F4 89 86 7C F2 8C 96 7E-F2 8B BE A0 F2 6A 01 68   ...|...~.....j.h
 2E00  F0 00 6A 06 FF 76 BC FF-76 BC 9A 00 00 00 00 83   ..j..v..v.......
 2E10  C4 0A 57 9A 00 00 00 00-83 C4 02 C4 9E 8E F2 26   ..W............&
 2E20  8B 07 03 86 CC F6 50 C4-9E 9A F2 26 8B 07 03 86   ......P....&....
 2E30  DA F6 50 FF B6 54 F7 FF-76 BC 6A 00 0E E8 00 00   ..P..T..v.j.....
 2E40  83 C4 0A 57 6A 00 9A 00-00 00 00 83 C4 04 6A 00   ...Wj.........j.
 2E50  6A 02 9A 00 00 00 00 83-C4 04 FF B6 EC F6 9A 00   j...............
 2E60  00 00 83 C4 02 57 FF 76-BC FF 76 BA 9A 00 00 00   .....W.v..v.....
02E70  00 00 83 C4 06 89 46 AE-89 56 B0 83 FE 02 7C 29   ......F..V....|)
02E80  89 96 76 F2 89 86 74 F2-C7 86 78 F2 00 00 C7 86   ..v...t...x.....
02E90  7A F2 00 00 9B DF AE 74-F2 9B D8 4E A8 9A 00 00   z......t...N....
```

```
002EA0  00 00 C4 9E 80 F2 EB 18-90 FF B6 86 F2 FF B6 84   ................
002EB0  F2 FF 76 B0 FF 76 AE 9A-00 00 00 00 C4 9E 7C F2   ..v..v........|.
002EC0  26 89 07 83 86 8E F2 02-83 86 9A F2 02 83 86 80   &...............
002ED0  F2 02 83 86 7C F2 02 46-83 FE 03 7F 03 E9 1D FF   ....|..F........
002EE0  89 B6 A6 F4 8B 46 FA 06-9C C6 00 CF 83 56 0A CF   .....F.......V..
002EF0  69 56 51 C7 64 56 05 C7-5F 56 05 CF 39 56 36 CF   iVQ.dV.._V..9V6.
002F00  2A 56 55 CF 1E 56 3E CF-12 56 11 87 09 56 0F CE   *VU..V>..V...V..
002F10  DF 56 55 CE D6 56 56 C6-8C 9D C6 88 9D CE 76 56   .VU..VV.......vV
002F20  53 CE 6C 56 41 CE 60 56-3E CE 54 56 09 CE 49 56   S.lVA.`V>.TV..IV
002F30  3E CE 3C 56 55 CE 30 56-32 CE 24 56 34 CE 19 56   >.<VU.0V2.$V4..V
002F40  3E CE 00 56 55 85 F6 56-44 CD DD 56 26 CD A8 56   >..VU..VD..V&..V
002F50  21 85 92 56 2F 85 76 56-2F F2 C5 63 9F C5 51 9F C5  !..V/.vV/..c..Q..
002F60  46 9F CD 30 56 21 85 1A-56 2D 84 FE 56 2D C4 EC   F..0V!..V-..V-..
002F70  9F C4 DD 9F C4 D2 9F CC-CA 56 55 CC A0 56 4E C4   .........VU..VN.
002F80  9D 9D CC 94 56 3E CC 87-56 4E C4 84 9D CC 7B 56   ....V>..VN....{V
002F90  3E CC 6E 56 24 CC 5C 56-3E CC 50 56 55 CC 39 56   >.nV$.\V>.PVU.9V
002FA0  1F CC 2E 56 3F CC 1B 56-0E C4 16 9D CC 01 56 3F   ...V?..V......V?
002FB0  11 A0 B4 03 01 F4 14 2B-46 F8 89 46 FC 8B 46 FA   .......+F..F..F.
002FC0  3B 46 F8 7E 03 8B 46 F8-89 86 52 F7 0B C0 75 06   ;F.~..F...R...u.
002FD0  C7 86 52 F7 01 00 6B 46-FC 64 99 F7 BE 52 F7 89   ..R...kF.d...R..
002FE0  46 FE 6A 00 9A 00 00 00-00 83 C4 02 FF B6 EC F6   F.j.............
002FF0  9A 00 00 00 00 83 C4 02-6A 01 68 FE 00 6A 06 FF   ........j.h..j..
003000  76 BC FF 76 BC 9A 00 00-00 00 83 C4 0A 6A 01 FF   v..v.........j..
003010  76 BC 6A FF FF 76 BA 9A-00 00 00 00 83 C4 08 6A   v.j..v.........j
003020  01 6A 01 9A 00 00 00 00-83 C4 04 6A 00 9A 00 00   .j.........j....
003030  00 00 83 C4 02 FF B6 A0-F2 9A 00 00 00 00 83 C4   ................
003040  02 C7 86 BA F6 01 00 FF-B6 4C F7 8D 46 D8 16 50   .........L..F..P
003050  8D 86 FC F6 16 50 9B D9-86 F8 F6 83 EC 08 8B DC   .....P..........
003060  9B 36 DD 1F 9B D9 86 4E-F7 83 EC 08 8B DC 9B 36   .6.....N.......6
003070  DD 1F 90 9B D9 86 4E-F7 83 EC 08 8B DC 9B 36   .......N.......6
003080  FF B6 CC F6 FF B6 DA F6-8D 46 F4 16 50 0E E8 00   .........F..P...
003090  00 83 C4 28 0E E8 00 00-FF 76 B6 FF 76 CC FF 76   ...(.....v..v..v
0030A0  CA FF 76 D2 FF B6 A4 F4-FF 76 B8 FF 36 0C 00 FF   ..v......v..6...
0030B0  36 0A 00 0E E8 00 00 83-C4 10 68 FF 00 9A 00 00   6.........h.....
0030C0  00 00 83 C4 02 C7 86 C2-F6 00 00 FF B6 54 F7 6A   .............T.j
0030D0  00 FF 76 A4 0E E8 00 00-83 C4 06 6A 00 6A 02 9A   ..v........j.j..
00E0   00 00 00 00 83 C4 04 FF-B6 A0 F2 9A 00 00 00 00   ................
00F0   83 C4 02 FF B6 CC F6 FF-B6 DA F6 FF B6 54 F7 FF   .............T..
0100   76 BA 6A 00 0E E8 00 00-83 C4 0A 6A 00 9A 00 00   v.j........j....
0110   00 00 83 C4 02 83 7E A4-01 74 03 E9 65 01 C7 46   ......~..t..e..F
0120   A4 01 00 E9 5D 01 90 83-BE BA F6 00 75 03 E9 D5   ....].......u...
0130   F3 9B DF 46 FA 83 EC 04-8B DC 9B 36 D9 1F 9B DF   ...F.......6....
0140   46 F8 83 EC 04 8B DC 9B-36 D9 1F 90 9B FF B6 CC   F.......6.......
03150  F6 FF B6 DA F6 0E E8 00-00 83 C4 0C 80 3E 04 00   .............>..
03160  00 74 18 9A 00 00 00 00-0B C0 75 0F 6A 49 6A 43   .t........u.jIjC
03170  1E 68 B1 02 0E E8 00 00-83 C4 08 80 3E 04 00 00   .h..........>...
03180  75 03 E9 E0 00 C7 86 A6-F4 00 00 8D 46 D8 8B D8   u...........F...
03190  8B FB 8C D0 8E C0 B9 FF-FF 33 C0 F2 AE F7 D1 49   .........3.....I
031A0  74 3B 6B 06 7A 03 16 8B-F8 8B B6 A6 F4 8A 42 D8   t;k.z.........B.
031B0  8B DE 03 DF 03 DD 36 88-87 60 F7 46 8B C6 8D 4E   ......6..`.F...N
031C0  D8 8B D9 8B D0 57 8B FB-8C D0 B9 FF FF 33 C0 F2   .....W.......3..
031D0  AE F7 D1 49 5F 3B D1 72-D4 89 B6 A6 F4 FF 06 7A   ...I_;.r.......z
031E0  03 6A 01 1E 68 EC 02 9A-00 00 00 00 83 C4 06 89   .j..h...........
031F0  46 A2 40 75 10 1E 68 F0-02 6A 01 9A 00 00 00 00   F.@u..h..j......
03200  83 C4 06 EB 55 8D 86 FC-F6 8B D8 8B FB 8C D0 8E   ....U...........
03210  C0 B9 FF FF 33 C0 F2 AE-F7 D1 49 51 8D 86 FC F6   ....3.....IQ....
03220  16 50 FF 76 A2 9A 00 00-00 00 83 C4 08 8D 86 FC   .P.v............
03230  F6 89 46 D4 8C 56 D6 6A-0A 1E 68 1B 03 16 50 9A   ..F..V.j..h...P.
03240  00 00 00 00 83 C4 0A 6A-01 8D 86 FC F6 16 50 FF   .......j......P.
03250  76 A2 9A 00 00 00 00 83-C4 08 FF 76 A2 9A 00 00   v..........v....
03260  00 00 83 C4 02 C7 86 BA-F6 00 00 C7 86 4C F7 01   .............L..
03270  00 6A 01 0E E8 00 00 83-C4 02 E9 89 F2 C7 86 D6   .j..............
03280  F6 04 00 83 BE D6 F6 03-7F 03 E9 8E F2 A1 00 00   ................
03290  0B 06 02 00 74 10 FF 36-02 00 FF 36 00 00 9A 00   ....t..6...6....
032A0  00 00 00 83 C4 04 1E 68-1E 03 9A 00 00 00 00 83   .......h........
032B0  C4 04 1E 68 2B 03 9A 00-00 00 00 83 C4 04 9A 00   ...h+...........
032C0  00 00 00 1F 5E 5F C9 CB-90 C8 00 00 00 1E B8 00   ....^_..........
```

```
032D0  00 8E D8 83 7E 06 00 75-06 1E 68 F8 03 EB 04 1E    ....~..u..h.....
032E0  68 2E 04 6A 01 9A 00 00-00 00 83 C4 06 9A 00 00    h..j............
032F0  00 00 1E 68 62 04 9A 00-00 00 00 83 C4 04 B8 00    ...hb...........
03300  00 BA 00 00 52 50 1E 68-90 04 6A 00 6A 01 9A 00    ....RP.h..j.j...
03310  00 00 00 83 C4 0C B8 00-00 BA 00 00 52 50 1E 68    ............RP.h
03320  BF 04 6A 00 6A 02 9A 00-00 00 00 83 C4 0C B8 00    ..j.j...........
03330  00 BA 00 00 52 50 1E 68-EE 04 6A 00 6A 03 9A 00    ....RP.h..j.j...
03340  00 00 00 83 C4 0C B8 00-00 BA 00 00 52 50 1E 68    ............RP.h
03350  1D 05 6A 00 6A 04 9A 00-00 00 00 83 C4 0C B8 00    ..j.j...........
03360  00 BA 00 00 52 50 1E 5A-9C 43 01 CB AB 56 10 C7    ....RP.Z.C...V..
03370  A8 56 10 CF A0 56 38 C7-99 9D CB 93 56 10 C7 90    .V...V8.....V...
03380  56 10 CF 88 56 38 C7 81-9D CB 7B 56 10 C7 78 56    V..V8....{V..xV
03390  10 CF 70 56 38 C7 69 9D-CB 63 56 10 C7 60 56 10    ..pV8.i..cV..`V.
033A0  CF 58 56 38 C7 51 9D CB-4B 56 10 C7 48 56 10 CF    .XV8.Q..KV..HV..
033B0  40 56 1E C7 3D 9D CF 37-56 15 CF 2F 56 25 C7 2A    @V..=..7V../V%.*
 3C0   9D C7 24 9D CB 18 9D CF-08 56 47 CF 00 56 14 C6    ..$......VG..V..
 3D0   FD 9D CE F4 56 14 C6 F1-9D CE E8 56 18 C6 E5 9D    ....V......V....
 3E0   C6 E1 9D C6 DB 9D C6 D7-9D 86 BE 56 45 CE A7 56    ...........VE..V
 3F0   1F CE 9C 56 3F CE 89 56-0E C6 84 9D CE 6F 56 3F    ...V?..V.....oV?
 400   CE 45 56 25 C6 40 9D CE-31 56 30 C6 2E 9D C6 28    .EV%.@..1V0....(
 410   9D C5 ED 9D C5 C6 9D 85-BF 56 4F C5 BB 9D CD AD    .........VO.....
03420  56 42 C5 A7 9D 85 A0 56-17 C5 94 56 06 C5 91 56    VB.....V...V...V
03430  02 C5 90 56 03 C5 87 56-05 C5 84 56 02 C5 83 56    ...V...V...V...V
03440  03 C5 7A 56 05 CD 57 56-34 85 4F 56 54 CD 35 56    ..zV..WV4.OVT.5V
03450  55 CD 29 56 3E 85 1F 56-4A CD 07 56 34 84 FE 56    U.)V>..VJ..V4..V
03460  3A C4 FA 9F C4 F6 9F 84-DF 56 35 84 D8 56 13 C4    :........V5..V..
03470  C3 9F C4 BF 9F C4 BB 56-06 C4 B8 56 02 C4 B7 56    .......V...V...V
03480  03 C4 AD 56 05 C4 AA 56-02 C4 A9 56 03 C4 9F 56    ...V...V...V...V
03490  05 CC 83 56 55 CC 77 56-34 CC 6D 56 41 CC 61 56    ...VU.wV4.mVA.aV
034A0  24 CC 4F 56 56 CC 3A 56-55 CC 2E 56 53 E4 A0 1D    $.OVV.:VU..VS...
034B0  03 01 A4 18 68 4C 05 6A-00 6A 05 9A 00 00 00 00    ....hL.j.j......
034C0  83 C4 0C B8 00 00 BA 00-00 52 50 1E 68 7B 05 6A    .........RP.h{.j
034D0  00 6A 06 9A 00 00 00 00-83 C4 0C B8 00 00 BA 00    .j..............
034E0  00 52 50 1E 68 AA 05 6A-00 6A 07 9A 00 00 00 00    .RP.h..j.j......
034F0  83 C4 0C B8 00 00 BA 00-00 52 50 1E 68 D9 05 6A    .........RP.h..j
03500  00 6A 08 9A 00 00 00 00-00 6A 00 6A 09 9A 00 00 00 00    .j.........j.j......
03510  00 52 50 1E 68 08 06 6A-00 6A 09 9A 00 00 00 00    .RP.h..j.j......
03520  83 C4 0C B8 00 00 BA 00-00 52 50 1E 68 37 06 6A    .........RP.h7.j
03530  00 6A 0A 9A 00 00 00 00-83 C4 0C B8 00 00 BA 00    .j..............
03540  00 52 50 1E 68 66 06 6A-00 6A 0B 9A 00 00 00 00    .RP.hf.j.j......
03550  83 C4 0C B8 00 00 BA 00-00 52 50 1E 68 95 06 6A    .........RP.h..j
03560  00 6A 0C 9A 00 00 00 00-83 C4 0C B8 00 00 BA 00    .j..............
03570  00 52 50 1E 68 C4 06 6A-00 6A 0D 9A 00 00 00 00    .RP.h..j.j......
03580  83 C4 0C B8 00 00 BA 00-00 52 50 1E 68 F3 06 6A    .........RP.h..j
03590  00 6A 0E 9A 00 00 00 00-83 C4 0C B8 00 00 BA 00    .j..............
035A0  00 52 50 1E 68 22 07 6A-00 6A 0F 9A 00 00 00 00    .RP.h".j.j......
035B0  83 C4 0C B8 00 00 BA 00-00 52 50 1E 68 51 07 6A    .........RP.hQ.j
035C0  00 6A 10 9A 00 00 00 00-83 C4 0C B8 00 00 BA 00    .j..............
035D0  00 52 50 1E 68 80 07 6A-00 6A 11 9A 00 00 00 00    .RP.h..j.j......
035E0  83 C4 0C 1F C9 CB C8 00-00 00 1E B8 00 00 8E D8    ................
035F0  83 7E 06 0B 7E 05 C7 46-06 0B 00 8B 5E 06 C1 E3    .~..~..F....^...
03600  02 8B 87 CA 07 8B 97 CC-07 1F C9 CB C8 00 00 00    ................
03610  1E B8 00 00 8E D8 83 7E-06 07 7E 05 C7 46 06 07    .......~..~..F..
03620  00 8B 5E 06 C1 E3 02 8B-87 0A 08 8B 97 0C 08 1F    ..^.............
03630  C9 CB C8 50 00 00 1E B8-00 00 8E D8 8B 46 06 0B    ...P.........F..
03640  C0 74 07 3D 01 00 74 38-EB 47 83 7E 08 00 75 14    .t.=..t8.G.~..u.
03650  FF 76 0A 1E 68 2A 08 8D-46 B0 16 50 9A 00 00 00    .v..h*..F..P....
03660  00 83 C4 0A 83 7E 08 01-75 27 FF 76 0A 1E 68 46    .....~..u'.v..hF
03670  08 8D 46 B0 16 50 9A 00-00 00 00 83 C4 0A EB 11    ..F..P..........
03680  1E 68 62 08 8D 46 B0 16-50 9A 00 00 00 00 83 C4    .hb..F..P.......
03690  08 8D 46 B0 16 50 6A 01-9A 00 00 00 00 83 C4 06    ..F..Pj.........
 36A0  1F C9 CB 90 C8 12 02 00-57 56 1E B8 00 00 8E D8    ........WV......
 36B0  B8 6E 08 89 46 F4 8C 5E-F6 9B DF 46 0A 9B DC 46    .n..F..^...F...F
 36C0  14 9A 00 00 00 00 89 46-F0 9B DF 46 0C 9B DC 46    .......F...F...F
 36D0  1C 9A 00 00 00 00 89 86-0E FE 2B 06 08 00 99 F7    ..........+.....
 36E0  7E 12 05 02 00 89 46 FC-8B 46 F0 2B 06 06 00 99    ~.....F..F.+....
 36F0  F7 7E 10 05 03 00 89 46-F8 9B DF 46 0A 9B DF 46    .~.....F...F...F
 3700  10 9B DE F9 9B DC 46 14-9B D9 9E 08 FE 9B DF 46    ......F........F
```

```
03710  OC 9B DF 46 12 9B DE F9-9B DC 46 1C 9B D9 9E 00   ...F.....F.....
03720  FE 9B D9 86 08 FE 9A 00-00 00 00 89 86 04 FE 9B   ................
03730  D9 86 00 FE 9A 00 00 00-00 89 86 FE FD 1E 68 70   ..............hp
03740  08 8D 86 10 FE 16 50 9A-00 00 00 00 83 C4 08 FF   ......P.........
03750  B6 04 FE 0E E8 00 00 83-C4 02 52 50 FF B6 FE FD   ..........RP....
03760  0E E8 00 00 83 C4 02 52-50 C4 5E 06 26 FF 77 06   .......RP.^.&.w.
03770  26 FF 77 04 1E 68 9D 08-8D 86 60 FE 16 50 9A 00   &.w..h....`..P..
03780  00 00 00 83 C4 14 FF 76-0E 1E 68 C6 08 8D 86 B0   .......v..h.....
03790  FE 16 50 9A 00 00 00 00-83 C4 0A FF 76 F0 C4 5E   ..P.........v..^
037A0  06 26 FF 77 0A 26 FF 77-08 1E 68 F3 08 8D 86 00   .&.w.&.w..h.....
037B0  FF 16 50 9A 00 00 00 00-83 C4 0E FF B6 0E FE C4   ..P.............
037C0  5E 06 26 FF 77 02 26 FF-37 1E 68 1B 09 A8 9C 6D   ^.&.w.&.7.h....m
037D0  01 C7 17 9D CF 00 56 0E-C6 F7 9D CE E0 56 0E C6   ......V......V..
037E0  D7 9D CE CB 56 0E C6 C2-9D 86 AE 56 2F 86 A1 56   ....V......V/..V
037F0  2D CE 94 56 0E C6 8B 9D-CE 81 56 51 C6 7B 56 05   -..V......VQ.{V.
003800  CE 73 56 51 C6 6D 56 05-C6 68 56 05 C6 64 56 05   .sVQ.mV..hV..dV.
003810  C6 61 56 05 C6 5D 56 05-C6 59 56 05 C6 54 56 05   .aV..]V..YV..TV.
003820  C6 50 56 05 C6 4D 56 05-C6 49 56 05 C6 45 56 05   .PV..MV..IV..EV.
003830  C6 39 9F C6 28 9F CE 1E-56 51 C6 19 56 05 C6 15   .9..(...VQ..V...
003840  56 05 CE 0E 56 51 C6 09-56 05 C6 05 56 05 C5 FD   V...VQ..V..V....
003850  9D C9 F8 9D CD E5 56 25-CD D6 56 0E C5 CE 9D CD   ......V%..V.....
003860  C3 56 0E C5 BB 9D CD A9-56 0E C5 A1 9D C9 84 9D   .V......V.......
003870  C5 79 9D C5 75 9D C9 5E-9D C5 53 9D C5 4F 9D C9   .y..u..^..S..O..
003880  38 9D CD 28 56 38 C5 21-9D C9 1B 56 10 C5 18 56   8..(V8.!...V...V
003890  10 CD 10 56 38 C5 09 9D-C9 03 56 10 C5 00 56 10   ...V8.....V...V.
0038A0  CC F8 56 38 C4 F1 9D C8-EB 56 10 C4 E8 56 10 CC   ..V8.....V...V..
0038B0  E0 56 38 C4 D9 9D C8 D3-56 10 C4 D0 56 10 CC C8   .V8.....V...V...
0038C0  56 38 C4 C1 9D C8 BB 56-10 C4 B8 56 10 CC B0 56   V8.....V...V...V
0038D0  38 C4 A9 9D C8 A3 56 10-C4 A0 56 10 CC 98 56 38   8.....V...V...V8
0038E0  C4 91 9D C8 8B 56 10 C4-88 56 10 CC 80 56 38 C4   .....V...V...V8.
0038F0  79 9D C8 73 56 10 C4 70-56 10 CC 68 56 38 C4 61   y..sV..pV..hV8.a
003900  9D C8 5B 56 10 C4 58 56-10 CC 50 56 38 C4 49 9D   ..[V..XV..PV8.I.
003910  C8 43 56 10 C4 40 56 10-CC 38 56 38 C4 31 9D C8   .CV..@V..8V8.1..
003920  2B 56 10 C4 28 56 10 CC-20 56 38 C4 19 9D C8 13   +V..(V.. V8.....
003930  56 10 C4 10 56 10 CC 08-56 38 C4 01 9D 81 A0 B5   V...V...V8......
003940  03 01 BD 1B 8D 86 50 FF-16 50 9A 00 00 00 00 83   ......P..P......
003950  C4 0E 1E 68 42 09 8D 46-A0 16 50 9A 00 00 00 00   ...hB..F..P.....
003960  83 C4 08 2B F6 8D 86 10-FE 89 86 F6 FD 8C 96 F8   ...+............
003970  FD FF B6 F8 FD FF B6 F6-FD 8D 44 0C 50 9A 00 00   ..........D.P...
003980  00 00 83 C4 06 83 86 F6-FD 50 46 83 FE 06 7C E1   .........PF...|.
003990  89 B6 06 FE 80 3E 04 00-00 74 18 9A 00 00 00 00   .....>...t......
0039A0  0B C0 75 0F 6A 49 6A 43-1E 68 6F 09 0E E8 00 00   ..u.jIjC.ho.....
0039B0  83 C4 08 80 3E 04 00 00-75 03 E9 6C 01 6A 01 1E   ....>...u..l.j..
0039C0  68 AA 09 9A 00 00 00 00-83 C4 06 89 86 0C FE 40   h..............@
0039D0  75 11 1E 68 AE 09 6A 01-9A 00 00 00 00 83 C4 06   u..h..j.........
0039E0  E9 3A 01 83 3E 6E 0A 00-75 03 E9 9E 00 1E 68 D9   .:..>n..u.....h.
0039F0  09 FF 76 26 FF 76 24 9A-00 00 00 00 83 C4 08 89   ..v&.v$.........
003A00  46 F2 1E 68 E6 09 03 46-24 8B 56 26 52 50 9A 00   F..h...F$.V&RP..
003A10  00 00 00 83 C4 08 01 46-F2 1E 68 F2 09 8B 46 F2   .......F..h...F.
003A20  03 46 24 8B 56 26 52 50-9A 00 00 00 00 83 C4 08   .F$.V&RP........
003A30  01 46 F2 1E 68 05 0A 8B-46 F2 03 46 24 8B 56 26   .F..h...F..F$.V&
003A40  52 50 9A 00 00 00 00 83-C4 08 01 46 F2 1E 68 16   RP.........F..h.
003A50  0A 8B 46 F2 03 46 24 8B-56 26 52 50 9A 00 00 00   ..F..F$.V&RP....
003A60  00 83 C4 08 01 46 F2 C4-7E 24 B9 FF FF 33 C0 F2   .....F..~$...3..
003A70  AE F7 D1 49 51 06 FF 76-24 FF B6 0C FE 9A 00 00   ...IQ..v$.......
003A80  00 00 83 C4 08 C7 06 6E-0A 00 00 83 7E 2C 00 74   .......n....~,.t
003A90  04 FF 06 6C 0A C4 5E 06-26 FF 77 0A 26 FF 77 08   ...l..^.&.w.&.w.
003AA0  26 FF 77 06 26 FF 77 04-FF B6 FE FD 0E E8 00 00   &.w.&.w.........
003AB0  83 C4 02 52 50 FF B6 04-FE 0E E8 00 00 83 C4 02   ...RP...........
003AC0  52 50 FF 76 F6 FF 76 F4-FF 36 6C 0A 1E 68 24 0A   RP.v..v..6l..h$.
003AD0  FF 76 26 FF 76 24 9A 00-00 00 00 83 C4 1E C4 5E   .v&.v$.........^
003AE0  06 26 FF 77 0A 26 FF 77-08 26 FF 77 06 26 FF 77   .&.w.&.w.&.w.&.w
003AF0  04 FE 0E E8 00 00 83 C4-02 52 50 FF B6 FE FD 0E   .........RP.....
003B00  E8 00 00 83 C4 02 52 50-1E 68 42 0A FF              ......RP.hB..
003B10  76 2A FF 76 28 9A 00 00-00 00 83 C4 18 FF B6 0C   v*.v(...........
003B20  FE 9A 00 00 00 00 83 C4-02 8B 46 0C 03 46 0E 05   ..........F..F..
003B30  10 00 89 46 FA 3D EE 00-7E 0C 8B 46 0C 2B 46 0E   ...F.=..~..F.+F.
```

```
03B40  2D 06 00 89 46 FA 8B 46-0A 89 46 FE 3D 0C 00 7D   -...F..F..F.=..}
03B50  05 C7 46 FE 0C 00 81 7E-FE F4 00 7E 05 C7 46 FE   ..F....~...~..F.
03B60  F4 00 6A 00 6A 01 9A 00-00 00 00 83 C4 04 6A 00   ..j.j.........j.
03B70  9A 00 00 00 00 83 C4 02-C7 86 06 FE 06 00 8B 46   ...............F
03B80  06 8B 56 08 05 04 00 89-86 F6 FD 89 96 F8 FD BE   ..V.............
03B90  64 0A BF 5C 0A C7 86 F0-FD 54 0A C7 86 EE FD 04   d..\.....T......
03BA0  00 C4 9E F6 FD 26 8B 07-99 89 86 FA FD 89 96 FC   .....&..........
03BB0  FD 52 50 6A 01 6A 01 FF-34 6A 00 8B 05 03 46 FA   .RPj.j..4j....F.
03BC0  50 8B 9E F0 FD 8B 07 03-46 FE 50 6A 01 6A 00 9A   P.......F.Pj.j..
03BD0  00 00 00 00 83 C4 14 83-86 F6 FD 02 83 C6 02 83   ................
03BE0  C7 02 83 86 F0 FD 02 FF-8E EE FD 75 B4 1F 5E 5F   ...........u..^_
03BF0  C9 CB 90 C8 0C 00 00 1E-B8 00 00 8E D8 C7 46 FC   ..............F.
03C00  01 01 C7 46 F8 F1 00 C7-46 FA 00 00 C7 46 F4 00   ...F....F....F..
03C10  00 C7 46 F6 01 01 C7 46-FE 00 00 68 FE 00 9A 00   ..F....F...h....
03C20  00 00 00 83 C4 02 6A 00-6A 02 9A 00 00 00 00 83   ......j.j.......
03C30  C4 04 6A 00 9A 00 00 00-00 83 C4 02 6A 01 6A 00   ..j.j.......j.j.
03C40  6A 00 6A 00 6A 00 FF 76-0C FF 76 0A FF 76 08 FF   j.j.j..v..v..v..
03C50  76 06 6A 02 9A 00 00 00-00 83 C4 14 6A 00 9A 00   v.j.........j...
03C60  00 00 00 83 C4 02 6A 01-6A 00 6A 00 68 01 01 6A   ......j.j.j.h..j
03C70  00 FF 76 0C FF 76 0A FF-76 08 FF 76 06 6A 03 9A   ..v..v..v..v.j..
03C80  00 00 00 00 83 C4 14 6A-00 9A 00 00 00 00 83 C4   .......j........
03C90  02 6A 01 6A 00 68 F1 00-68 01 01 6A 00 FF 76 0C   .j.j.h..h..j..v.
03CA0  FF 76 0A FF 76 08 FF 76-06 6A 01 9A 00 00 00 00   .v..v..v.j......
03CB0  83 C4 14 1F C9 CB 90 1E-B8 00 00 8E D8 6A 00 6A   .............j.j
03CC0  01 9A 00 00 00 00 83 C4-04 6A 00 9A 00 00 00 00   .........j......
03CD0  83 C4 02 6A 00 9A 00 00-00 00 83 C4 02 68 EF 00   ...j.........h..
03CE0  6A 00 9A 00 00 00 00 83-C4 04 68 F0 00 68 FF 01   j.........h..h..
03CF0  9A 00 00 00 00 5A 9C D3-00 CF AD 56 49 CF 9F 56   .....Z.....VI..V
03D00  48 CF 92 56 32 CF 88 56-1D CF 7E 56 3E CB 75 9D   H..V2..V..~V>.u.
03D10  CF 68 56 2B CF 46 56 53-CF 3C 56 2B CF 1B 56 53   .hV+.FVS.<V+..VS
03D20  CF 11 56 2B CE F1 56 53-CE E7 56 3E CE DB 56 55   ..V+..VS..V>..VU
03D30  CA B5 9D CE 8C 56 33 C6-55 9D C6 4F 9D C6 4C 9D   .....V3.U..O..L.
03D40  CE 2D 56 1D CE 23 56 3E-CD DE 56 1F CD D2 56 0E   .-V..#V>..V...V.
03D50  C5 C9 9D 85 C0 56 2D 85-B3 56 2F CD 93 56 0E C5   .....V-..V/..V..
03D60  8A 9D C5 86 9D 85 77 56-2D 85 6A 56 2F C5 4F 9D   ......wV-.jV/.O.
03D70  C5 43 9D CD 3A 56 3F CD-19 56 0E C5 0B 9D CC FF   .C..:V?..V......
03D80  56 0E C4 F1 9D CC E5 56-0E C4 D7 9D CC CB 56 0E   V......V......V.
03D90  C4 C0 9D CC B4 56 0E C4-AB 9D C4 A1 9D CC 95 56   .....V.........V
03DA0  25 C4 90 9D CC 80 56 30-C4 7D 9D C4 71 9D 84 6A   %.....V0.}..q..j
03DB0  56 4F C4 66 9D CC 58 56-42 C4 52 9D CC 3A 56 22   VO.f..XVB.R..:V"
03DC0  CC 18 56 0E C4 10 9D CC-07 56 0E 8A A0 B6 03 01   ..V......V......
03DD0  6E 1F 83 C4 04 68 DF 01-68 FF 00 9A 00 00 00 00   n....h..h.......
03DE0  83 C4 04 6A 00 68 00 01-9A 00 00 00 00 83 C4 04   ...j.h..........
03DF0  1F CB 1E B8 00 00 8E D8-1E 68 70 0A 6A 07 6A 07   .........hp.j.j.
03E00  6A 01 6A 0E 6A 03 6A 01-6A 00 9A 00 00 00 00 83   j.j.j.j.j.......
03E10  C4 12 1E 68 78 0A 6A 0A-6A 0A 6A 02 6A 0E 68 FD   ...hx.j.j.j.j.h.
03E20  01 6A 01 6A 00 9A 00 00-00 00 83 C4 12 1E 68 83   .j.j..........h.
03E30  0A 6A 0A 6A 0A 6A 01 68-FF 00 6A 03 6A 01 6A 00   .j.j.j.j.h..j.j.j.
03E40  9A 00 00 00 00 83 C4 12-1E 68 8E 0A 6A 08 6A 08   .........h..j.j.
03E50  6A 02 68 FF 00 68 FD 01-6A 01 6A 00 9A 00 00 00   j.h..h..j.j.....
03E60  00 83 C4 12 1F CB C8 12-00 00 57 56 1E B8 00 00   ..........WV....
03E70  8E D8 8B 46 0A 89 46 FE-8B 46 0E 89 46 F2 C7 46   ...F..F..F..F..F
03E80  F4 00 00 8B 46 10 39 46-F2 7F 6A 8B 46 FE 89 46   ....F.9F..j.F..F
03E90  F0 8B 46 10 2B 46 0E 40-89 46 EE 01 46 F4 8B 76   ..F.+F.@.F..F..v
03EA0  F2 8B 46 F0 89 46 FA 56-0E E8 00 00 83 C4 02 8B   ..F..F.V........
03EB0  D8 8E C2 57 8B FB B9 FF-FF 33 C0 F2 AE F7 D1 49   ...W.....3.....I
03EC0  5F 8B F9 56 0E E8 00 00-83 C4 02 52 50 57 57 6A   _..V.......RPWWj
03ED0  01 68 F3 00 FF 76 FA 6A-01 6A 00 9A 00 00 00 00   .h..v.j.j.......
03EE0  83 C4 12 46 8B 46 06 01-46 F0 3B 76 10 7E B2 89   ...F.F..F.;v.~..
03EF0  7E F8 89 76 F2 8B 46 0A-80 C4 01 89 46 FE 8B 46   ~..v..F.....F..F
03F00  0E 89 46 F2 C7 46 F4 00-00 8B 46 10 39 46 F2 7F   ..F..F....F.9F..
03F10  6A 8B 46 FE 89 46 EE 8B-46 10 2B 46 0E 40 89 46   j.F..F..F.+F.@.F
03F20  F0 01 46 F4 8B 76 F2 8B-46 EE 89 46 FA 56 0E E8   ..F..v..F..F.V..
03F30  00 00 83 C4 02 8B D8 8E-C2 57 8B FB B9 FF FF 33   .........W.....3
03F40  C0 F2 AE F7 D1 49 5F 8B-F9 56 0E E8 00 00 83 C4   .....I_..V......
03F50  02 52 50 57 57 6A 01 68-F3 00 FF 76 FA 6A 01 6A   .RPWWj.h..v.j.j
03F60  00 9A 00 00 00 00 83 C4-12 46 8B 46 06 01 46 EE   .........F.F..F.
03F70  3B 76 10 7E B2 89 7E F8-89 76 F2 8B 46 0C 05 F7   ;v.~..~..v..F...
```

```
F80      00 89 46 FC 8B 46 12 89-46 F2 C7 46 F4 00 00 8B    ..F..F..F..F....
3F90     46 14 39 46 F2 7F 6A 8B-46 FC 89 46 EE 8B 46 14    F.9F.■j.F..F..F.
03FA0    2B 46 12 40 89 46 F0 01-46 F4 8B 76 F2 8B 46 EE    +F.@.F..F..v..F.
03FB0    89 46 F6 56 0E E8 00 00-83 C4 02 8B D8 8E C2 57    .F.V...........W
03FC0    8B FB B9 FF FF 33 C0 F2-AE F7 D1 49 5F 8B F9 56    .....3....I..V
03FD0    0E E8 00 00 83 C4 02 52-50 57 57 6A 01 FF 76 F6    .......RPWWj..v.
03FE0    68 FC 00 6A 01 6A 00 9A-00 00 00 00 83 C4 12 46    h..j.j.........F
03FF0    8B 46 08 01 46 EE 3B 76-14 7E B2 89 7E F8 89 76    .F..F.;v.~..~..v
04000    F2 8B 46 0C 89 46 FC 8B-46 12 89 46 F2 C7 46 F4    ..F..F..F..F..F.
04010    00 00 8B 46 14 39 46 F2-7F 6A 8B 46 FC 89 46 EE    ...F.9F.■j.F..F.
04020    8B 46 14 2B 46 12 40 89-46 F0 01 46 F4 8B 76 F2    .F.+F.@.F..F..v.
04030    8B 46 EE 89 46 F6 56 0E-E8 00 00 83 C4 02 8B D8    .F..F.V.........
04040    8E C2 57 8B FB B9 FF FF-33 C0 F2 AE F7 D1 49 5F    ..W.....3....I_
04050    8B F9 56 0E E8 00 00 83-C4 02 52 50 57 57 6A 01    ..V.......RPWWj.
04060    FF 76 F6 68 FC 00 6A 01-6A 00 9A 00 00 00 00 83    .v.h..j.j.......
04070    C4 12 46 8B 46 08 01 46-EE 3B 76 14 7E B2 89 7E    ..F.F..F.;v.~..~
04080    F8 89 76 F2 1F 5E 5F C9-CB 90 C8 00 00 00 57 56    ..v..^_.......WV
04090    1E B8 00 00 8E D8 FF 76-08 6A 01 9A 00 00 00 00    .......v.j......
040A0    83 C4 04 FF 76 06 9A 00-00 00 00 83 C4 02 83 7E    ....v..........~
040B0    06 01 75 74 FF 36 14 00-FF 36 12 00 9A 00 00 00    ..ut.6...6......
040C0    00 83 C4 04 FF 36 16 00-9A 00 00 00 00 83 C4 02    .....6..........
040D0    8B 36 12 00 81 C6 01 01-FF 36 14 00 56 9A 00 00    .6.......6..V...
040E0    00 00 83 C4 04 FF 36 16-00 9A 00 00 00 00 83 C4    ......6.........
040F0    02 8B 3E 14 00 81 C7 F1-00 57 FF 36 12 00 9A 00    ..>......W.6....
04100    00 00 00 83 C4 04 FF 36-16 00 9A 00 00 00 00 83    .......6........
04110    C4 02 57 56 9A 00 00 00-00 83 C4 04 FF 36 16 00    ..WV.........6..
04120    9A 00 00 00 00 83 C4 02-FF 76 0E FF 76 0C 9A 00    .........v..v...
04130    00 00 00 83 C4 04 FF 76-0A 9A 00 00 00 00 83 C4    .......v........
04140    02 8B 76 0C 81 C6 01 01-FF 76 0A 9A 00 00 00 00    ..v......v......
04150    00 83 C4 04 FF 76 0A FF-76 0E 56 9A 00 00 00 00    .....v..v.V.....
04160    7E 0E 81 C7 F1 00 57 FF-76 0C 9A 00 00 00 00 83    ~.....W.v.......
04170    C4 04 FF 76 0A 9A 00 00-00 00 83 C4 02 57 56 9A    ...v.........WV.
04180    00 00 00 00 8F 9C C0 00-CF AE 56 48 CF A4 56 29    ..........VH..V)
04190    CF 99 56 48 CF 86 56 29-CF 7B 56 48 CF A4 56 29    ..VH..V).{VH..V)
041A0    CF 5D 56 48 CF 4F 56 29-C7 4C 9F CF 43 56 48 CF    .]VH.OV).L..CVH.
041B0    39 56 29 C7 36 9F CF 2D-56 48 C7 2A 9F C7 21 9F    9V).6..-VH.*..!.
041C0    CF 18 56 29 C7 15 9F CF-0C 56 48 C7 08 9F C7 00    ..V).....VH.....
041D0    9F CE F7 56 29 C6 F4 9F-CE EB 56 48 C6 E8 9F C6    ..V)......VH....
041E0    E4 9F CE D5 56 1D CE CA-56 3E CA C0 9D CE 99 56    ....V...V>.....V
041F0    21 86 83 56 2F 86 67 56-2F CE 16 56 21 86 00 56    !..V/.gV/..V!..V
04200    2F 85 E4 56 2F CD 90 56-21 85 7A 56 2D 85 5E 56    /..V/..V!.zV-.^V
04210    2D CD 0A 56 21 84 F4 56-2D 84 D8 56 2D C8 9C 9D    -..V!..V-..V-...
 20      CC 8B 56 4B C4 78 9D CC-6F 56 4B C4 5D 9D CC 54    ..VK.x..oVK.]..T
 30      56 4B C4 42 9D CC 39 55-4B C4 28 9D C8 22 9D CC    VK.B..9VK.(.."..
 40      17 56 49 CC 0A 56 48 CF-A0 9C 00 01 20 23 83 C4    .VI..VH..... #..
 50      04 FF 76 0A 9A 00 00 00-00 83 C4 02 8B 46 0A A3    ..v..........F..
 60      16 00 8B 46 0C A3 12 00-8B 46 0E A3 14 00 1F 5E    ...F.....F.....^
 70      5F C9 CB 90 C8 00 00 00-1E B8 00 00 8E D8 FF 76    _..............v
 80      08 6A 01 9A 00 00 00 00-83 C4 04 6A 01 9A 00 00    .j.........j....
4290     00 00 83 C4 02 83 7E 06-01 75 1C FF 36 1A 00 FF    ......~..u..6...
42A0     36 18 00 9A 00 00 00 00-83 C4 04 FF 36 1C 00 9A    6...........6...
42B0     00 00 00 00 83 C4 02 FF-76 0E FF 76 0C 9A 00 00    ........v..v....
42C0     00 00 83 C4 04 FF 76 0A-9A 00 00 00 00 83 C4 02    ......v.........
42D0     8B 46 0A A3 1C 00 8B 46-0C A3 18 00 8B 46 0E A3    .F.....F.....F..
42E0     1A 00 1F C9 CB 90 4E 9C-3B 00 C4 92 9F C4 8C 9F    ......N.;.......
42F0     C4 86 9F CC 7B 56 29 CC-70 56 48 CC 62 56 29 C4    ....(V).pVH.bV).
04300    5F 9F CC 56 56 48 C4 53-9F C4 4F 9F CC 40 56 1D    _..VVH.S..O..@V.
04310    CC 36 56 3E C8 2C 9D C4-1E 9F C4 18 9F C4 12 9F    .6V>.,..........
04320    CC 07 56 29 BC 8A 02 00-00 74                      ..V).....t
04320    CC 07 56 29 BC 8A 02 00-00 74                      ..V).....t
  00     80 08 00 06 70 63 68 67-2E 63 3F 88 07 00 00 00    ....pchg.c?.....
  10     4D 53 20 43 6E 88 09 00-00 9F 4C 4C 49 42 43 45    MS Cn.....LLIBCE
  20     25 88 06 00 00 9D 32 6C-4F E8 88 06 00 00 A1 01    %.....2lO.......
  30     43 56 37 96 32 00 00 06-44 47 52 4F 55 50 09 50    CV7.2...DGROUP.P
  40     43 48 47 5F 54 45 58 54-04 43 4F 44 45 05 5F 44    CHG_TEXT.CODE._D
  50     41 54 41 04 44 41 54 41-05 43 4F 4E 53 54 04 5F    ATA.DATA.CONST._
  60     42 53 53 03 42 53 53 15-98 07 00 48 02 03 03 04    BSS.BSS....H....
0070     01 0C 98 07 00 48 40 01-05 06 01 CC 98 07 00 48    .....H@........H
```

```
0080  00 00 07 07 01 0A 98 07-00 48 46 00 08 09 01 C1   .........HF.....
0090  9A 08 00 02 FF 03 FF 04-FF 02 56 9C 0D 00 00 03   ..........V.....
00A0  01 02 02 01 03 04 40 01-45 01 C0 8C 5E 00 0A 5F   ......@.E...^.._
00B0  5F 61 63 72 74 75 73 65-64 00 12 5F 63 6C 65 61   _acrtused.._clea
00C0  72 5F 61 63 74 69 6F 6E-5F 61 72 65 61 00 10 5F   r_action_area.._
00D0  63 6C 65 61 72 5F 6D 65-6E 75 5F 61 72 65 61 00   clear_menu_area.
00E0  13 5F 63 6C 65 61 72 5F-6D 65 73 73 61 67 65 5F   ._clear_message_
00F0  61 72 65 61 00 14 5F 77-72 69 74 65 5F 61 6C 6C   area.._write_all
0100  5F 73 74 61 6E 64 61 72-64 73 00 16 B4 0B 00 08   _standards......
0110  62 75 69 6C 64 70 74 72-00 D3 8C 0C 00 09 5F 75   buildptr......_u
0120  6E 73 65 74 5F 77 6E 00-8D B4 19 00 16 73 68 6F   nset_wn......sho
0130  77 5F 69 64 65 6E 74 69-66 69 65 72 5F 77 69 6E   w_identifier_win
0140  64 6F 77 00 E3 8C 03 01-10 5F 70 75 74 5F 70 63   dow......_put_pc
0150  68 67 5F 76 61 6C 75 65-73 00 0F 5F 72 65 6D 6F   hg_values.._remo
0160  76 65 5F 77 69 6E 64 6F-77 73 00 15 5F 63 6C 6F   ve_windows.._clo
0170  73 65 5F 73 74 61 6E 64-61 72 64 73 5F 66 69 6C   se_standards_fil
0180  65 00 08 5F 64 65 66 73-5F 77 6E 00 05 5F 70 63   e.._defs_wn.._pc
0190  68 67 00 0E 5F 67 65 74-5F 73 74 61 6E 64 61 72   hg.._get_standar
01A0  64 73 00 0C 5F 73 65 74-5F 6D 65 73 73 61 67 65   ds.._set_message
01B0  00 11 5F 73 65 74 5F 73-63 72 65 65 6E 5F 74 69   .._set_screen_ti
01C0  74 6C 65 00 07 5F 76 5F-70 6C 73 74 00 08 5F 62   tle.._v_plst.._b
01D0  64 72 5F 64 6C 6E 00 0B-5F 69 6D 5F 6F 75 74 6D   dr_dln.._im_outm
01E0  6F 64 65 00 0B 5F 69 6D-5F 6F 75 74 70 61 74 68   ode.._im_outpath
01F0  00 0E 5F 69 6D 5F 69 6E-74 65 72 69 6D 61 67 65   .._im_interimage
0200  00 0A 5F 69 6D 5F 6F 70-6D 6F 64 65 00 0A 5F 69   .._im_opmode.._i
0210  6D 5F 63 70 75 77 69 6E-00 13 5F 67 65 74 5F 65   m_cpuwin.._get_e
0220  78 70 65 72 69 6D 65 6E-74 5F 6B 65 79 00 07 5F   xperiment_key.._
0230  65 72 72 6D 73 67 00 08-5F 73 70 72 69 6E 74 66   errmsg.._sprintf
0240  00 07 5F 73 65 74 5F 77-6E 00 82 B6 29 00 00 01   .._set_wn...)...
0250  08 62 75 69 6C 64 70 74-72 00 00 00 16 73 68 6F   .buildptr....sho
0260  77 5F 69 64 65 6E 74 69-66 69 65 72 5F 77 69 6E   w_identifier_win
0270  64 6F 77 1E 00 00 44 90-1F 00 00 01 0F 5F 72 65   dow...D......_re
0280  6D 6F 76 65 5F 77 69 6E-64 6F 77 73 96 00 00 05   move_windows....
0290  5F 70 63 68 67 B8 00 00-96 88 04 00 00 A2 01 D1   _pchg...........
02A0  A0 02 01 02 02 00 20 20-20 20 20 20 20 20 20 20   ......          
02B0  20 50 20 20 43 20 20 48-20 20 47 20 20 20 20 20    P  C  H  G     
02C0  20 20 20 20 20 20 20 00-43 61 6C 63 75 6C 61      .Calcula
02D0  74 69 6E 67 20 70 65 72-63 65 6E 74 20 63 68 61   ting percent cha
02E0  6E 67 65 20 69 6D 61 67-65 20 20 00 75 73 69 6E   nge image  .usin
02F0  67 20 61 72 69 74 68 6D-65 74 69 63 2E 20 20 42   g integer number
0300  20 61 72 69 74 68 6D 65-74 69 63 2E 20 20 00 42    arithmetic.  .B
0310  69 6F 6C 6F 67 69 63 61-6C 20 56 69 73 69 6F 6E   iological Vision
0320  20 20 20 50 43 48 47 20-2D 20 50 65 72 63 65 6E      PCHG - Percen
0330  74 20 63 68 61 6E 67 65-20 62 65 74 77 65 65 6E   t change between
0340  20 32 20 69 6D 61 67 65-73 00 53 63 61 6C 65 20    2 images.Scale 
0350  3D 20 25 64 20 20 20 43-6C 69 70 20 3D 20 25 64   = %d   Clip = %d
0360  20 20 20 4F 66 66 73 65-74 20 3D 20 25 64 00 50      Offset = %d.P
0370  43 48 47 3A 20 43 61 6E-27 74 20 61 63 63 65 73   CHG: Can't acces
0380  73 20 73 74 61 6E 64 61-72 64 73 20 69 6E 66 6F   s standards info
0390  72 6D 61 74 69 6F 6E 20-66 6F 72 20 6B 65 79 20   rmation for key 
03A0  25 6C 64 00 C9 A0 06 00-02 00 00 00 00 58 A0 44   %ld..........X.D
03B0  00 02 00 01 43 6F 70 79-72 69 67 68 74 20 28 63   ....Copyright (c
03C0  29 20 31 39 38 39 2C 20-42 69 6F 6C 6F 67 69 63   ) 1989, Biologic
03D0  61 6C 20 56 69 73 69 6F-6E 20 49 6E 63 2E 20 20   al Vision Inc.  
03E0  41 6C 6C 20 72 69 67 68-74 73 20 72 65 73 65 72   All rights reser
03F0  76 65 64 00 C6 A0 06 03-01 00 00 C8 00 00 00 1E   ved.............
0400  B8 00 00 8E D8 C4 5E 06-8B 46 0A 26 89 47 02 8B   ......^..F.&.G..
0410  46 0C 26 89 07 1F C9 CB-90 1E B8 00 00 8E D8 B8   F.&.............
0420  00 00 BA 00 00 52 50 6A-26 6A 05 6A 04 6A 03 1E   .....RPj&j.j.j..
0430  68 00 00 9A 00 00 00 00-83 C4 10 1E 68 00 00 9A   h...........h...
0440  00 00 00 00 83 C4 04 C7-06 42 00 01 00 1E 68 00   .........B....h.
0450  00 1E 68 02 00 6A 01 6A-01 9A 00 00 00 00 83 C4   ..h..j.j........
0460  0C 1E 68 00 00 1E 68 25-00 6A 01 6A 02 9A 00 00   ..h...h%.j.j....
0470  00 00 83 C4 0C 1E 68 00-00 1E 68 48 00 6A 01 6A   ......h...hH.j.j
0480  03 9A 00 00 00 00 83 C4-0C C7 06 00 00 01 00 1F   ................
0490  CB 1E B8 00 00 8E D8 83-3E 00 00 00 74 0C 1E 68   ........>...t..h
04A0  00 00 9A 00 00 00 00 83-C4 04 C7 06 00 00 00 00   ................
04B0  1F CB 90 C8 74 00 00 57-56 1E B8 00 00 8E D8 C7   ....t..WV.......
```

```
)004C0  46 9E 7F 00 1E 68 6B 00-9A 00 00 00 00 83 C4 04   F.W..hk.........
)004D0  9A 00 00 00 00 9A 00 00-00 00 9A 00 00 00 00 0E   ................
)004E0  E8 00 00 6A 7F FF 76 08-FF 76 06 1E 68 A6 00 8D   ...j..v..v..h...
)004F0  46 A0 16 50 9A 00 00 00-00 83 C4 0E 8D 46 A0 16   F..P.........F..
)00500  50 6A 01 9A 00 00 00 00-83 C4 06 6A 01 9A 00 00   Pj.........j....
)00510  00 00 83 C4 02 6A 00 6A-02 6A FF 6A 01 9A 00 00   .....j.j.j.j....
)00520  00 00 83 C4 08 6A 08 6A-02 6A 01 6A 01 9A 00 00   .....j.j.j.j....
)00530  00 00 83 C4 08 6A 01 6A-01 9A 00 00 00 00 83 C4   .....j.j........
)00540  00 00 83 C4 08 6A 00 6A-00 6A FF 6A 01 9A 00 00   .....j.j.j.j....
)00550  00 83 C4 02 6A 04 6A 00-9A 00 00 00 00 83 C4 04   ....j.j.........
)00560  2B F6 89 76 8C 8B C6 C1-F8 06 89 46 92 50 9A 00   +..v.......F.P..
)00570  00 00 00 83 C4 02 8B 46-8C 89 46 F8 8B 56 FA 40   .......F..F..V.@
)00580  89 46 F2 89 56 F4 BF 00-02 89 7E 8E C4 5E F8 26   .F..V.....~..^.&
)00590  8A 07 98 89 46 F6 C4 5E-F2 26 8A 07 98 89 46 F0   ....F..^.&....F.
)005A0  2B 46 F6 F7 6E 06 99 8B-4E F6 3B 4E F0 7E 03 8B   +F..n...N.;N.~..
)005B0  4E F0 80 C9 01 F7 F9 05-7F 00 89 46 94 3D FF 00   N..........F.=..
    5C0 7E 07 C7 46 94 FF 00 EB-0B 83 7E 94 00 7D 05 C7   ~..F......~..}..
    5D0 46 94 00 00 8B 46 F6 03-46 F0 3B 46 08 7D 05 C7   F....F..F.;F.}..
    5E0 46 94 7F 00 C4 5E F2 8A-46 94 26 88 07 83 46 F8   F....^..F.&...F.
    5F0 02 83 46 F2 02 FF 4E 8E-75 92 80 46 8D 04 46 81   ..F...N.u..F..F.
    600 FE DF 01 7F 03 E9 5D FF-6A 00 9A 00 00 00 00 83   ......].j.......
    610 C4 02 6A 01 6A 02 9A 00-00 00 00 83 C4 04 6A 00   ..j.j.........j.
    620 6A 03 6A FF 6A 01 9A 00-00 00 00 83 C4 08 6A 08   j.j.j.........j.
    630 6A 03 6A 01 6A 01 9A 00-00 00 00 83 C4 08 6A 00   j.j.j.........j.
    640 6A 01 6A FF 6A 02 9A 00-00 00 00 83 C4 08 6A 08   j.j.j.........j.
    650 6A 01 6A 02 6A 02 9A 00-00 00 00 83 C4 08 6A 00   j.j.j.........j.
    660 6A 03 6A FF 6A 03 9A 00-00 00 00 83 C4 08 9A 00   j.j.j...........
    670 00 00 00 99 89 46 96 89-56 98 0B D2 7D 08 2B C0   .....F..V...}.+.
    680 89 46 98 89 46 96 FF 76-98 FF 76 96 9A 00 00 00   .F..F..v..v.....
    690 00 83 C4 04 89 46 9A 89-56 9C 0B D0 75 19 FF 76   .....F..V...u..v
    6A0 98 FF 76 96 1E 68 CB 00-9A 00 00 00 00 83 C4 08   ..v..h..........
    6B0 2B C0 1F 5E 5F C9 CB FF-76 08 FF 76 06 9A 00 00   +..^_...v..v....
    6C0 00 00 83 C4 04 FF 76 9C-FF 76 9A 9A 00 00 00 00   ......v..v......
    6D0 83 C4 04 FF 76 9C FF 76-9A 9A 00 00 00 00 83 C4   ....v..v........
    6E0 04 0E E8 00 00 9A 00 00-00 00 9A 00 00 00 00 9A   ................
    6F0 00 00 00 00 B8 01 00 1F-5E 5F C9 CB 00 00 00 9A   ........^_......
    700 00 CE F5 56 04 CE F0 56-03 CE EB 56 02 86 E8 56   ...V...V...V...V
    710 0A CE DF 56 0B CE D1 56-05 CE C3 56 09 CE AE 56   ...V...V...V...V
    720 19 C6 AB 9D CE 92 56 0E-CE 74 56 18 CE 6C 56 14   ......V..tV..lV.
    730 CE 5C 56 15 CE 4C 56 14-CE 3C 56 15 CE 2C 56 14   .\V..LV..<V..,V.
    740 CE 1C 56 16 CE 10 56 13-CD 74 56 17 CD 5E 56 16   ..V...V..tV..^V.
    750 CD 52 56 13 CD 43 56 14-CD 33 56 15 CD 23 56 14   .RV..CV..3V..#V.
    760 CD 13 56 13 CD 09 56 0F-CC FA 56 1A C4 F2 9D 84   ..V...V...V.....
    770 E6 56 08 CC E0 56 04 CC-DB 56 03 CC D6 56 02 CC   .V...V...V...V..
    780 CE 56 10 C4 CB 9D C8 C0-9D C4 B1 9D CC A8 56 07   .V............V.
    790 C4 A5 9F C4 9E 9D C8 98-9D C4 90 9D CC 87 56 11   ..............V.
    7A0 C4 80 9D C4 7C 9F CC 73-56 11 C4 6C 9D C4 68 9F   ....|..sV..l..h.
    7B0 CC 5F 56 11 C4 58 9D C4-54 9F C4 4E 9F CC 45 56   ._V..X..T..N..EV
    7C0 1B C4 42 9F CC 39 56 0C-C4 36 9F C8 28 56 12 C4   ..B..9V..6..(V..
    07D0 25 56 12 C8 20 9D C8 06-9D AB 8A 02 00 00 74      %V.. ........t
    07D0 25 56 12 C8 20 9D C8 06-9D AB 8A 02 00 00 74      %V.. ........t
```

What is claimed is:

1. An operator-interactive automated background noise removal system for processing an image of biological data acquired from an autoradiograph, electrophoresis gel, fluorescence gel, photographic film or other media, said system comprising:

a means for displaying a raw image containing a data image comprised of spatial patterns of pixels of varying intensity superimposed over a background image comprised of spatial patterns of pixels of varying intensity;

image conversion means for generating a video output signal from said raw image and converting said video output signal to digital data representing said raw image;

neighborhood selection means for selecting the size and shape of a background removal neighborhood which will be used to process said digital data representing said raw image, said size and shape selected according to the type of biological data being processed;

background detector means for receiving and processing said raw image digital data using said background removal neighborhood to generate digital data representing said background image;

means for subtracting said digital data representing said background image from said digital data representing said raw image to generate digital data representing said data image.

2. The system of claim 1, wherein said neighborhood selection means includes means for querying a user as to the type of biological data contained in said raw data and for automatically selecting the size and shape of said background removal neighborhood based upon the response of said user as to the type of biological data being processed.

3. The system of claim 1 wherein said neighborhood selection means includes means for querying a user for a size and shape for said background removal neighborhood and for using the size and shape specified by the user for the background removal neighborhood to process said digital data representing said raw image.

4. The system of claim 11, wherein said background detector means includes means for generating said digital data representing said background image by using a background removal neighborhood of the selected size and shape of pixels around each pixel of interest in said raw image and finding the pixel in said neighborhood having the lowest value and substituting said lowest value for the value of the pixel of interest corresponding to the background removal neighborhood in which said lowest value was found.

5. The system of claim 1, wherein said background detector means includes means for generating a reverse video raw data image and for generating said digital data representing said background image by using a background removal neighborhood of the selected size and shape of pixels around each pixel of interest in said raw image and finding the pixel in said neighborhood having the highest value and substituting said highest value for the value of the pixel of interest corresponding to the neighborhood in which said highest value was found.

6. The system of claim 4 further comprising means for processing said digital data of said background image to remove high frequency noise and for generating new digital data representing a new background image for subtracting from said raw image by said means for subtracting to generate said digital data representing said data image.

7. The system of claim 6, wherein said means for processing said background image includes maximum image generation means for using a neighborhood which is smaller than the background removal neighborhood used to generate said background image and for comparing each pixel of interest in said background image to all pixels in a said smaller neighborhood surrounding each said pixel of interest, and for locating the pixel in said smaller neighborhood having the maximum value and for substituting said maximum value in each said surrounding smaller neighborhood for the value of the corresponding pixel of interest so as to generate digital data representing a maximum image, and wherein said means for subtracting subtracts said maximum image from said raw image to generate said digital data representing said data image.

8. The system of claim 1 further comprising means for removing high-frequency, low-amplitude noise by selecting a neighborhood having a size which is smaller than the background removal neighborhood used to generate said digital data representing said background image and using said smaller neighborhood to process the digital data representing said background image by adding the value of each pixel of interest in said background image to the values of all the surrounding pixels in a corresponding one of said smaller neighborhoods which surrounds said pixel of interest, and dividing the sum so derived by the number of pixels in the corresponding surrounding smaller neighborhood to derive an average value and setting the value of said pixel of interest to said average value and repeating this process for each pixel of interest in said background image so as to derive a new background image for use by said means for subtracting to subtract from said raw image to generate digital data representing said data image.

9. The system of claim 7 further comprising average image generation means for processing the digital data of said maximum image by using a high frequency noise removal neighborhood of pixels said higher frequency noise removal neighborhood being smaller than the background removal neighborhood, with one high frequency noise removal neighborhood corresponding to and surrounding each pixel of interest in said maximum image and by adding the value of each pixel of interest to the values of each pixel in the corresponding high frequency noise removal neighborhood and dividing the sum by the number of pixels in said high frequency noise removal neighborhood to generate an average value for each pixel of interest and substituting said average value for each pixel of interest, and repeating this process for each pixel of interest in said maximum image to generate an average image for use by said subtraction means to subtract from said raw image to generate said digital data representing said data image.

10. The system of claim 1 wherein said neighborhood selection means selects a background removal neighborhood which is large enough and has a shape such that for all sizes and shapes of pixel clusters in said raw image bearing desired data, a background removal neighborhood centered on any said cluster will include at least some background pixels of said background image and will not include any pixels bearing no desired data or no background data.

11. The system of claim 1, wherein said neighborhood selection means includes means for automatically selecting the shape of said background removal neighborhood based upon the type of data contained within said raw image and responding to user input to select the size of said background removal neighborhood.

12. The system of claim 1, wherein said neighborhood selection means further comprises means for selecting neighborhood size and shape so as to always include some pixels of said background image but so as to never include pixels that do not have at least some background image information content.

13. The system of claim 1, further comprising a memory and means for storing said background removed data image as a first data image in said memory and means for generating a second background removed data image in fashion similar to the fashion in which said first background removed data image was generated from a second raw image and storing said second background removed data image in said memory, and further comprising means for generating comparison digital data representing the percentage change between the values of selected pixels in corresponding locations of said first background removed data image and said second background removed data image and displaying said comparison digital data as a percent change image.

14. The system of claim 13 wherein said means for generating comparison digital data includes means for subtracting the values of pixels in said first data image from the values of correspondingly located pixels in said second data image to generate difference digital data and means for limiting the allowable differences so as to clip noise by determining whether the sum of each pair of pixels is less than a selectable noise clipping constant, and, if so, setting the difference for that pair of pixels to zero before further processing to generate said percent change image.

15. The apparatus of claim 14 wherein said means for generating said comparison digital data includes means for multiplying the differences between corresponding pixel value pairs by a selectable constant determined by the type of data being processed.

16. The apparatus of claim 13 further comprising means for generating digital data representing the difference between correspondingly located pixels of said first and second data images.

17. The apparatus of claim 16 further comprising means for simultaneously displaying said first data image, said second data image, said percent change image and said difference image.

18. The apparatus of claim 16 further comprising means for simultaneously displaying selected, corresponding portions of said first and second data images, said percent change image and said difference image.

19. The apparatus of claim 16 further comprising means for simultaneously displaying user selected portions of said first and second data images, said percent change image and said difference image, and further comprising means for generating and displaying a scout image comprised of selected pixels of selected raster scan lines of said second data image, and further comprising linked cursor means for displaying a linked cursor which encompasses a selected portion of said scout image and which can be moved around said scout image by the user, and, for causing corresponding cursors in said first and second data images, and said difference image to move synchronously to corresponding portions of said other images when the user moves the position of said linked cursor in said percent change image, and further comprising means for simultaneously displaying the portions of said first and second data images, said percent change image and said difference image encompassed within said linked cursor in said scout image and the corresponding cursors in said other images.

20. The apparatus of claim 19 further comprising means for calculating a user selectable function for pixels in the selected portions of said first and second data images and the percent change and differences values for the results calculated using said selected function and for displaying the calculated percent change and difference values as new percent change and difference images.

21. The apparatus of claim 16 further comprising means for calculating and displaying alignment digital data representing an interactive alignment image for alignment by using the equation:

$$A'' = A/2 - A'/2 + 127$$

where
- $A''$ = the digital value for a pixel in said interactive alignment image corresponding to pixels having values A and $A'$;
- $A$ = the digital value for a pixel in the second background removed data image;
- $A'$ = the digital value for the corresponding (in terms of pixel number and raster scan line number) pixel in the first background removed data image.

* * * * *